(12) United States Patent
Galanes et al.

(10) Patent No.: US 8,224,650 B2
(45) Date of Patent: Jul. 17, 2012

(54) WEB SERVER CONTROLS FOR WEB ENABLED RECOGNITION AND/OR AUDIBLE PROMPTING

(75) Inventors: Francisco M. Galanes, Kirkland, WA (US); Hsiao-Wuen Hon, Bellevue, WA (US); James D. Jacoby, Snohomish, WA (US); Renaud J. Lecoeuche, Bellevue, WA (US); Stephen F. Potter, Seattle, WA (US); Susan M. Warren, Richmond, CA (US)

(73) Assignee: Microsoft Corporation, Redmond, WA (US)

( * ) Notice: Subject to any disclaimer, the term of this patent is extended or adjusted under 35 U.S.C. 154(b) by 797 days.

(21) Appl. No.: 10/426,057

(22) Filed: Apr. 28, 2003
(Under 37 CFR 1.47)

(65) Prior Publication Data
US 2004/0113908 A1     Jun. 17, 2004

Related U.S. Application Data

(63) Continuation-in-part of application No. 10/046,131, filed on Oct. 21, 2001.

(51) Int. Cl.
*G10L 15/22* (2006.01)
*G06F 17/21* (2006.01)

(52) U.S. Cl. ............... 704/270.1; 704/275; 715/201; 715/239; 715/728

(58) Field of Classification Search ............... 704/270, 704/270.1, 275; 715/727, 760, 201, 239, 715/728
See application file for complete search history.

(56) References Cited

U.S. PATENT DOCUMENTS

| | | | |
|---|---|---|---|
| 4,831,550 A | 5/1989 | Katz | |
| 4,945,566 A | 7/1990 | Mergel et al. | |
| 4,947,438 A | 8/1990 | Paeseler | |
| 5,263,117 A | 11/1993 | Nadas et al. | |
| 5,303,327 A | 4/1994 | Sturner et al. | |
| 5,357,596 A | 10/1994 | Takebayashi et al. | |
| 5,384,892 A | 1/1995 | Strong | |
| 5,477,451 A | 12/1995 | Brown et al. | |
| 5,502,774 A | 3/1996 | Bellegarda et al. | |
| 5,559,897 A | 9/1996 | Brown et al. | |
| 5,566,272 A | 10/1996 | Brems et al. | |
| 5,615,296 A | 3/1997 | Stanford et al. | |
| 5,664,061 A | 9/1997 | Andreshak et al. | |
| 5,680,511 A | 10/1997 | Baker et al. | |
| 5,689,617 A | 11/1997 | Pallakoff et al. | |
| 5,710,866 A | 1/1998 | Alleva et al. | |
| 5,737,489 A | 4/1998 | Chou et al. | |
| 5,752,052 A | 5/1998 | Richardson et al. | |
| 5,765,133 A | 6/1998 | Antoniol et al. | |

(Continued)

FOREIGN PATENT DOCUMENTS
EP   0645757 A1   3/1995
(Continued)

OTHER PUBLICATIONS

Wikipedia, "Hash table", 12 Pages.*

(Continued)

*Primary Examiner* — Martin Lerner
(74) *Attorney, Agent, or Firm* — Merchant & Gould

(57) ABSTRACT

Web server controls are provided for generating client side markups with recognition and/or audible prompting. Three approaches are disclosed for implementation of the controls.

59 Claims, 13 Drawing Sheets

U.S. PATENT DOCUMENTS

| | | | |
|---|---|---|---|
| 5,774,628 A | 6/1998 | Hemphill | |
| 5,819,220 A | 10/1998 | Sarukkai et al. | |
| 5,829,000 A | 10/1998 | Huang et al. | |
| 5,835,888 A | 11/1998 | Kanevsky et al. | |
| 5,890,123 A | 3/1999 | Brown et al. | |
| 5,899,973 A | 5/1999 | Bandara et al. | |
| 5,905,972 A | 5/1999 | Huang et al. | |
| 5,913,193 A | 6/1999 | Huang et al. | |
| 5,915,001 A | 6/1999 | Uppaluru | |
| 5,937,384 A | 8/1999 | Huang et al. | |
| 5,960,399 A | 9/1999 | Barclay et al. | |
| 6,073,091 A | 6/2000 | Kanevsky et al. | |
| 6,078,886 A | 6/2000 | Dragosh et al. | |
| 6,081,799 A | 6/2000 | Beavin et al. | |
| 6,097,305 A | 8/2000 | Im et al. | |
| 6,101,472 A | 8/2000 | Giangarra et al. | |
| 6,138,139 A | 10/2000 | Beck et al. | |
| 6,141,641 A | 10/2000 | Hwang et al. | |
| 6,154,722 A | 11/2000 | Bellegarda | |
| 6,157,912 A | 12/2000 | Kneser et al. | |
| 6,167,398 A | 12/2000 | Wyard et al. | |
| 6,182,039 B1 | 1/2001 | Rigazio et al. | |
| 6,188,976 B1 | 2/2001 | Ramaswamy | |
| 6,188,985 B1 | 2/2001 | Thrift et al. | |
| 6,192,338 B1 | 2/2001 | Haszto | |
| 6,203,495 B1 | 3/2001 | Bardy | |
| 6,240,391 B1 | 5/2001 | Ball et al. | |
| 6,243,443 B1 | 6/2001 | Low et al. | |
| 6,269,336 B1 | 7/2001 | Ladd et al. | |
| 6,311,151 B1 | 10/2001 | Yamamoto et al. | |
| 6,314,402 B1 | 11/2001 | Monaco et al. | |
| 6,349,132 B1 | 2/2002 | Wesemann et al. | |
| 6,366,886 B1 | 4/2002 | Dragosh et al. | |
| 6,377,917 B1 * | 4/2002 | Gimenez de los Galanes et al. | 704/220 |
| 6,384,829 B1 | 5/2002 | Prevost et al. | |
| 6,385,583 B1 | 5/2002 | Ladd et al. | |
| 6,405,170 B1 | 6/2002 | Phillips et al. | |
| 6,434,524 B1 | 8/2002 | Weber | |
| 6,442,523 B1 | 8/2002 | Siegel | |
| 6,445,776 B1 | 9/2002 | Shank et al. | |
| 6,453,290 B1 | 9/2002 | Jochumson | |
| 6,456,974 B1 | 9/2002 | Baker et al. | |
| 6,463,413 B1 | 10/2002 | Applebaum et al. | |
| 6,493,719 B1 | 12/2002 | Booth et al. | |
| 6,496,799 B1 | 12/2002 | Pickering | |
| 6,526,380 B1 | 2/2003 | Thelen et al. | |
| 6,539,359 B1 | 3/2003 | Ladd | |
| 6,564,207 B1 | 5/2003 | Abdoh | |
| 6,564,263 B1 | 5/2003 | Bergman et al. | |
| 6,570,078 B2 | 5/2003 | Ludwig | |
| 6,587,822 B2 | 7/2003 | Brown | |
| 6,604,075 B1 | 8/2003 | Brown | |
| 6,615,111 B2 | 9/2003 | Tackett et al. | |
| 6,662,163 B1 | 12/2003 | Albayrak et al. | |
| 6,689,947 B2 | 2/2004 | Ludwig | |
| 6,690,772 B1 | 2/2004 | Naik et al. | |
| 6,717,593 B1 | 4/2004 | Jennings | |
| 6,718,015 B1 | 4/2004 | Berstis | |
| 6,728,679 B1 | 4/2004 | Strubbe et al. | |
| 6,745,163 B1 | 6/2004 | Brocious et al. | |
| 6,757,655 B1 | 6/2004 | Besling et al. | |
| 6,785,649 B1 | 8/2004 | Hoory et al. | |
| 6,785,653 B1 | 8/2004 | White | |
| 6,839,896 B2 | 1/2005 | Coffman et al. | |
| 6,868,383 B1 * | 3/2005 | Bangalore et al. | 704/254 |
| 6,944,592 B1 | 9/2005 | Pickering | |
| 6,950,850 B1 | 9/2005 | Leff et al. | |
| 6,965,864 B1 | 11/2005 | Thrift et al. | |
| 7,003,463 B1 | 2/2006 | Maes | |
| 7,003,464 B2 * | 2/2006 | Ferrans et al. | 704/270.1 |
| 7,020,609 B2 | 3/2006 | Thrift et al. | |
| 7,020,841 B2 | 3/2006 | Dantzig et al. | |
| 7,028,306 B2 | 4/2006 | Boloker et al. | |
| 7,062,437 B2 * | 6/2006 | Kovales et al. | 704/260 |
| 7,158,779 B2 * | 1/2007 | Hon et al. | 455/414.1 |
| 7,257,575 B1 * | 8/2007 | Johnston et al. | 1/1 |
| 7,260,535 B2 * | 8/2007 | Galanes et al. | 704/270 |
| 7,363,027 B2 * | 4/2008 | Hon et al. | 455/414.1 |
| 7,409,349 B2 * | 8/2008 | Wang et al. | 704/270.1 |
| 7,505,908 B2 * | 3/2009 | Johnston et al. | 704/275 |
| 7,506,022 B2 * | 3/2009 | Wang et al. | 709/203 |
| 7,539,656 B2 | 5/2009 | Fratkina et al. | |
| 7,552,055 B2 | 6/2009 | Lecoeuche | |
| 7,610,547 B2 | 10/2009 | Wang et al. | |
| 7,640,164 B2 | 12/2009 | Sasaki et al. | |
| 7,711,570 B2 * | 5/2010 | Galanes et al. | 704/277 |
| 7,805,704 B2 * | 9/2010 | Galanes et al. | 717/107 |
| 7,814,501 B2 * | 10/2010 | Lecoeuche et al. | 719/315 |
| 7,853,453 B2 * | 12/2010 | Potter | 704/270.1 |
| 7,873,523 B2 * | 1/2011 | Potter et al. | 704/275 |
| 8,160,883 B2 | 4/2012 | Lecoeuche | |
| 8,165,883 B2 | 4/2012 | Galanes et al. | |
| 2001/0034603 A1 | 10/2001 | Thrift et al. | |
| 2002/0003547 A1 | 1/2002 | Wang et al. | |
| 2002/0009517 A1 | 1/2002 | Degady | |
| 2002/0010584 A1 | 1/2002 | Schultz | |
| 2002/0010715 A1 | 1/2002 | Chinn | |
| 2002/0031756 A1 | 3/2002 | Holtz et al. | |
| 2002/0035474 A1 | 3/2002 | Alpdemir | |
| 2002/0042711 A1 | 4/2002 | Lin | |
| 2002/0065652 A1 | 5/2002 | Kushida et al. | |
| 2002/0077823 A1 | 6/2002 | Fox et al. | |
| 2002/0091518 A1 | 7/2002 | Baruch et al. | |
| 2002/0107891 A1 | 8/2002 | Leamon et al. | |
| 2002/0113908 A1 | 8/2002 | Sprowson et al. | |
| 2002/0128845 A1 | 9/2002 | Thomas et al. | |
| 2002/0154124 A1 | 10/2002 | Han | |
| 2002/0165719 A1 | 11/2002 | Wang et al. | |
| 2002/0169806 A1 | 11/2002 | Wang et al. | |
| 2002/0173961 A1 | 11/2002 | Guerra | |
| 2002/0178008 A1 | 11/2002 | Reynar | |
| 2002/0194388 A1 | 12/2002 | Boloker et al. | |
| 2002/0198719 A1 | 12/2002 | Gergic | |
| 2003/0009517 A1 | 1/2003 | Wang et al. | |
| 2003/0065505 A1 * | 4/2003 | Johnston et al. | 704/9 |
| 2003/0088421 A1 | 5/2003 | Maes | |
| 2003/0125944 A1 | 7/2003 | Wohlsen et al. | |
| 2003/0130854 A1 | 7/2003 | Galanes et al. | |
| 2003/0137537 A1 | 7/2003 | Guo et al. | |
| 2003/0171924 A1 | 9/2003 | Bi | |
| 2003/0200080 A1 | 10/2003 | Galanes et al. | |
| 2003/0225825 A1 | 12/2003 | Healey | |
| 2004/0073431 A1 | 4/2004 | Galanes et al. | |
| 2004/0078201 A1 | 4/2004 | Porter et al. | |
| 2004/0083092 A1 | 4/2004 | Valles | |
| 2004/0138890 A1 | 7/2004 | Ferrans et al. | |
| 2004/0192273 A1 | 9/2004 | AuYeung | |
| 2004/0230434 A1 | 11/2004 | Galanes et al. | |
| 2004/0230637 A1 | 11/2004 | Lecoeuche et al. | |
| 2005/0091059 A1 * | 4/2005 | Lecoeuche | 704/270.1 |
| 2005/0135571 A1 | 6/2005 | Bangalore et al. | |
| 2005/0154591 A1 | 7/2005 | Lecoeuche | |
| 2005/0203747 A1 | 9/2005 | Lecoeuche | |

FOREIGN PATENT DOCUMENTS

| | | |
|---|---|---|
| EP | 0687987 A1 | 12/1995 |
| EP | 0834862 | 9/1997 |
| EP | 0854418 | 1/1998 |
| EP | 0872827 | 10/1998 |
| EP | 1209662 | 11/2001 |
| EP | 1199630 A2 | 4/2002 |
| JP | 10-116094 | 5/1998 |
| JP | 10-240493 | 9/1998 |
| JP | 11-110186 | 4/1999 |
| JP | 2001-42890 | 2/2001 |
| JP | 2001-154852 | 6/2001 |
| JP | 2002-524806 | 8/2002 |
| JP | 2003-044093 | 2/2003 |
| JP | 2003-067177 | 3/2003 |
| JP | 2003-131772 | 5/2003 |
| WO | WO 96/41333 | 12/1996 |
| WO | WO 98/34180 | 8/1998 |
| WO | WO 00/05643 | 2/2000 |

| | | |
|---|---|---|
| WO | WO 00/14728 | 3/2000 |
| WO | WO 01/26093 | 4/2001 |
| WO | WO 01/93249 A1 | 12/2001 |

OTHER PUBLICATIONS

Mit et al., "Grammar Representation Requirements for Voice Markup Languages", W3C Working Draft, Dec. 23, 1999.
VoiceXML Forum, Version 1.00, Mar. 7, 2000, pp. 1-101.
Hemphill C.T. and Thrift P.R.: "Surfing the WEB by Voice" Proceedings ACM Multimedia, Nov. 1995, pp. 215-222.
Using the HTML Converter, Sun Microsystems, Jun. 8, 2001.
JavaServer Pages™ Technology-Frequently Asked Questions, Sun Microsystems, Aug. 27, 1999.
SCRIPT-Client-side Script, Web Design Group, May 13, 1998.
XML and XSL from servers to cell-phones, Ramin Firoozye and Ranbir Chawla, Sep. 2, 1998.
Telephones http://www.fusionanomaly.net/telephones.html, Oct. 30, 2000.
SpeechObjects Specification V1.0, W3C Note, Nov. 2000.
McTear, Michael F.,"Spoken Dialogue Technology: Enabling the Conversational User Interface", ACM Computing Surveys (CSUR), Mar. 2002, vol. 34, Issue 1, pp. 90-169.
Capra, Robert, et al. "Posters & Demos: WebContext: Remote Access to Shared Context", Proceedings of the 2001 Workshop on Perceptive User Interfaces, Nov. 2001, pp. 1-9.
Lucas, Bruce, "VoiceXML for Web-based Distributed Conversational Applications", Communications of the ACM, vol. 43, Issue 9, Sep. 2000, pp. 53-57.
SALT, Speech Application Language Tags (SALT), 1.0 Specification, Jul. 15, 2002, 112 pages.
Synchronized Multimedia Modules Based Upon SMIL 1.0, W3C, downloaded from: http://www.w3.org/TR/NOTE-SYMM-modules, Feb. 1999,pp. 1-8.
SALT, Speech Application Language Tags (SALT), 0.9 Specification, Feb. 19, 2002.
Communication and European Search Report from European Application No. 02023649.3, mailed Jul. 14, 2005.
VoiceXML FORUM, Voice eXtensible Markup Language, Version 1.00, Mar. 7, 2000, pp. 1-101.
Official Notice of Rejection of the Japanese Patent Office in related foreign application No. 2002-306353 filed Oct. 21, 2002.
Masahiro Araki, et al., "Development of XML-VoiceXML Converter," IPSJ SIG Technical Report, vol. 2000, No. 119, pp. 191-196, 2000-SLP-34-33, Information Processing Society of Japan, Dec. 22, 2000.
Wikipedia, "Hash Table", retrieved Oct. 22, 2009, 13 pages.
A. Gorin et al., "How may I help you?" Speech Comm., vol. 23, pp. 113-127, 1997.
Rudnicky et al., "SpeechWear: a mobile speech system," in Proc. ICSLP-96, Philadelphia, PA, Oct. 1996.
Souvignier et al., "The thoughtful elephant: strategies for spoken dialog systems," IEEE Trans. Speech and Audio Processing, 8(1), Jan. 2000.
Chelba, "A structured language model," in Proc. EACL-97, Madrid, Spain, Jul. 1997.
Daniele Falavigna, Roberto Gretter: "Flexible Mixed Initiative Dialogue over the Telephone Network," in Proceedings of ASRU 99, Keystone, Colorado, 12-15, Dec. 1999.
Database Inspec, 'Online!, Institute of Electrical Engineers, "Improvement of a Probabilistic CFG Using a Cluster-Based Language Modeling Technique," & "Methodologies for the Conception, Design, and Application of Intelligent Systems," Abstract 1996.
Dialogue speech recognition using syntactic rules based on subtrees and preterminal bigrams, Takezawa, Toshiyuki, Morimoto, Tsuyoshi Systems and Computers in Japan. vol. 28, No. 5, pp. 22-32, 1997.
Goodman, J.T., "Putting It All Together: Language Model Combination," Acoustics, Speech, and Signal Processing, 2000. ICASSP '00 Inern'l Conf. On, v. 3, pp. 1647-1650.
H. Ney, S. Ortmanns, "Dynamic programming search for continuous speech recognition," IEEE Signal Processing Magazine, pp. 64-83, 1999.

Huang, X., et al., "From Sphinx II to Whisper: Making Speech Recognition Usable, in Automatic Speech and Speaker Recognition," C.H. Lee, F.K. Soong, and K.K. Paliwal, Editors, 1996, Klewer Academic Publishers: Norwell, MA., pp. 481-508.
Kuansan Wang: "Semantic modeling for dialog systems in a pattern recognition framework" Proceedings of Automatic Speech Recognition and Understanding Workshop ASRU, Dec. 9, 2001, pp. 284-287.
K. Wang, "A plan-based dialog system with probabilistic inferences," in Proc. ISCLP-2000, Beijing China, 2000.
Wang, "Natural Language enabled Web applications," in Proc. 1st NLP and XML Workshop, Tokyo, Japan, Nov. 2001.
Bell, J. Gustafson, "Positive and negative user feedback in spoken dialog corpus," in Proc. ICSLP-2000, Beijing, China, Oct. 2000.
L. Cerrato, "A comparison between feedback strategies in human-to-human and human-machine communication," in Proc. ICSLP-2002, Denver, Co., Sep. 2002.
L. Ferrer et al., "Is the speaker done yet? Faster and more accurate end-of-utterance detection using prosody," in Proc. ISCP-2002, Denver, CO, Sep. 2002.
L. Huang, C. Yang, "A novel approach to robust speech endpoint detection in car environments," in Proc. ICASSP-2000, vol. 3, Istanbul, Turkey, Jun. 2000.
Lloyd-Thomas, H. et al., "An Integrated Grammar/Bigram Language Model Using Path Scores," Proceedings of the International Conference on Acoustics, Speech and Signal Processing, May 9, 1995, vol. 1, pp. 173-176.
Matsunaga et al., "Task Adaptation in Stochastic Language Models for Continuous Speech Recognition," IEEE Mar. 23, 1992, pp. I-165-I-268.
M.A. Walker et al., "Darpa Communicator Evaluation: Progress from 2000 to 2001," in Proc. ICSLP-2002, Denver, CO, Sep. 2002.
M.A. Walker et al., "Paradise: A framework for evaluating spoken dialog agents," in Proc. 35th ACL, 1997.
Mergel, A. et al., "Construction of Language Models for Spoken Database Queries," IEEE, 1987, pp. 844-847.
M. Mohri et al., "Weighted automata in text and speech processing," in Proc. ECAI-96 Workshop, Budapest, Hungary, 1996.
Moore, R., "Using Natural-Language Knowledge Sources in Speech Recognition," Computational Models of Speech Pattern Processing, Proceedings of Computational Models of Speech Pattern Processing, Jul. 1997, pp. 304-327.
Moore, R. et al., "Combining Linguistic and Statistical Knowledge Sources in Natural-Language Processing for ATIS," in Proceedings of the ARPA Spoken Language Systems Technology Workshop, 1995, Morgan Kaufmann, Los Altos, CA, Austin, Texas.
N. Sawhney, C. Schmandt, "Nomadic radio: speech and audio interaction for contextual messaging in nomadic environments," ACM Trans. Computer-Human Interaction, 7(3), pp. 353-383, Sep. 2000.
Li et al., "A robust real-time endpoint detector with energy normalization," in Proc. ICASSP-2001, vol. 1, Salt Lake City, UT, May 2001.
PJ Wyard et al., "Spoken Language Systems-Beyond Prompt and Response," BT Technology Journal, Jan. 1996, No. 1, pp. 187-205.
Sato et al., "Learning decision trees to determine turn-taking by spoken dialog systems," in Proc. ICSLP-2002, Denver, CO, Sep. 2002.
S.L. Oviatt, "Multimodal interactive maps: designing for human performance," Human Computer Interactions, vol. 12, pp. 93-129, 1997.
Takahiro Nakano et al.: "Investigation on speech interface for form-based information retrieval services on the WWW" IPSJ SIG Notes, Japan, the Information Processing Society of Japan, vol. 99, No. 14, p. 1-6 (Feb. 6, 1999).
Tsukada, H. et al., "Reliable Utterances Segment Recognition by Integrating a Grammary with Statistical Language Contstraints," Speech Communications, Elsevier Science Publishers, Dec. 1998, vol. 26, No. 4, pp. 299-309.
V. Zue et al., "Jupiter: A telephone-based conversational interface for weather information," IEEE Trans. Speech and Audio Processing, 8(1), Jan. 2000.

Wang, K: "Salt: A spoken language interface for web-based multimodal dialog systems," Proceedings of ICSLP 2002, International Conference on Spoken Language Processing, Sep. 16, 2002, pp. 2241-2244.

Ward, W. "Understanding Spontaneous Speech: The Phoenix System," Proceedings ICASSP, 1991, pp. 365-367.

Wang, K.: "Semantic object synchronous understanding in Salt for highly interactive user interface," Proceedings of Eurospeech 2003, 8th European Conference on Speech Communication and Technology, Sep. 1, 2003, pp. 1209-1212.

X. Huang et al., "MiPad: A next generation PDA prototype," in Proc. ICSLP-2000, Beijing, China, Oct. 2000.

XSL Transformations, http://www.w3.org/TR/xslt, Nov. 16, 1999.

YeYi Wang et al.: "A unified context-free grammar and n-gram model for spoken language processing" Proc. of IEEE ICASSP 2000, vol. 3, 5 Jun. 2000, pp. 1639-1642.

Communication pursuant to Article 96 (2) EPC, Application No. 04011317.7-2218 dated Jun. 1, 2005, 3 pages.

Communication with European Search Report dated Oct. 7, 2004, Application No. 04011317.7-2218, 4 pages.

Official Notice of Rejection of the Japanese Patent Office mailed Apr. 22, 2008 in counterpart foreign application No. 2002-132053 filed May 7, 2002.

Official Search Report of the Japanese Patent Office mailed Dec. 14, 2007 in counterpart foreign application No. 2002-132053 filed May 5, 2002.

Official Search Report of the Japanese Patent Office mailed Feb. 27, 2007 in counterpart foreign application No. 2002-306353 filed Oct. 21, 2002.

U.S. Office Action mailed Apr. 14, 2005 in U.S. Appl. No. 10/046,131.

U.S. Office Action mailed Jul. 7, 2006 in U.S. Appl. No. 10/046,131.

U.S. Office Action mailed Nov. 28, 2006 in U.S. Appl. No. 10/426,027.

U.S. Office Action mailed Jan. 3, 2007 in U.S. Appl. No. 10/426,053.

U.S. Patent and Trademark Office Action mailed Feb. 16, 2007 for U.S. Appl. No. 09/960,229, filed Sep. 20, 2001.

U.S. Office Action mailed Mar. 26, 2007 in U.S. Appl. No. 10/046,131.

U.S. Office Action mailed Apr. 23, 2007 in U.S. Appl. No. 10/426,057.

U.S. Office Action mailed May 17, 2007 in U.S. Appl. No. 10/426,027.

U.S. Office Action mailed Jun. 25, 2007 in U.S. Appl. No. 10/426,053.

U.S. Office Action mailed Oct. 18, 2007 in U.S. Appl. No. 10/046,131.

U.S. Office Action mailed Jan. 24, 2008 in U.S. Appl. No. 10/426,053.

U.S. Office Action mailed Jan. 28, 2008 in U.S. Appl. No. 10/426,027.

U.S. Office Action mailed Jul. 31, 2008 in U.S. Appl. No. 10/046,131.

U.S. Office Action mailed Sep. 11, 2008 in U.S. Appl. No. 10/755,623.

U.S. Office Action mailed Oct. 30, 2008 in U.S. Appl. No. 10/426,053.

U.S. Office Action mailed Nov. 14, 2008 in U.S. Appl. No. 10/426,027.

U.S. Office Action mailed Mar. 11, 2009 in U.S. Appl. No. 10/046,131.

U.S. Office Action mailed Apr. 20, 2009 in U.S. Appl. No. 10/755,623.

U.S. Office Action mailed Jun. 8, 2009 in U.S. Appl. No. 10/426,053.

U.S. Office Action mailed Sep. 22, 2009 in U.S. Appl. No. 10/755,623.

U.S. Office Action mailed Nov. 12, 2009 in U.S. Appl. No. 10/046,131.

U.S. Office Action mailed Nov. 27, 2009 in U.S. Appl. No. 10/426,053.

U.S. Office Action mailed Dec. 10, 2009 in U.S. Appl. No. 10/426,027.

U.S. Office Action mailed Jan. 22, 2010 in U.S. Appl. No. 10/755,623.

U.S. Office Action mailed Jul. 6, 2010 in U.S. Appl. No. 10/755,623.

U.S. Office Action mailed Nov. 5, 2010 in U.S. Appl. No. 10/046,131.

U.S. Office Action mailed Dec. 9, 2010 in U.S. Appl. No. 10/426,053.

U.S. Office Action mailed Dec. 23, 2010 in U.S. Appl. No. 10/755,623.

U.S. Notice of Allowance mailed Jul. 5, 2011 in U.S. Appl. No. 10/046,131.

U.S. Notice of Allowance mailed Aug. 19, 2011 in U.S. Appl. No. 10/755,623.

Combination of Statistical and Rule-Based Approcahes for Spoken Language Understanding, YeYi Wang, Alex Acero, Ciprian Chelba, Brendan Frey and Leon Wong, Microsoft Research, One Microsoft Way, Redmond, Washington 98052, USA Elecetrical and Computer Engineering, University of Toronto, 2002.

K. Wang, "Proposal for Semantic Tagging for the Context Free Grammar Specification for the W3C Speech Interface Framework," http://www.w3org/voice/group/2000/ms-SemanticTag_html, 2000, retrieved May 11, 2004.

U.S. Notice of Allowance mailed Jun. 23, 2011 in U.S. Appl. No. 10/426,053, all pages.

U.S. Notice of Allowance mailed Nov. 15, 2011 in U.S. Appl. No. 10/046,131, all pages.

U.S. Notice of Allowance mailed Dec. 13, 2011 in U.S. Appl. No. 10/755,623, 34 pages.

U.S. Notice of Allowance mailed Dec. 27, 2011 in U.S. Appl. No. 10/426,053, 19 pages.

* cited by examiner

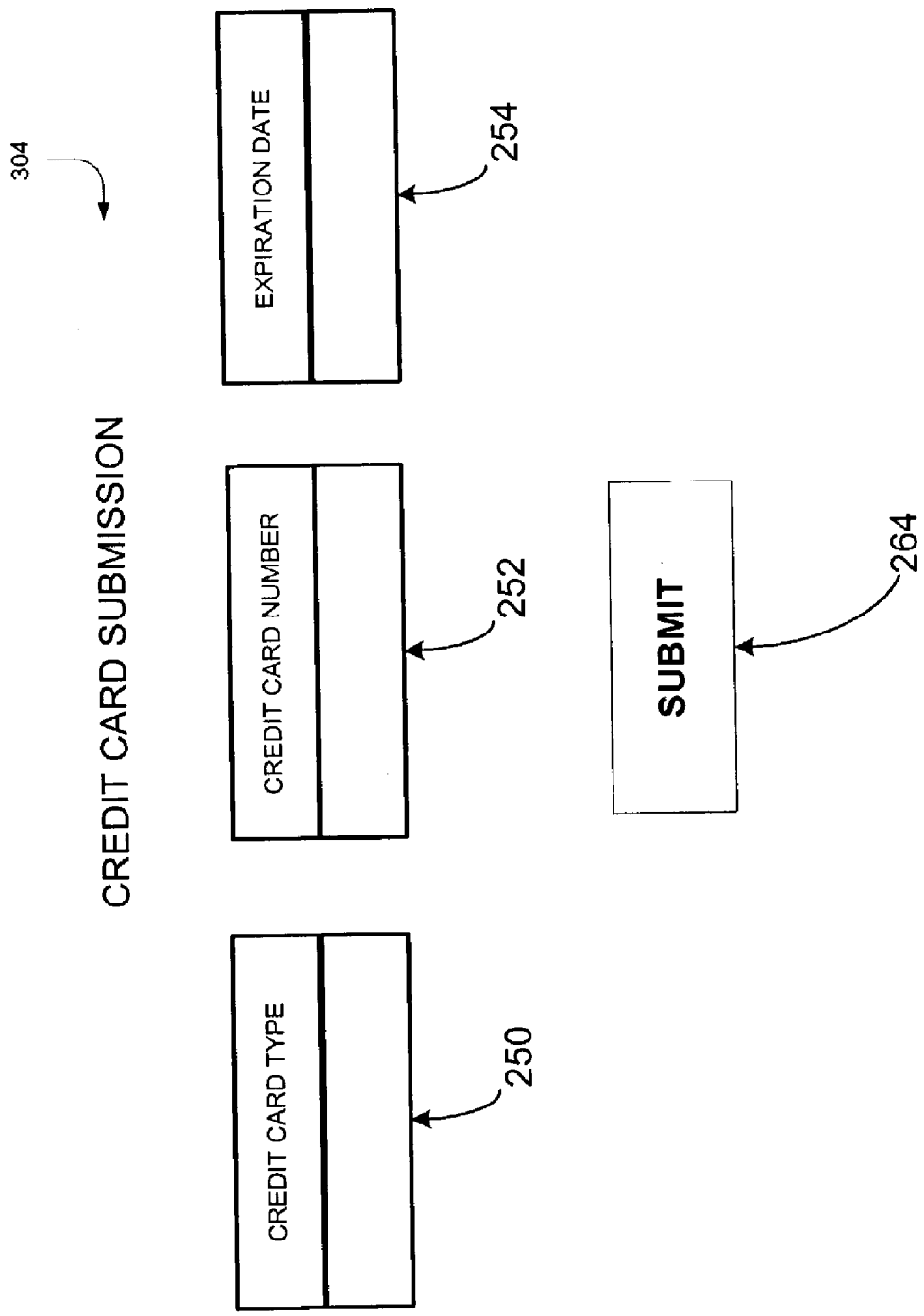

```
270      <html>
            <form id="get_card_info" method="post" action="http://payment.asp">
               <select name="card_type" onClick="talk(g_card_types)">
                  <option value="amex">American Express</option>
                  <option value="visa">Visa</option>
                  <option value="ms">MasterCard</option>
               </select>                                                              — 280
               <reco id="g_card_types" onReco ="handle()" >
290 ─────       < grammar   src="./gram#card_types" />
               </reco >
               <input type="text" name="card_num" width="30"
                  onClick="talk(g_card_num)" />
               <reco id=" g_card_num " onReco ="handle()" >                          — 282
                  < grammar   src=" ./gram#digits" />
               </reco >
               <input type="text" name="expiry_date"
                  onClick="talk(g_expiry_date)" />
               <reco id="g_expiry_date " >                                           — 284
                  < grammar   src ="   ./gram#dates" />
               </reco >
               <input type="submit" value="Submit" onClick="verify()" />
            </form>
            <script><![CDATA[
                  function talk(gobj) {
                     gobj.activate();
                  }
272               function handle() {
                     if (get_card_info.card_num != null) {
                        if (get_card_info.card_type.value == "amex") {
                           if (get_card_info.card_num.length != 15)
                              alert ("amex should have 15 digits");
                        } else
                           if (get_card_info.card_num.length != 16)
                              alert ("visa and master should have 16 digits");
                     }
                  }
                  function verify() {
                     var flag = window.confirm("submit the credit card
            info?");
                        if (flag) {
                           get_card_info.submit();
                        }

]]>
            </script>
         </html>
```

FIG. 6

WEB SERVER CONTROLS FOR WEB ENABLED RECOGNITION AND/OR AUDIBLE PROMPTING

CROSS-REFERENCE TO RELATED APPLICATON

The present application is a continuation-in-part and claims priority of U.S. patent application entitled WEB SERVE CONTROLS FOR WEB ENABLED RECOGNITION AND/OR AUDIBLE PROMPTING having Ser. No. 10/046,131, filed Oct. 21, 2001.

BACKGROUND OF THE INVENTION

The present invention relates to access of information over a network such as the Internet. More particularly, the present invention relates to controls for a server that generates client side markup enabled with recognition and/or audible prompting.

Small computing devices such as personal digital assistants (PDA), devices and portable phones are used with ever increasing frequency by people in their day-to-day activities. With the increase in processing power now available for microprocessors used to run these devices, the functionality of these devices is increasing, and in some cases, merging. For instance, many portable phones now can be used to access and browse the Internet as well as can be used to store personal information such as addresses, phone numbers and the like.

In view that these computing devices are being used for browsing the Internet, or are used in other server/client architectures, it is therefore necessary to enter information into the computing device. Unfortunately, due to the desire to keep these devices as small as possible in order that they are easily carried, conventional keyboards having all the letters of the alphabet as isolated buttons are usually not possible due to the limited surface area available on the housings of the computing devices.

To address this problem, there has been increased interest and adoption of using voice or speech to access information over a wide area network such as the Internet. For example, voice portals such as through the use of VoiceXML (voice extensible markup language) have been advanced to allow Internet content to be accessed using only a telephone. In this architecture, a document server (for example, a web server) processes requests from a client through a VoiceXML interpreter. The web server can produce VoiceXML documents in reply, which are processed by the VoiceXML interpreter and rendered audibly to the user. Using voice commands through voice recognition, the user can navigate the web.

Generally, there are two techniques of "speech enabling" information or web content. In the first technique, existing visual markup language pages typically visually rendered by a device having a display are interpreted and rendered aurally. However, this approach often yields poor results because markup meant for visual interaction usually do not have enough information to create a sensible aural dialog automatically. In addition, voice interaction is prone to error, especially over noisy channels such as a telephone. Without visual or other forms of persistent feedback, navigation through the web server application can be extremely difficult for the user. This approach thus requires mechanisms such as help messages, which are also rendered audibly to the user in order to help them navigate through the website. The mechanisms are commonly referred to as "voice dialogs", which also must address errors when incorrect information or no information is provided by the user, for example, in response to an audible question. Since the mechanisms are not commonly based on the visual content of the web page, they cannot be generated automatically, and therefore typically require extensive development time by the application developer.

A second approach to speech enabling web content includes writing specific voice pages in a new language. An advantage of this approach is that the speech-enabled page contains all the mechanisms needed for aural dialog such as repairs and navigational help. However, a significant disadvantage is that the application pages must then be adapted to include the application logic as found in the visual content pages. In other words, the application logic of the visual content pages must be rewritten in the form of the speech-enabling language. Even when this process can be automated by the use of tools creating visual and aural pages from the same specification, maintenance of the visual and speech enabled pages is usually difficult to synchronize. In addition, this approach does not easily allow multimodal applications, for example where both visual and speech interaction is provided on the web page. Since the visual and speech-enabled pages are unrelated, the input and output logic is not easily coordinated to work with each other.

To date, speech interaction authoring is also cumbersome due to the organization or format currently used as the interface. Generally, the speech interface either tends to be tied too closely to the business logic of the application, which inhibits re-use of the elements of the speech interface in other applications, or the speech interface is too restricted by a simplistic dialog model (e.g. forms and fields).

There is thus an ongoing need to improve upon the architecture and methods used to provide speech recognition in a server/client architecture such as the Internet. In particular, a method, system or authoring tool that addresses one, several or all of the foregoing disadvantages and thus provides generation of speech-enabled recognition and/or speech-enabled prompting of client markup from a web server is needed.

SUMMARY OF THE INVENTION

Web server controls are provided for generating client side markups with recognition and/or audible prompting. Three approaches are disclosed for implementation of the controls.

In a first approach, controls commonly related to visual rendering are extended to include an attributes related to recognition and/or audible prompting. Typically, controls such as "label" use a library having markup information, which provides a visual prompt on a display. Similarly, "textbox" provides an input field on a visual display. In the first approach, an additional library is provided for recognition and/or audibly prompting, wherein the controls include attributes or parameters to use both libraries.

In a second approach, the controls access the current, existing library for visual markup information, but include attributes and mechanisms to perform recognition and/or audible prompting. In other words, the controls use the library, but only when visual rendering is desired.

In a third approach, a set of companion controls having attributes related to recognition and/or audible prompting are formed. The companion controls use a library having recognition and audibly prompting markup information. The companion controls are selectively associated with visual controls. In this manner, application logic remains with the visual controls, wherein the companion controls provide recognized results to the visual controls. The companion controls follow a dialog in that controls are provided for prompting a question, obtaining an answer, confirming a result, providing a command, or making a statement. A question/answer control can also be formed from one or more of these controls in order to form a dialog or sub-dialog pertaining to a specific topic.

BRIEF DESCRIPTION OF THE DRAWINGS

FIG. 5 is a display for obtaining credit card information.

FIG. 6 is an exemplary page of mark-up language executable on a client having a display and voice recognition capabilities.

DETAILED DESCRIPTION OF THE ILLUSTRATIVE EMBODIMENTS

Figure 1:
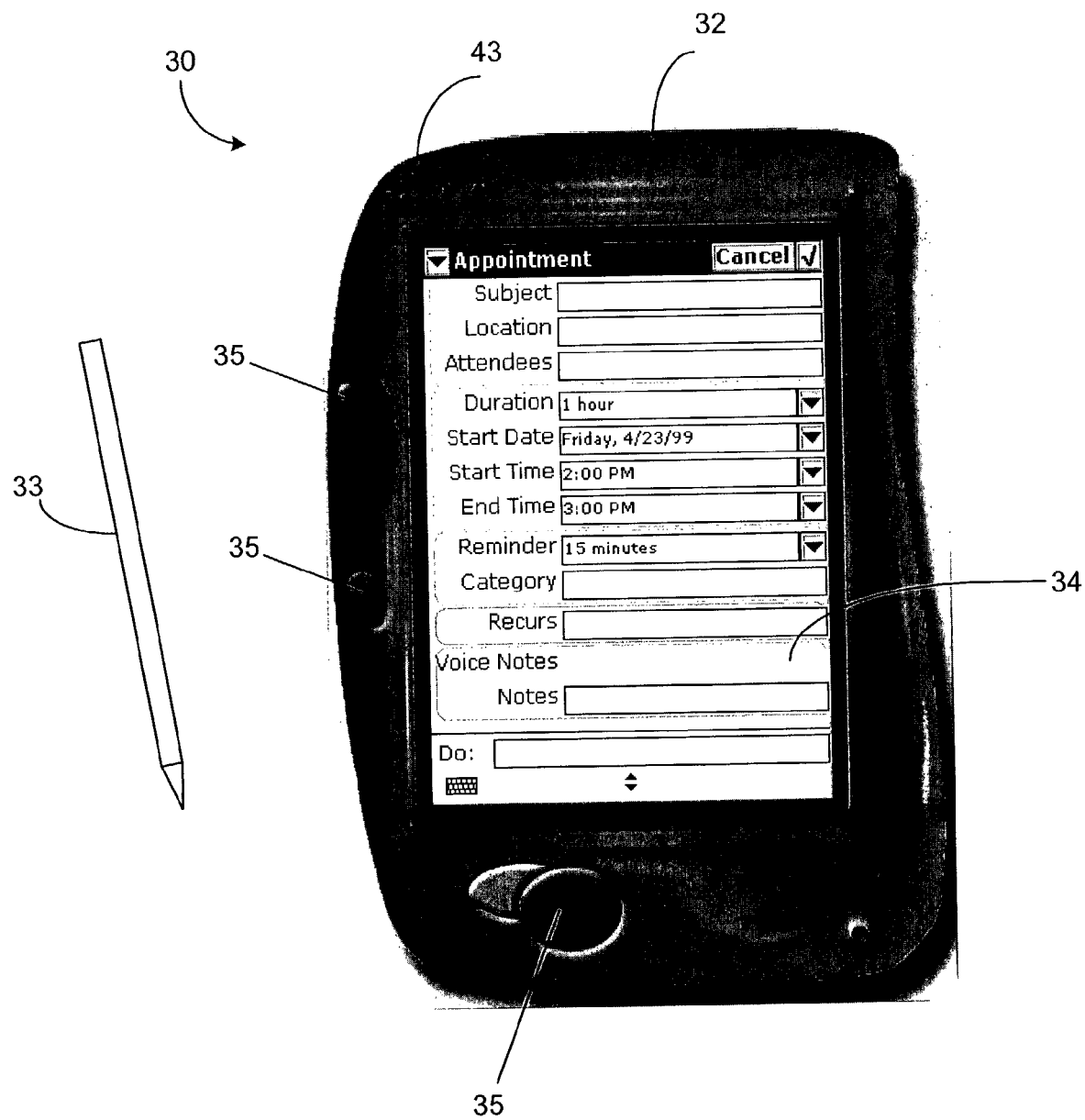
FIG. 1 is a plan view of a first embodiment of a computing device operating environment.

Before describing architecture of web based recognition and methods for implementing the same, it may be useful to describe generally computing devices that can function in the architecture. Referring now to FIG. 1, an exemplary form of a data management device (PIM, PDA or the like) is illustrated at 30. However, it is contemplated that the present invention can also be practiced using other computing devices discussed below, and in particular, those computing devices having limited surface areas for input buttons or the like. For example, phones and/or data management devices will also benefit from the present invention. Such devices will have an enhanced utility compared to existing portable personal information management devices and other portable electronic devices, and the functions and compact size of such devices will more likely encourage the user to carry the device at all times. Accordingly, it is not intended that the scope of the architecture herein described be limited by the disclosure of an exemplary data management or PIM device, phone or computer herein illustrated.

An exemplary form of a data management mobile device 30 is illustrated in FIG. 1. The mobile device 30 includes a housing 32 and has an user interface including a display 34, which uses a contact sensitive display screen in conjunction with a stylus 33. The stylus 33 is used to press or contact the display 34 at designated coordinates to select a field, to selectively move a starting position of a cursor, or to otherwise provide command information such as through gestures or handwriting. Alternatively, or in addition, one or more buttons 35 can be included on the device 30 for navigation. In addition, other input mechanisms such as rotatable wheels, rollers or the like can also be provided. However, it should be noted that the invention is not intended to be limited by these forms of input mechanisms. For instance, another form of input can include a visual input such as through computer vision.

Figure 2:
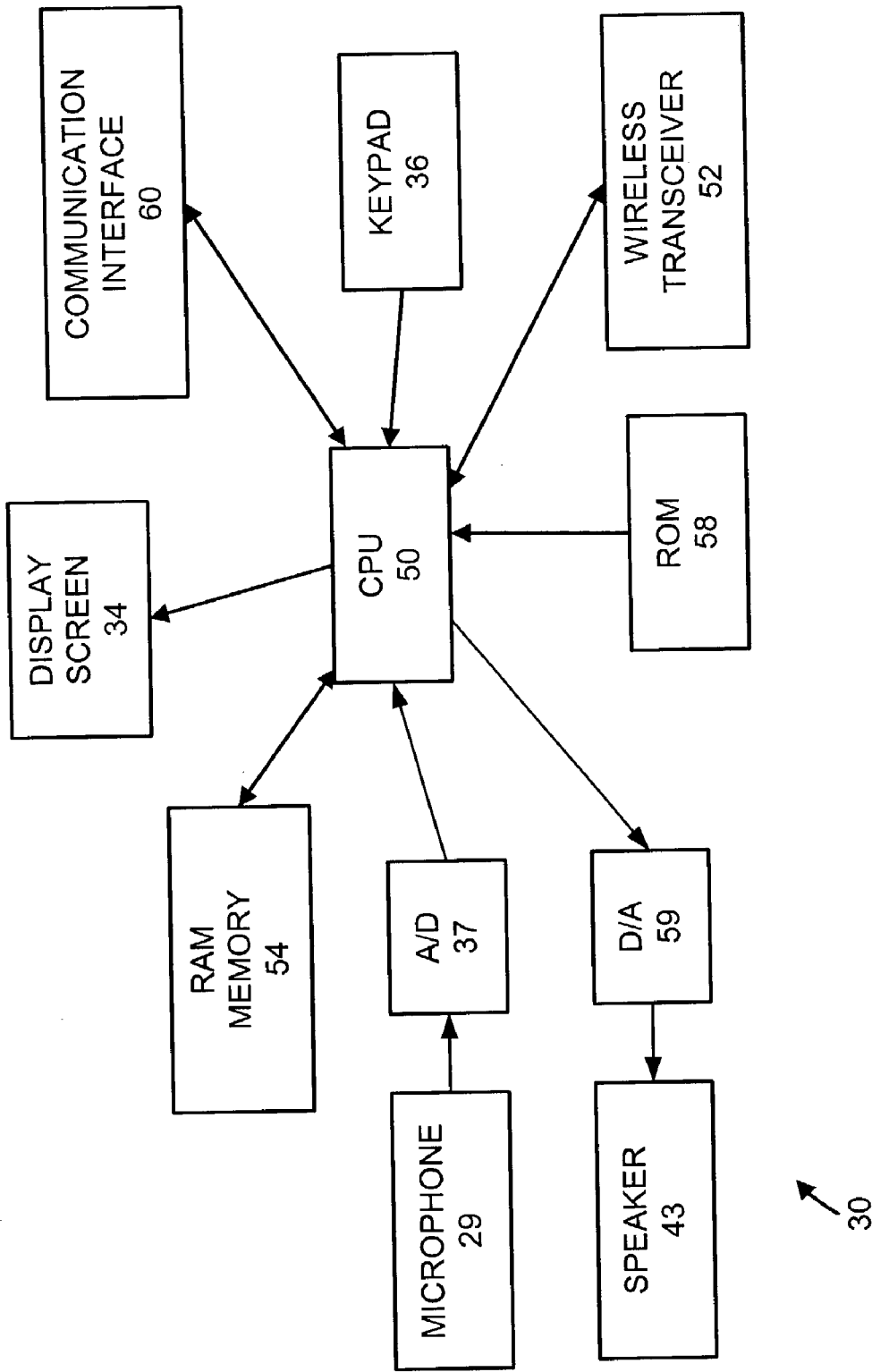
FIG. 2 is a block diagram of the computing device of FIG. 1.

Referring now to FIG. 2, a block diagram illustrates the functional components comprising the mobile device 30. A central processing unit (CPU) 50 implements the software control functions. CPU 50 is coupled to display 34 so that text and graphic icons generated in accordance with the controlling software appear on the display 34. A speaker 43 can be coupled to CPU 50 typically with a digital-to-analog converter 59 to provide an audible output. Data that is downloaded or entered by the user into the mobile device 30 is stored in a non-volatile read/write random access memory store 54 bi-directionally coupled to the CPU 50. Random access memory (RAM) 54 provides volatile storage for instructions that are executed by CPU 50, and storage for temporary data, such as register values. Default values for configuration options and other variables are stored in a read only memory (ROM) 58. ROM 58 can also be used to store the operating system software for the device that controls the basic functionality of the mobile 30 and other operating system kernel functions (e.g., the loading of software components into RAM 54).

RAM 54 also serves as a storage for the code in the manner analogous to the function of a hard drive on a PC that is used to store application programs. It should be noted that although non-volatile memory is used for storing the code, it alternatively can be stored in volatile memory that is not used for execution of the code.

Wireless signals can be transmitted/received by the mobile device through a wireless transceiver 52, which is coupled to CPU 50. An optional communication interface 60 can also be provided for downloading data directly from a computer (e.g., desktop computer), or from a wired network, if desired. Accordingly, interface 60 can comprise various forms of communication devices, for example, an infrared link, modem, a network card, or the like.

Mobile device 30 includes a microphone 29, and analog-to-digital (A/D) converter 37, and an optional recognition program (speech, DTMF, handwriting, gesture or computer vision) stored in store 54. By way of example, in response to audible information, instructions or commands from a user of device 30, microphone 29 provides speech signals, which are digitized by A/D converter 37. The speech recognition program can perform normalization and/or feature extraction functions on the digitized speech signals to obtain intermediate speech recognition results. Using wireless transceiver 52 or communication interface 60, speech data is transmitted to a remote recognition server 204 discussed below and illustrated in the architecture of FIG. 5. Recognition results are then returned to mobile device 30 for rendering (e.g. visual and/or audible) thereon, and eventual transmission to a web server 202 (FIG. 5), wherein the web server 202 and mobile device 30 operate in a client/server relationship. Similar processing can be used for other forms of input. For example, handwriting input can be digitized with or without pre-processing on device 30. Like the speech data, this form of input can be transmitted to the recognition server 204 for recognition wherein the recognition results are returned to at least one of the device 30 and/or web server 202. Likewise, DTMF data, gesture data and visual data can be processed similarly. Depending on the form of input, device 30 (and the other forms of clients discussed below) would include necessary hardware such as a camera for visual input.

In addition to the portable or mobile computing devices described above, it should also be understood that the present invention can be used with numerous other computing devices such as a general desktop computer. For instance, the present invention will allow a user with limited physical abilities to input or enter text into a computer or other computing device when other conventional input devices, such as a full alpha-numeric keyboard, are too difficult to operate.

The invention is also operational with numerous other general purpose or special purpose computing systems, environments or configurations. Examples of well known computing systems, environments, and/or configurations that may be suitable for use with the invention include, but are not limited to, wireless or cellular telephones, regular telephones (without any screen), personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

Figure 3:
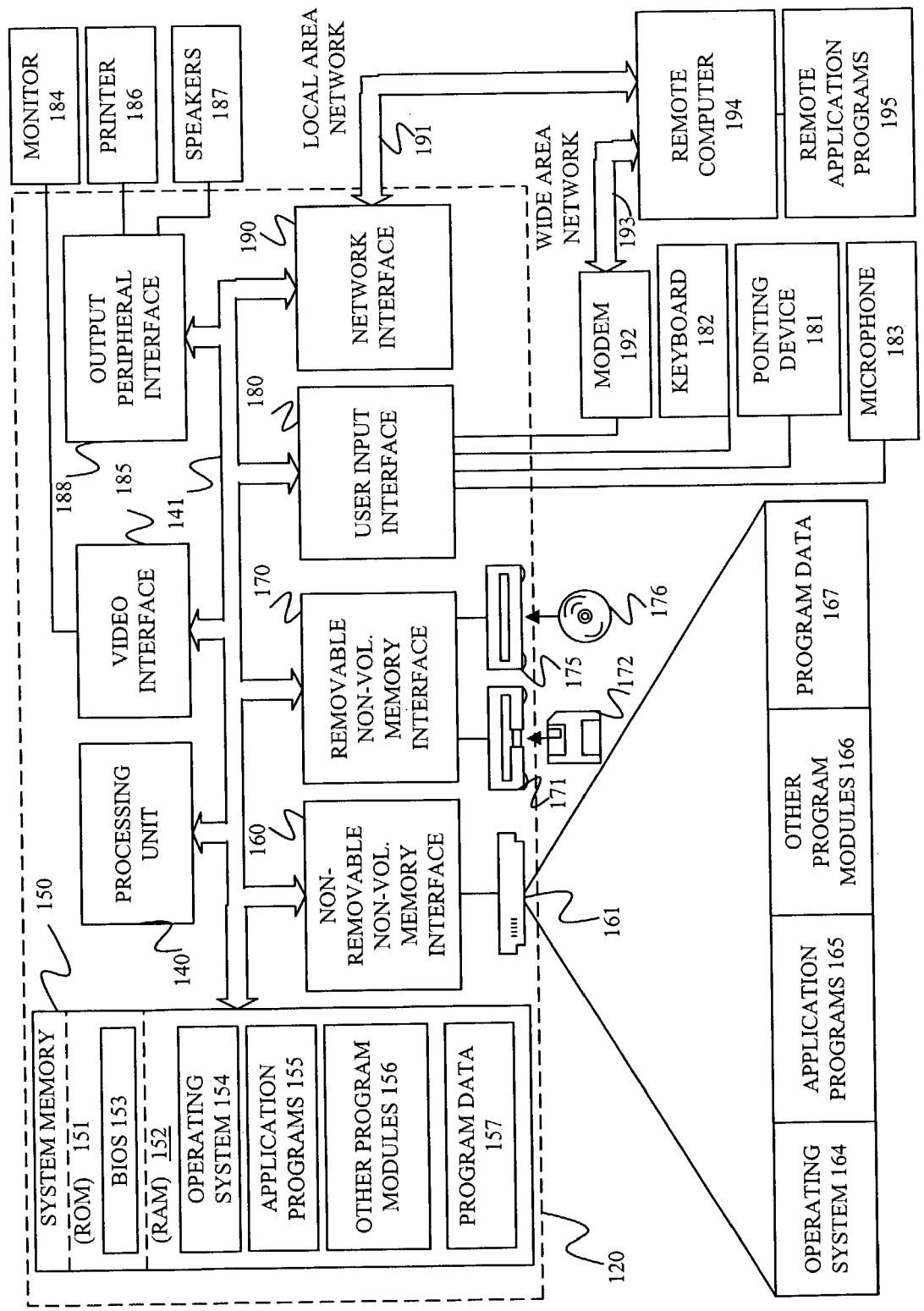
FIG. 3 is a block diagram of a general purpose computer.

The following is a brief description of a general purpose computer 120 illustrated in FIG. 3. However, the computer 120 is again only one example of a suitable computing environment and is not intended to suggest any limitation as to the scope of use or functionality of the invention. Neither should the computer 120 be interpreted as having any dependency or requirement relating to any one or combination of components illustrated therein.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable medium.

With reference to FIG. 3, components of computer 120 may include, but are not limited to, a processing unit 140, a system memory 150, and a system bus 141 that couples various system components including the system memory to the processing unit 140. The system bus 141 may be any of several types of bus structures including a memory bus or memory controller, a peripheral bus, and a local bus using any of a variety of bus architectures. By way of example, and not limitation, such architectures include Industry Standard Architecture (ISA) bus, Universal Serial Bus (USB), Micro Channel Architecture (MCA) bus, Enhanced ISA (EISA) bus, Video Electronics Standards Association (VESA) local bus, and Peripheral Component Interconnect (PCI) bus also known as Mezzanine bus. Computer 120 typically includes a variety of computer readable mediums. Computer readable mediums can be any available media that can be accessed by computer 120 and includes both volatile and nonvolatile media, removable and non-removable media. By way of example, and not limitation, computer readable mediums may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 120.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 150 includes computer storage media in the form of volatile and/or nonvolatile memory such as read only memory (ROM) 151 and random access memory (RAM) 152. A basic input/output system 153 (BIOS), containing the basic routines that help to transfer information between elements within computer 120, such as during start-up, is typically stored in ROM 151. RAM 152 typically contains data and/or program modules that are immediately accessible to and/or presently being operated on by processing unit 140. By way of example, and not limitation, FIG. 3 illustrates operating system 54, application programs 155, other program modules 156, and program data 157.

The computer 120 may also include other removable/non-removable volatile/nonvolatile computer storage media. By way of example only, FIG. 3 illustrates a hard disk drive 161 that reads from or writes to non-removable, nonvolatile magnetic media, a magnetic disk drive 171 that reads from or writes to a removable, nonvolatile magnetic disk 172, and an optical disk drive 175 that reads from or writes to a removable, nonvolatile optical disk 176 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 161 is typically connected to the system bus 141 through a non-removable memory interface such as interface 160, and magnetic disk drive 171 and optical disk drive 175 are typically connected to the system bus 141 by a removable memory interface, such as interface 170.

The drives and their associated computer storage media discussed above and illustrated in FIG. 3, provide storage of computer readable instructions, data structures, program modules and other data for the computer 120. In FIG. 3, for example, hard disk drive 161 is illustrated as storing operating system 164, application programs 165, other program modules 166, and program data 167. Note that these components can either be the same as or different from operating system 154, application programs 155, other program modules 156, and program data 157. Operating system 164, application programs 165, other program modules 166, and program data 167 are given different numbers here to illustrate that, at a minimum, they are different copies.

A user may enter commands and information into the computer 120 through input devices such as a keyboard 182, a microphone 183, and a pointing device 181, such as a mouse, trackball or touch pad. Other input devices (not shown) may include a joystick, game pad, satellite dish, scanner, or the like. These and other input devices are often connected to the processing unit 140 through a user input interface 180 that is coupled to the system bus, but may be connected by other interface and bus structures, such as a parallel port, game port or a universal serial bus (USB). A monitor 184 or other type of display device is also connected to the system bus 141 via an interface, such as a video interface 185. In addition to the monitor, computers may also include other peripheral output devices such as speakers 187 and printer 186, which may be connected through an output peripheral interface 188.

The computer 120 may operate in a networked environment using logical connections to one or more remote computers, such as a remote computer 194. The remote computer 194 may be a personal computer, a hand-held device, a server, a router, a network PC, a peer device or other common network node, and typically includes many or all of the elements described above relative to the computer 120. The logical connections depicted in FIG. 3 include a local area network (LAN) 191 and a wide area network (WAN) 193, but may also include other networks. Such networking environments are commonplace in offices, enterprise-wide computer networks, intranets and the Internet.

When used in a LAN networking environment, the computer 120 is connected to the LAN 191 through a network interface or adapter 190. When used in a WAN networking environment, the computer 120 typically includes a modem 192 or other means for establishing communications over the WAN 193, such as the Internet. The modem 192, which may be internal or external, may be connected to the system bus 141 via the user input interface 180, or other appropriate mechanism. In a networked environment, program modules depicted relative to the computer 120, or portions thereof, may be stored in the remote memory storage device. By way of example, and not limitation, FIG. 3 illustrates remote application programs 195 as residing on remote computer 194. It will be appreciated that the network connections shown are exemplary and other means of establishing a communications link between the computers may be used.

Exemplary Architecture

Figure 4:
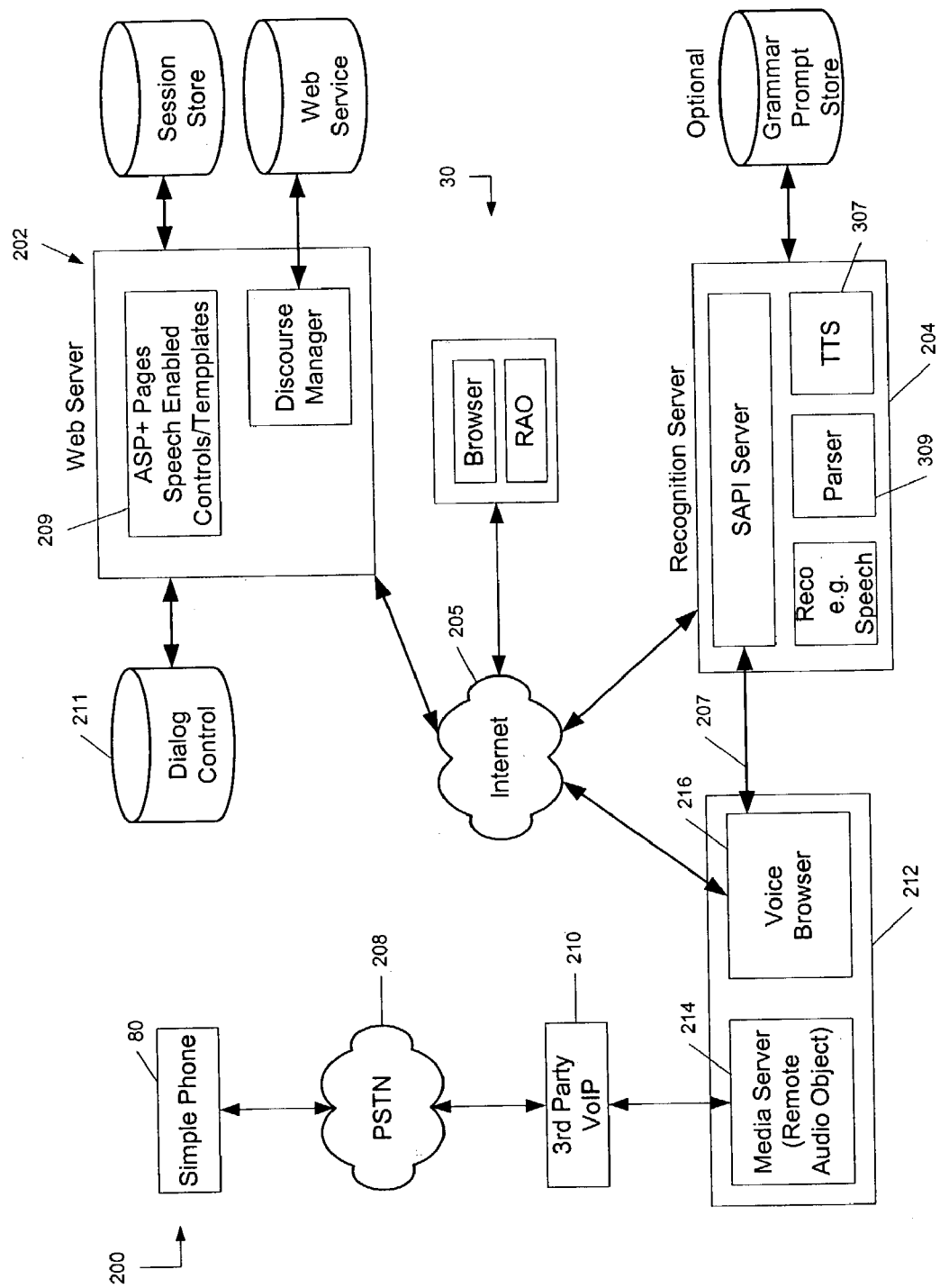
FIG. 4 is a block diagram of an architecture for a client/server system.

FIG. 4 illustrates architecture 200 for web based recognition as can be used with the present invention. Generally, information stored in a web server 202 can be accessed through mobile device 30 (which herein also represents other forms of computing devices having a display screen, a microphone, a camera, a touch sensitive panel, etc., as required based on the form of input), or through phone 80 wherein information is requested audibly or through tones generated by phone 80 in response to keys depressed and wherein information from web server 202 is provided only audibly back to the user.

In this exemplary embodiment, Architecture 200 is unified in that whether information is obtained through device 30 or phone 80 using speech recognition, a single recognition server 204 can support either mode of operation. In addition, architecture 200 operates using an extension of well-known markup languages (e.g. HTML, XHTML, cHTML, XML, WML, and the like). Thus, information stored on web server 202 can also be accessed using well-known GUI methods found in these markup languages. By using an extension of well-known markup languages, authoring on the web server 202 is easier, and legacy applications currently existing can be also easily modified to include voice or other forms of recognition.

Generally, device 30 executes HTML+ scripts, or the like, provided by web server 202. When voice recognition is required, by way of example, speech data, which can be digitized audio signals or speech features wherein the audio signals have been preprocessed by device 30 as discussed above, are provided to recognition server 204 with an indication of a grammar or language model to use during speech recognition. The implementation of the recognition server 204 can take many forms, one of which is illustrated, but generally includes a recognizer 211. The results of recognition are provided back to device 30 for local rendering if desired or appropriate. Upon compilation of information through recognition and any graphical user interface if used, device 30 sends the information to web server 202 for further processing and receipt of further HTML scripts, if necessary.

As illustrated in FIG. 4, device 30, web server 202 and recognition server 204 are commonly connected, and separately addressable, through a network 205, herein a wide area network such as the Internet. It therefore is not necessary that any of these devices be physically located adjacent to each other. In particular, it is not necessary that web server 202 includes recognition server 204. In this manner, authoring at web server 202 can be focused on the application to which it is intended without the authors needing to know the intricacies of recognition server 204. Rather, recognition server 204 can be independently designed and connected to the network 205, and thereby, be updated and improved without further changes required at web server 202. As discussed below, web server 202 can also include an authoring mechanism that can dynamically generate client-side markups and scripts. In a further embodiment, the web server 202, recognition server 204 and client 30 may be combined depending on the capabilities of the implementing machines. For instance, if the client comprises a general purpose computer, e.g. a personal computer, the client may include the recognition server 204. Likewise, if desired, the web server 202 and recognition server 204 can be incorporated into a single machine.

Access to web server 202 through phone 80 includes connection of phone 80 to a wired or wireless telephone network 208, that in turn, connects phone 80 to a third party gateway 210. Gateway 210 connects phone 80 to a telephony voice browser 212. Telephone voice browser 212 includes a media server 214 that provides a telephony interface and a voice browser 216. Like device 30, telephony voice browser 212 receives HTML scripts or the like from web server 202. In one embodiment, the HTML scripts are of the form similar to HTML scripts provided to device 30. In this manner, web server 202 need not support device 30 and phone 80 separately, or even support standard GUI clients separately. Rather, a common markup language can be used. In addition, like device 30, voice recognition from audible signals transmitted by phone 80 are provided from voice browser 216 to recognition server 204, either through the network 205, or through a dedicated line 207, for example, using TCP/IP. Web server 202, recognition server 204 and telephone voice browser 212 can be embodied in any suitable computing environment such as the general purpose desktop computer illustrated in FIG. 3.

However, it should be noted that if DTMF recognition is employed, this form of recognition would generally be performed at the media server 214, rather than at the recognition server 204. In other words, the DTMF grammar would be used by the media server 214.

Referring back to FIG. 4, web server 202 can include a server side plug-in authoring tool or module 209 (e.g. ASP, ASP+, ASP.Net by Microsoft Corporation, JSP, Javabeans, or the like). Server side plug-in module 209 can dynamically generate client-side markups and even a specific form of markup for the type of client accessing the web server 202. The client information can be provided to the web server 202 upon initial establishment of the client/server relationship, or the web server 202 can include modules or routines to detect the capabilities of the client device. In this manner, server side plug-in module 209 can generate a client side markup for each of the voice recognition scenarios, i.e. voice only through phone 80 or multimodal for device 30. By using a consistent client side model, application authoring for many different clients is significantly easier.

In addition to dynamically generating client side markups, high-level dialog modules, discussed below, can be implemented as a server-side control stored in store 211 for use by developers in application authoring. In general, the high-level dialog modules 211 would generate dynamically client-side markup and script in both voice-only and multimodal scenarios based on parameters specified by developers. The high-level dialog modules 211 can include parameters to generate client-side markups to fit the developers' needs.

Exemplary Client Side Extensions

Before describing dynamic generation of client-side markups to which the present invention is directed, it may be helpful to first discuss an exemplary form of extensions to the markup language for use in web based recognition.

As indicated above, the markup languages such as HTML, XHTML cHTML, XML, WML or any other SGML-derived markup, which are used for interaction between the web server 202 and the client device 30, are extended to include controls and/or objects that provide recognition in a client/server architecture. Generally, controls and/or objects can include one or more of the following functions: recognizer controls and/or objects for recognizer configuration, recognizer execution and/or post-processing; synthesizer controls and/or objects for synthesizer configuration and prompt playing; grammar controls and/or objects for specifying input grammar resources; and/or binding controls and/or objects for processing recognition results. The extensions are designed to be a lightweight markup layer, which adds the power of an audible, visual, handwriting, etc. interface to existing markup languages. As such, the extensions can remain independent of: the high-level page in which they are contained, e.g. HTML; the low-level formats which the extensions used to refer to linguistic resources, e.g. the text-to-speech and grammar formats; and the individual properties of the recognition and speech synthesis platforms used in the recognition server 204. Although speech recognition will be discussed below, it should be understood that the techniques, tags and server side controls described hereinafter can be similarly applied in handwriting recognition, gesture recognition and image recognition.

In the exemplary embodiment, the extensions (also commonly known as "tags") are a small set of XML elements, with associated attributes and DOM object properties, events and methods, which may be used in conjunction with a source markup document to apply a recognition and/or audible prompting interface, DTMF or call control to a source page. The extensions' formalities and semantics are independent of the nature of the source document, so the extensions can be used equally effectively within HTML, XHTML, cHTML, XML, WML, or with any other SGML-derived markup. The extensions follow the document object model wherein new functional objects or elements, which can be hierarchical, are provided. Each of the elements are discussed in detail in the Appendix, but generally the elements can include attributes, properties, methods, events and/or other "child" elements.

At this point, it should also be noted that the extensions may be interpreted in two different "modes" according to the capabilities of the device upon which the browser is being executed on. In a first mode, "object mode", the full capabilities are available. The programmatic manipulation of the extensions by an application is performed by whatever mechanisms are enabled by the browser on the device, e.g. a JScript interpreter in an XHTML browser, or a WMLScript interpreter in a WML browser. For this reason, only a small set of core properties and methods of the extensions need to be defined, and these manipulated by whatever programmatic mechanisms exist on the device or client side. The object mode provides eventing and scripting and can offer greater functionality to give the dialog author a much finer client-side control over speech interactions. As used herein, a browser that supports full event and scripting is called an "uplevel browser". This form of a browser will support all the attributes, properties, methods and events of the extensions. Uplevel browsers are commonly found on devices with greater processing capabilities.

The extensions can also be supported in a "declarative mode". As used herein, a browser operating in a declarative mode is called a "downlevel browser" and does not support full eventing and scripting capabilities. Rather, this form of browser will support the declarative aspects of a given extension (i.e. the core element and attributes), but not all the DOM (document object model) object properties, methods and events. This mode employs exclusively declarative syntax, and may further be used in conjunction with declarative multimedia synchronization and coordination mechanisms (synchronized markup language) such as SMIL (Synchronized Multimedia Integration Language) 2.0. Downlevel browsers will typically be found on devices with limited processing capabilities.

At this point though, a particular mode of entry should be discussed. In particular, use of speech recognition in conjunction with at least a display and, in a further embodiment, a pointing device as well which enables the coordination of multiple modes of input, e.g. to indicate the fields for data entry, is particularly useful. Specifically, in this mode of data entry, the user is generally able to coordinate the actions of the pointing device with the speech input, so for example the user is under control of when to select a field and provide corresponding information relevant to the field. For instance, a credit card submission graphical user interface (GUI) is illustrated in FIG. 5, a user could first decide to enter the credit card number in field 252 and then enter the type of credit card in field 250 followed by the expiration date in field 254. Likewise, the user could return back to field 252 and correct an errant entry, if desired. When combined with speech recognition, an easy and natural form of navigation is provided. As used herein, this form of entry using both a screen display allowing free form actions of the pointing device on the screen, e.g. the selection of fields and recognition is called "multimodal".

Referring to FIG. 6, a HTML markup language code is illustrated. The HTML code includes a body portion 270 and a script portion 272. Entry of information in each of the fields 250, 252 and 254 is controlled or executed by code portions 280, 282 and 284, respectively. Referring first to code portion 280, on selection of field 250, for example, by use of stylus 33 of device 30, the event "onclick" is initiated which calls or executes function "talk" in script portion 272. This action activates a grammar used for speech recognition that is associated with the type of data generally expected in field 250. This type of interaction, which involves more than one technique of input (e.g. voice and pen-click/roller) is referred as "multimodal".

Referring now back to the grammar, the grammar is a syntactic grammar such as but not limited to a context-free grammar, a N-grammar or a hybrid grammar. (Of course, DTMF grammars, handwriting grammars, gesture grammars and image grammars would be used when corresponding forms of recognition are employed. As used herein, a "grammar" includes information for performing recognition, and in a further embodiment, information corresponding to expected input to be entered, for example, in a specific field.) A control 290 (herein identified as "reco") includes various elements, two of which are illustrated, namely a grammar element "grammar" and a "bind" element. Generally, like the code downloaded to a client from web server 202, the grammars can originate at web server 202 and be downloaded to the client and/or forwarded to a remote server for speech processing. The grammars can then be stored locally thereon in a cache. Eventually, the grammars are provided to the recognition server 204 for use in recognition. The grammar element is used to specify grammars, either inline or referenced using an attribute.

Upon receipt of recognition results from recognition server 204 corresponding to the recognized speech, handwriting, gesture, image, etc., syntax of reco control 290 is provided to receive the corresponding results and associate it with the corresponding field, which can include rendering of the text therein on display 34. In the illustrated embodiment, upon completion of speech recognition with the result sent back to the client, it deactivates the reco object and associates the recognized text with the corresponding field. Portions 282 and 284 operate similarly wherein unique reco objects and grammars are called for each of the fields 252 and 254 and upon receipt of the recognized text is associated with each of the fields 252 and 254. With respect to receipt of the card number field 252, the function "handle" checks the length of the card number with respect to the card type.

Generation of Client Side Markups

As indicated above, server side plug-in module 209 outputs client side markups when a request has been made from the client device 30. In short, the server side plug-in module 209 allows the website, and thus, the application and services provided by the application to be defined or constructed. The instructions in the server side plug-in module 209 are made of a complied code. The code is run when a web request reaches the web server 202. The server side plug-in module 209 then outputs a new client side markup page that is sent to the client device 30. As is well known, this process is commonly referred to as rendering. The server side plug-in module 209 operates on "controls" that abstract and encapsulate the markup language, and thus, the code of the client side markup page. Such controls that abstract and encapsulate the markup language and operate on the webserver 202 include or are equivalent to "Servlets" or "Server-side plug ins" to name a few.

As is known, server side plug-in modules of the prior art can generate client side markup for visual rendering and interaction with the client device 30. Three different approaches are provided herein for extending the server side plug-in module 209 to include recognition and audible prompting extensions such as the exemplary client side extensions discussed above. In a first approach illustrated schematically in FIG. 7, the current, visual, server side controls (which include parameters for visual display such as location for rendering, font, foreground color, background color, etc.) are extended to include parameters or attributes for recognition and audibly prompting for related recognition. Using speech recognition and associated audible prompting by way of example, the attributes generally pertain to audible prompting parameters such as whether the prompt comprises inline text for text-to-speech conversion, playing of a prerecorded audio file (e.g. a wave file), the location of the data (text for text-to-speech conversion or a prerecorded audio file) for audible rendering, etc. For recognition, the parameters or attributes can include the location of the grammar to be used during recognition, confidence level thresholds, etc. Since the server side plug-in module 209 generates client side markup, the parameters and attributes for the controls for the server side plug-in module 209 relate to the extensions provided in the client side markup for recognition and/or audible prompting.

Figure 7:
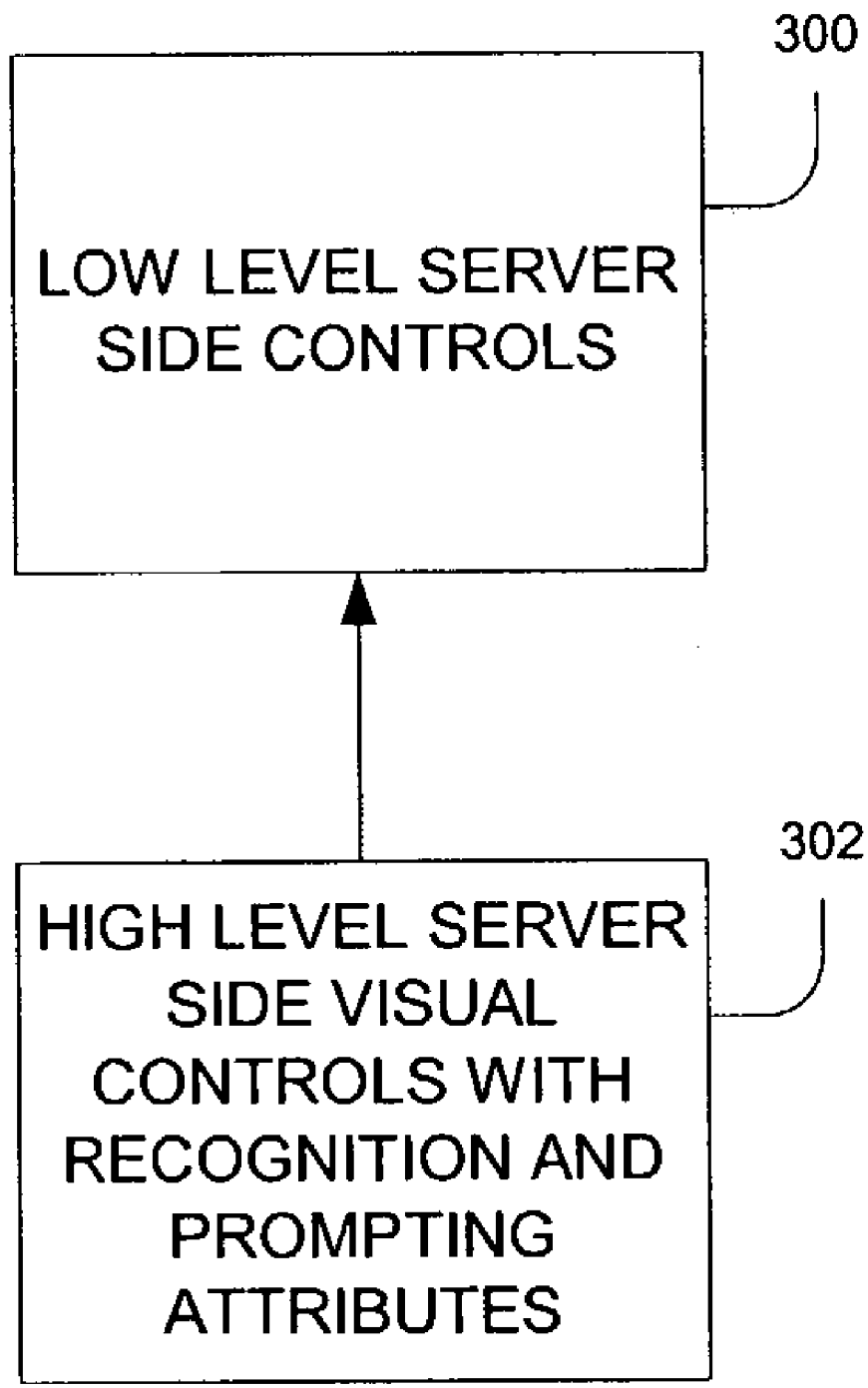
FIG. 7 is a block diagram illustrating a first approach for providing recognition and audible prompting in client side markups.

The controls indicated at 300A in FIG. 7 are controls, which are well-known in website application development or authoring tools such as ASP, ASP+, ASP.Net, JSP, Javabeans, or the like. Such controls are commonly formed in a library and used by controls 302 to perform a particular visual task. Library 300A includes methods for generating the desired client markup, event handlers, etc. Examples of visual controls 302 include a "Label" control that provides a selected text label on a visual display such as the label "Credit Card Submission" 304 in FIG. 5. Another example of a higher level visual control 302 is a "Textbox", which allows data to be entered in a data field such as is indicated at 250 in FIG. 5. The existing visual controls 302 are also well-known. In the first approach for extending server side plug-in module controls to include recognition and/or audible prompting, each of the visual controls 302 would include further parameters or attributes related to recognition or audible prompting. In the case of the "label" control, which otherwise provides selected text on a visual display, further attributes may include whether an audio data file will be rendered or text-to-speech conversion will be employed as well as the location of this data file. A library 300B, similar to library 300A, includes further markup information for performing recognition and/or audible prompting. Each of the visual controls 302 is coded so as to provide this information to the controls 300B as appropriate to perform the particular task related to recognition or audible prompting.

As another example, the "Textbox" control, which generates an input field on a visual display and allows the user of the client device 30 to enter information, would also include appropriate recognition or audible prompting parameters or attributes such as the grammar to be used for recognition. It should be noted that the recognition or audible prompting parameters are optional and need not be used if recognition or audible prompting is not otherwise desired.

In general, if a control at level 302 includes parameters that pertain to visual aspects, the control will access and use the library 300A. Likewise, if the control includes parameters pertaining to recognition and/or audible prompting the control will access or use the library 300B. It should be noted that libraries 300A and 300B have been illustrated separately in order to emphasize the additional information present in library 300B and that a single library having the information of libraries 300A and 300B can be implemented.

In this approach, each of the current or prior art visual controls 302 are extended to include appropriate recognition/audible prompting attributes. The controls 302 can be formed in a library. The server side plug-in module 209 accesses the library for markup information. Execution of the controls generates a client side markup page, or a portion thereof, with the provided parameters.

Figure 8:
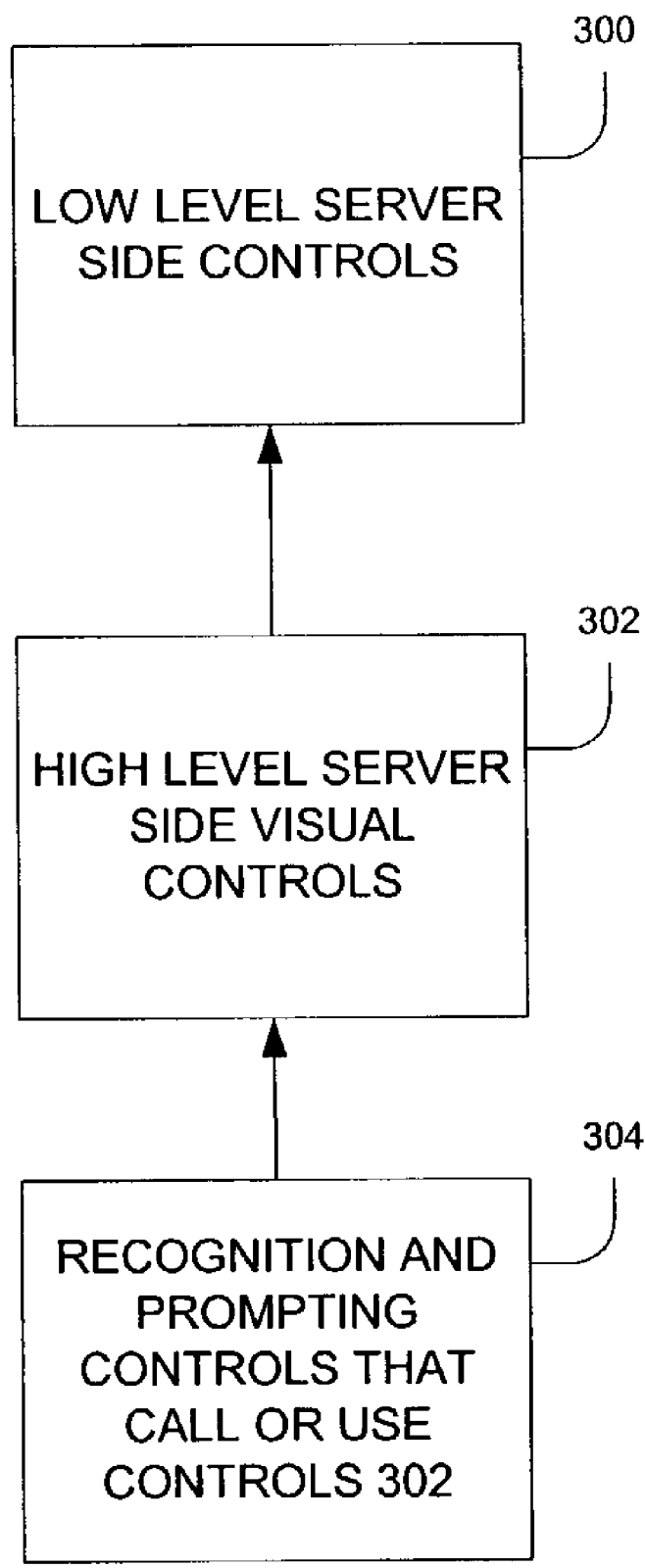
FIG. 8 is a block diagram illustrating a second approach for providing recognition and audible prompting in client side markups.

In a second approach illustrated in FIG. 8, new visual, recognition/audible prompting controls 304 are provided such that the controls 304 are a subclass relative to visual controls 302, wherein recognition/audible prompting functionality or markup information is provided at controls 304. In other words, a new set of controls 304 are provided for recognition/audible prompting and include appropriate parameters or attributes to perform the desired recognition or an audible prompting related to a recognition task on the client device 30. The controls 304 use the existing visual controls 302 to the extent that visual information is rendered or obtained through a display. For instance, a control "SpeechLabel" at level 304 uses the "Label" control at level 302 to provide an audible rendering and/or visual text rendering. Likewise, a "SpeechTextbox" control would associate a grammar and related recognition resources and processing with an input field. Like the first approach, the attributes for controls 304 include where the grammar is located for recognition, the inline text for text-to-speech conversion, or the location of a prerecorded audio data file that will be rendered directly or a text file through text-to-speech conversion. The second approach is advantageous in that interactions of the recognition controls 304 with the visual controls 302 are through parameters or attributes, and thus, changes in the visual controls 302 may not require any changes in the recognition controls 304 provided the parameters or attributes interfacing between the controls 304 and 302 are still appropriate. However, with the creation of further visual controls 302, a corresponding recognition/audible prompting control at level 304 may also have to be written.

Figure 9:
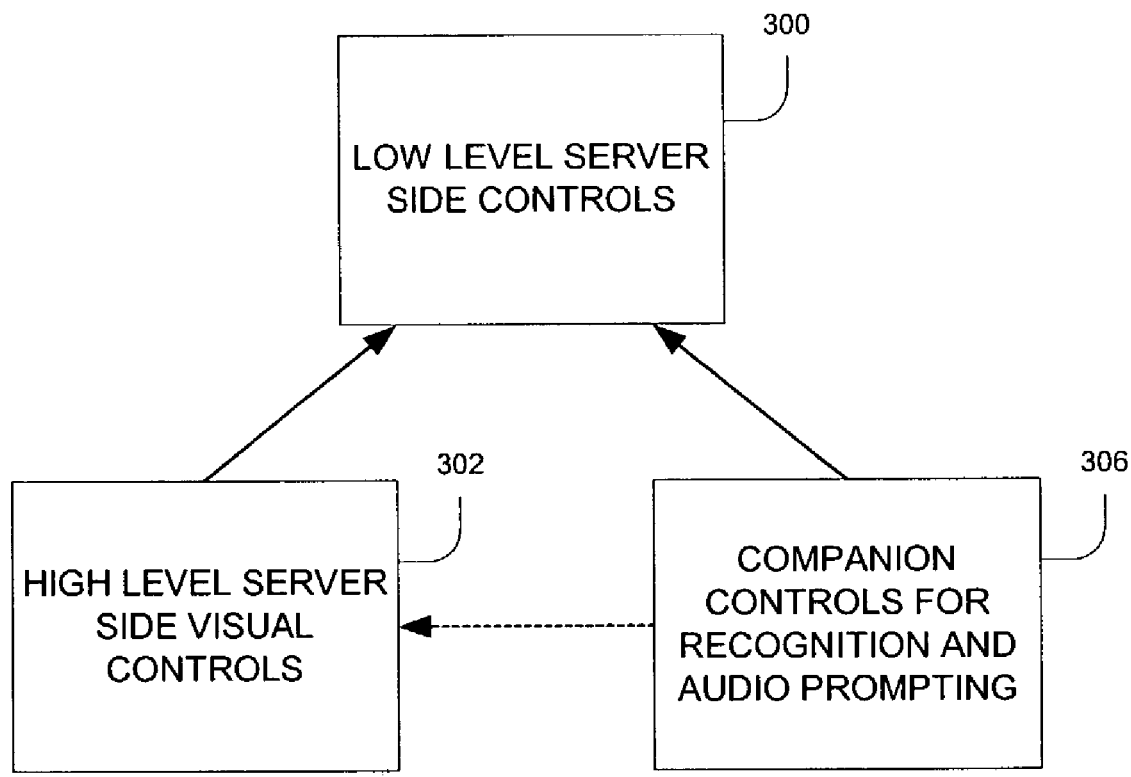
FIG. 9 is a block diagram illustrating a third approach for providing recognition and audible prompting in client side markups.

A third approach is illustrated in FIG. 9. Generally, controls 306 of the third approach are separate from the visual controls 302, but are associated selectively therewith as discussed below. In this manner, the controls 306 do not directly build upon the visual controls 302, but rather provide recognition/audible prompting enablement without having to rewrite the visual controls 302. The controls 306, like the controls 302, use a library 300. In this embodiment, library 300 includes both visual and recognition/audible prompting markup information and as such is a combination of libraries 300A and 300B of FIG. 7.

There are significant advantages to this third approach. Firstly, the visual controls 302 do not need to be changed in content. Secondly, the controls 306 can form a single module which is consistent and does not need to change according to the nature of the speech-enabled control 302. Thirdly, the process of speech enablement, that is, the explicit association of the controls 306 with the visual controls 302 is fully under the developer's control at design time, since it is an explicit and selective process. This also makes it possible for the markup language of the visual controls to receive input values from multiple sources such as through recognition provided by the markup language generated by controls 306, or through a conventional input device such as a keyboard. In short, the controls 306 can be added to an existing application authoring page of a visual authoring page of the server side plug-in module 209. The controls 306 provide a new modality of interaction (i.e. recognition and/or audible prompting) for the user of the client device 30, while reusing the visual controls' application logic and visual input/output capabilities. In view that the controls 306 can be associated with the visual controls 302 whereat the application logic can be coded, controls 306 may be hereinafter referred to as "companion controls 306" and the visual controls 302 be referred to as "primary controls 302". It should be noted that these references are provided for purposes of distinguishing controls 302 and 306 and are not intended to be limiting. For instance, the companion controls 306 could be used to develop or author a website that does not include visual renderings such as a voice-only website. In such a case, certain application logic could be embodied in the companion control logic.

Figure 10:
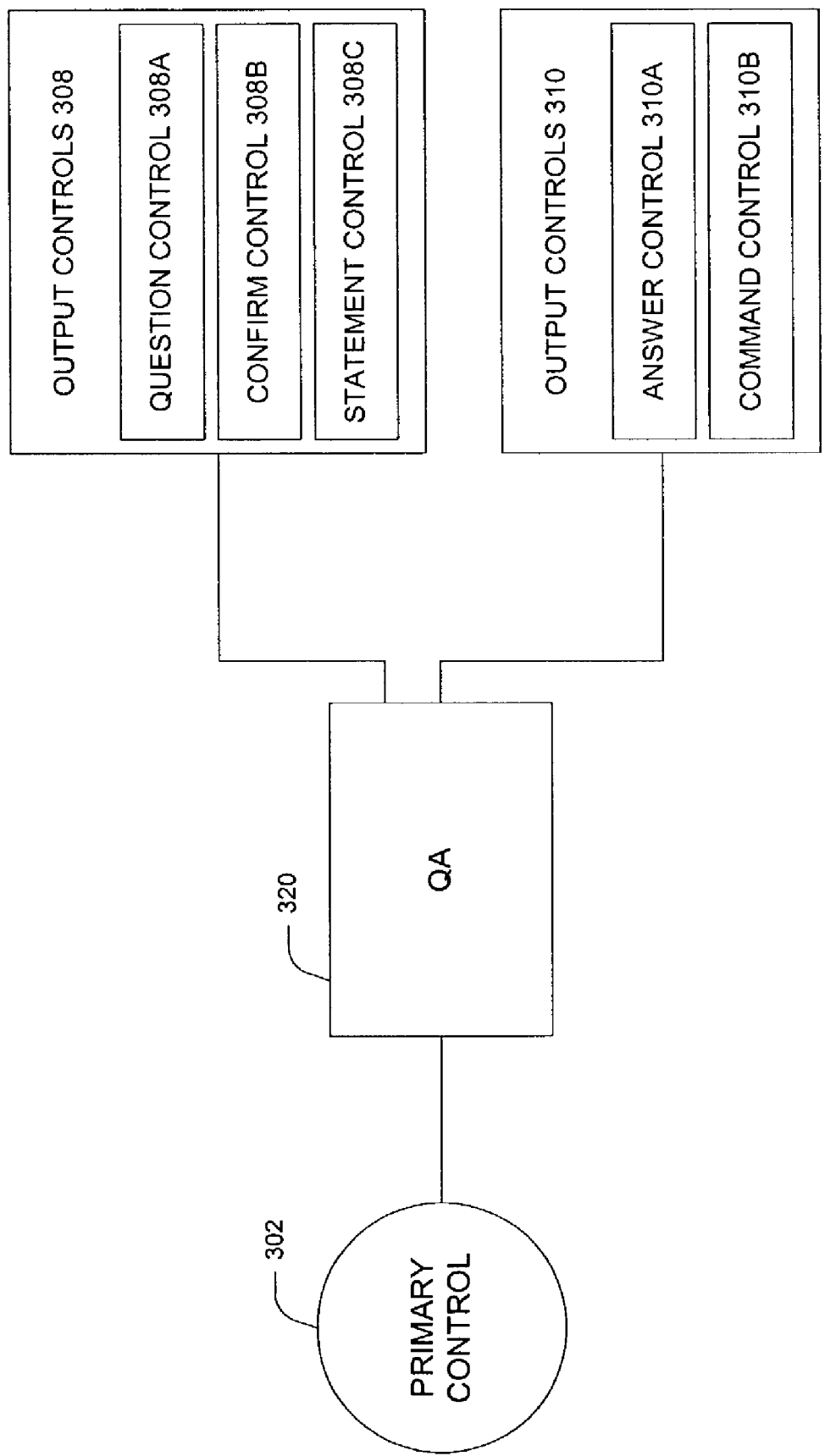
FIG. 10 is a block diagram illustrating companion controls.

A first exemplary set of companion controls 306 are further illustrated in FIG. 10. The set of companion controls 306 can be grouped as output controls 308 and input controls 310. Output controls 308 provide "prompting" client side markups, which typically involves the playing of a prerecorded audio file, or text for text-to-speech conversion, the data included in the markup directly or referenced via a URL. Although a single output control can be defined with parameters to handle all audible prompting, and thus should be considered as a further aspect of the present invention, in the exemplary embodiment, the forms or types of audible prompting in a human dialog are formed as separate controls. In particular, the output controls 308 can include a "Question" control 308A, a "Confirmation" control 308B and a "Statement" control 308C, which will be discussed in detail below. Likewise, the input controls 310 can also form or follow human dialog and include a "Answer" control 310A and a "Command" control 310B. The input controls 310 are discussed below, but generally the input controls 310 associate a grammar with expected or possible input from the user of the client device 30.

Although the question control 308A, confirmation control 308B, statement control 308C, answer control 310A, command control 310B, other controls as well as the general structure of these controls, the parameters and event handlers, are specifically discussed with respect to use as companion controls 306, it should be understood that these controls, the general structure, parameters and event handlers can be adapted to provide recognition and/or audible prompting in the other two approaches discussed above with respect to FIGS. 7 and 8. For instance, the parameter "ClientToSpeechEnable", which comprises one exemplary mechanism to form the association between a companion control and a visual control, would not be needed when embodied in the approaches of FIGS. 7 and 8.

In a multimodal application, at least one of the output controls 308 or one of the input controls 310 is associated with a primary or visual control 302. In the embodiment illustrated, the output controls 308 and input controls 310 are arranged or organized under a "Question/Answer" (hereinafter also "QA") control 320. QA control 320 is executed on the web server 202, which means it is defined on the application development web page held on the web server using the server-side markup formalism (ASP, JSP or the like), but is output as a different form of markup to the client device 30. Although illustrated in FIG. 10 where the QA control appears to be formed of all of the output controls 308 and the input controls 310, it should be understood that these are merely options wherein one or more may be included for a QA control.

Figure 11:
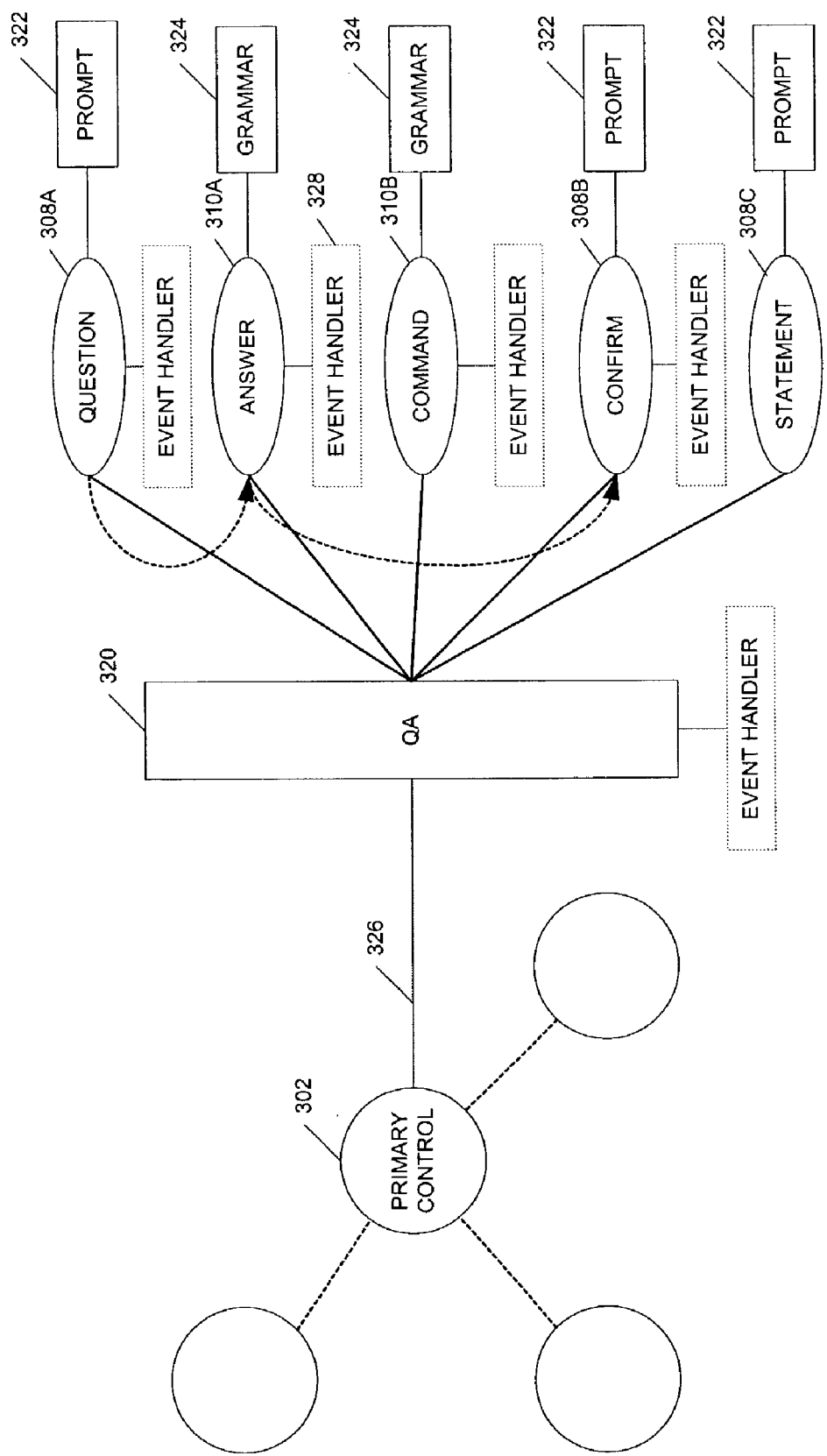
FIG. 11 is a detailed block diagram illustrating companion controls of a first embodiment.

At this point it may be helpful to explain use of the controls 308 and 310 in terms of application scenarios. Referring to FIG. 11 and in a voice-only application QA control 320 could comprise a single question control 308A and an answer control 310A. The question control 308A contains one or more prompt objects or controls 322, while the answer control 310A can define a grammar through grammar object or control 324 for recognition of the input data and related processing on that input. Line 326 represents the association of the QA control 320 with the corresponding primary control 302, if used. In a multimodal scenario, where the user of the client device 30 may touch on the visual textbox, for example with a "TapEvent", an audible prompt may not be necessary. For example, for a primary control comprising a textbox having visual text forming an indication of what the user of client device should enter in the corresponding field, a corresponding QA control 320 may or may not have a corresponding prompt such as an audio playback or a text-to-speech conversion, but would have a grammar corresponding to the expected value for recognition, and event handlers 328 to process the input, or process other recognizer events such as no speech detected, speech not recognized, or events fired on timeouts (as illustrated in "Eventing" below).

In general, the QA control through the output controls 308 and input controls 310 and additional logic can perform one or more of the following: provide output audible prompting, collect input data, perform confidence validation of the input result, allow additional types of input such as "help" commands, or commands that allow the user of the client device to navigate to other selected areas of the website, allow confirmation of input data and control of dialog flow at the website, to name a few. In short, the QA control 320 contains all the controls related to a specific topic. In this manner, a dialog is created through use of the controls with respect to the topic in order to inform to obtain information, to confirm validity, or to repair a dialog or change the topic of conversation.

In one method of development, the application developer can define the visual layout of the application using the visual controls 302. The application developer can then define the spoken interface of the application using companion controls 306 (embodied as QA control 320, or output controls 308 and input control 310). As illustrated in FIGS. 10 and 11, each of the companion controls 306 are then linked or otherwise associated with the corresponding primary or visual control 302 to provide recognition and audible prompting. Of course if desired, the application developer can define or encode the application by switching between visual controls 302 and companion controls 306, forming the links therebetween, until the application is completely defined or encoded.

At this point, it may be helpful to provide a short description of each of the output controls 308 and input controls 310. Detailed descriptions are provided below for this embodiment in Appendix B.

Questions, Answers and Commands

Generally, as indicated above, the question controls 308A and answer controls 310A in a QA control 320 hold the prompt and grammar resources relevant to the primary control 302, and related binding (associating recognition results with input fields of the client-side markup page) and processing logic. The presence, or not, of question controls 308A and answer controls 310A determines whether speech output or recognition input is enabled on activation. Command controls 310B and user initiative answers are activated by specification of the Scope property on the answer controls 310A and command controls 310B.

In simple voice-only applications, a QA control 320 will typically hold one question control or object 308A and one answer control or object 310A. Although not shown in the example below, command controls 310B may also be specified, e.g. Help, Repeat, Cancel, etc., to enable user input which does not directly relate to the answering of a particular question.

A typical 'regular' QA control for voice-only dialog is as follows:

```
<Speech:QA
    id="QA_WhichOne"
    ControlsToSpeechEnable="textBox1"
    runat="server" >
    <Question >
        <prompt> Which one do you want?
    </prompt>
        </Question>
        <Answer >
            <grammar src="whichOne.gram" />
        </Answer>
    </Speech:QA>
```

(The examples provided herein are written in the ASP.Net framework by example only and should not be considered as limiting the present invention.)

In this example, the QA control can be identified by its "id", while the association of the QA control with the desired primary or visual control is obtained through the parameter "ControlsToSpeechEnable", which identifies one or more primary controls by their respective identifiers. If desired, other well-known techniques can be used to form the association. For instance, direct, implicit associations are available through the first and second approaches described above, or separate tables can be created used to maintain the associations. The parameter "runat" instructs the web server that this code should be executed at the webserver 202 to generate the correct markup.

A QA control might also hold only a statement control 308C, in which case it is a prompt-only control without active grammars (e.g. for a welcome prompt). Similarly a QA control might hold only an answer control 310A, in which case it may be a multimodal control, whose answer control 310A activates its grammars directly as the result of an event from the GUI, or a scoped mechanism (discussed below) for user initiative.

It should also be noted that a QA control 320 may also hold multiple output controls 308 and input controls 310 such as multiple question controls 308A and multiple answers controls 310A. This allows an author to describe interactional flow about the same entity within the same QA control. This is particularly useful for more complex voice-only dialogs. So a mini-dialog which may involve different kinds of question and answer (e.g. asking, confirming, giving help, etc.), can be specified within the wrapper of the QA control associated with the visual control which represents the dialog entity. A complex QA control is illustrated in FIG. 11.

The foregoing represent the main features of the QA control. Each feature is described from a functional perspective below.

Answer Control

The answer control 310A abstracts the notion of grammars, binding and other recognition processing into a single object or control. Answer controls 310A can be used to specify a set of possible grammars relevant to a question, along with binding declarations and relevant scripts. Answer controls for multimodal applications such as "Tap-and-Talk" are activated and deactivated by GUI browser events. The following example illustrates an answer control 310A used in a multimodal application to select a departure city on the "mouse-Down" event of the textbox "txtDepCity", and write its value into the primary textbox control:

```
<Speech:QA
        controlsToSpeechEnable="txtDepCity"
    runat="server">
    <Answer    id="AnsDepCity"
           StartEvent="onMouseDown"
           StopEvent="onMouseUp"
           />
        <grammar src="/grammars/depCities.gram"/>
        <bind value="//sml/DepCity"
targetElement="txtCity" />
    </Answer>
</Speech:QA>
```

Typical answer controls 310A in voice-only applications are activated directly by question controls 308A as described below.

The answer control further includes a mechanism to associate a received result with the primary controls. Herein, binding places the values in the primary controls; however, in another embodiment the association mechanism may allow the primary control to look at or otherwise access the recognized results.

Question Control

Question controls 308A abstracts the notion of the prompt tags (Appendix A) into an object which contains a selection of possible prompts and the answer controls 310A which are considered responses to the question. Each question control 308A is able to specify which answer control 310A it activates on its execution. This permits appropriate response grammars to be bundled into answer controls 310A, which reflect relevant question controls 308A.

The following question control 308A might be used in a voice-only application to ask for a Departure City:

```
<Speech:QA id="QADepCity"
        controlsToSpeechEnable="txtDepCity"
    runat="server" >
    <Question id="Q1" Answers="AnsDepCity" >
        <prompt>
            Please give me the departure
            city.
        </prompt>
    </Question>
    <Answer id="AnsDepCity" ... />
</Speech:QA>
```

In the example below, different prompts can be called depending on an internal condition of the question control 308A. The ability to specify conditional tests on the prompts inside a question control 308A means that changes in wording can be accommodated within the same functional unit of the question control 308A.

```
<Speech:QA    id="QADepCity"
        controlsToSpeechEnable="txtDepCity"
    runat="server" >
    <Question id="Q1" Answers="AnsDepCity" >
        <prompt count="1">
            Now I need to get the departure city.
            Where would you like to fly from?
        </prompt>
        <prompt count="2">
            Which departure city?
        </prompt>
    </Question>
    <Answer id="AnsDepCity" ... />
</Speech:QA>
```

Conditional QA Control

The following example illustrates how to determine whether or not to activate a QA control based upon information known to the application. The example is a portion of a survey application. The survey is gathering information from employees regarding the mode of transportation they use to get to work.

The portion of the survey first asks whether or not the user rides the bus to work. If the answer is:

Yes, the next question asks how many days last week the users rode the bus.

No, the "number of days rode the bus" question is bypassed.

```
<asp:Label id="lblDisplay1"
        text="Do you ride the bus to work?"
        runat="server"/>
<asp:DropDownList id="lstRodeBusYN" runat="server">
        <asp:ListItem
selected="true">No</asp:ListItem>
        <asp:ListItem>Yes</asp:ListItem>
</asp:DropDownList>
<Speech:QA id="QA_RideBus"
        ControlsToSpeechEnable="lstRodeBusYN"
        runat="server" >
    <SDN:Question id="Q_RideBus" >
        <prompt bargeIn="False">
        Do you ride the bus to work?
        </prompt>
    </SDN:Question>
    <SDN:Answer id="A_RideBus"
            autobind="False"
            StartEvent="onMouseDown"
            StopEvent="onMouseUp"
            runat="server"
        onClientReco="ProcessRideBusAnswer"
            <grammar src="..." />  <--! "yes/no"
grammar -->
    </SDN:Answer>
</Speech:QA>
<asp:Label id="lblDisplay2"
        enabled="False"
        text="How many days last week did you ride
    the bus to work?"
        runat="server"/>
<asp:DropDownList id="lstDaysRodeBus" enabled="False"
runat="server">
        <asp:ListItem selected="true"
>0</asp:ListItem>
        <asp:ListItem>1</asp:ListItem>
        <asp:ListItem>2</asp:ListItem>
        <asp:ListItem>3</asp:ListItem>
        <asp:ListItem>4</asp:ListItem>
        <asp:ListItem>5</asp:ListItem>
        <asp:ListItem>6</asp:ListItem>
        <asp:ListItem>7</asp:ListItem>
    </asp:DropDownList>
<Speech:QA id="QA_DaysRodeBus"
        ControlsToSpeechEnable="lstDaysRodeBus"
        ClientTest="RideBusCheck"
        runat="server" >
    <Question id="Q_DaysRodeBus" >
        <prompt bargeIn="False">
        How many days last week did you ride the
bus to work?
        </prompt>
    </SDN:Question>
    <SDN:Answer id="A_DaysRodeBus"
            autobind="False"
            StartEvent="onMouseDown"
            StopEvent="onMouseUp"
            runat="server"
        onClientReco="ProcessDaysRodeBusAnswer"
            <grammar src="..." /> <--! "numbers"
grammar -->
    </SDN:Answer>
```

```
</Speech:QA>
<script language="jscript">
    function ProcessRideBusAnswer( ) {
        <--! using SML attribute of the Event object,
determine yes or no answer -->
        <--! then select the appropriate item in the
dropdown listbox -->
        <--! and enable the next label and dropdown
listbox if answer is "yes" -->
            if <--! Answer is "yes" --> {
                lstRodeBusYN.selectedIndex=2
                lblDisplay2.enabled="true"
                lstDaysRodeBus.enabled="true" }
        }
    function RideBusCheck( ) {
        if lstRodeBusYN.selectedIndex="1" <--!
this is no -->
            then return "False"
        endif
    }
    function ProcessDaysRodeBusAnswer( ) {
        <--! case statement to select proper
dropdown item -->
    }
</script>
```

In the example provided above, the QA control "QA_DaysRodeBus" is executed based on a boolean parameter "ClientTest", which in this example, is set based on the function RideBusCheck( ). If the function returns a false condition, the QA control is not activated, whereas if a true condition is returned the QA control is activated. The use of an activation mechanism allows increased flexibility and improved dialog flow in the client side markup page produced. As indicated in Appendix B many of the controls and objects include an activation mechanism.

Command Control

Command controls 310B are user utterances common in voice-only dialogs which typically have little semantic import in terms of the question asked, but rather seek assistance or effect navigation, e.g. help, cancel, repeat, etc. The Command control 310B within a QA control 306 can be used to specify not only the grammar and associated processing on recognition (rather like an answer control 310A without binding of the result to an input field), but also a 'scope' of context and a type. This allows for the authoring of both global and context-sensitive behavior on the client side markup.

As appreciated by those skilled in the art from the foregoing description, controls 306 can be organized in a tree structure similar to that used in visual controls 302. Since each of the controls 306 are also associated with selected visual controls 302, the organization of the controls 306 can be related to the structure of the controls 302.

The QA controls 302 may be used to speech-enable both atomic controls (textbox, label, etc.) and container controls (form, panel, etc.) This provides a way of scoping behaviour and of obtaining modularity of subdialog controls. For example, the scope will allow the user of the client device to navigate to other portions of the client side markup page without completing a dialog.

In one embodiment, "Scope" is determined as a node of the primary controls tree. The following is an example "help" command, scoped at the level of the "Pnl1" container control, which contains two textboxes.

```
<asp:panel id="Pnl1" ...>
    <asp:textbox id="tb1" ... />
    <asp:textbox id="tb2" ... />
```

```
</asp:panel>
<Speech:QA ... >
    <Command
        id="HelpCmd1"
        scope="Pnl1"
        type="help"
        onClientReco="GlobalGiveHelp( )" >
        <Grammar src="grammars/help.gram"/>
    </Command>
</Speech:QA>
<script>
    function GlobalGiveHelp( ) {
        ...
    }
</script>
```

As specified, the "help" grammar will be active in every QA control relating to "Pnl1" and its contents. The GlobalGiveHelp subroutine will execute every time "help" is recognized. To override this and achieve context-sensitive behavior, the same typed command can be scoped to the required level of context:

```
<Speech:QA ... >
    <Command
        id="HelpCmd2"
        scope="Tb2"
        type="help"
        onClientReco="SpecialGiveHelp( )" >
        <Grammar src="grammars/help.gram"/>
    </Command>
</Speech:QA>
<script>
    function SpecialGiveHelp( ) {
        ...
    }
</script>
```

Confirmation Control

The QA control 320 can also include a method for simplifying the authoring of common confirmation subdialogs. The following QA control exemplifies a typical subdialog which asks and then confirms a value:

```
<Speech:QA
    id="qaDepCity"
    controlsToSpeechEnable="txtDepCity"
    runat="server" >
    <!-- asking for a value -->
    <Question       id="AskDepCity"
            type="ask"
            Answers="AnsDepCity" >
        <prompt> Which city? </prompt>
    </Question>
    <Answer     id="AnsDepCity"
            confirmThreshold="60" >
        <grammar src="grammars/depCity.gram"
    />
    </Answer>
    <!-- confirming the value -->
    <Confirm id="ConfirmDepCity"
            Answers="AnsConfDepCity" >
        <prompt>
            Did you say <value
    targetElement="txtDepCity/Text">?
        </prompt>
```

```
        </Confirm>
        <Answer    id="AnsConfDepCity" >
            <grammar
    src="grammars/YesNoDepCity.gram" />
        </Answer>
</Speech:QA>
```

In this example, a user response to 'which city?' which matches the AnsDepCity grammar but whose confidence level does not exceed the confirmThreshold value will trigger the confirm control 308. More flexible methods of confirmation available to the author include mechanisms using multiple question controls and multiple answer controls.

In a further embodiment, additional input controls related to the confirmation control include an accept control, a deny control and a correct control. Each of these controls could be activated (in a manner similar to the other controls) by the corresponding confirmation control and include grammars to accept, deny or correct results, respectively. For instance, users are likely to deny be saying "no", to accept by saying "yes" or "yes+current value" (e.g., "Do you want to go to Seattle?" "Yes, to Seattle"), to correct by saying "no"+new value (e.g., "Do you want to go to Seattle" "No, Pittsburgh").

Statement Control

The statement control allows the application developer to provide an output upon execution of the client side markup when a response is not required from the user of the client device 30. An example could be a "Welcome" prompt played at the beginning of execution of a client side markup page.

An attribute can be provided in the statement control to distinguish different types of information to be provided to the user of the client device. For instance, attributes can be provided to denote a warning message or a help message. These types could have different built-in properties such as different voices. If desired, different forms of statement controls can be provided, i.e. a help control, warning control, etc. Whether provided as separate controls or attributes of the statement control, the different types of statements have different roles in the dialog created, but share the fundamental role of providing information to the user of the client device without expecting an answer back.

Eventing

Event handlers as indicated in FIG. 11 are provided in the QA control 320, the output controls 308 and the input controls 310 for actions/inactions of the user of the client device 30 and for operation of the recognition server 204 to name a few, other events are specified in Appendix B. For instance, mumbling, where the speech recognizer detects that the user has spoken but is unable to recognize the words and silence, where speech is not detected at all, are specified in the QA control 320. These events reference client-side script functions defined by the author. In a multimodal application specified earlier, a simple mumble handler that puts an error message in the text box could be written as follows:

```
<Speech:QA
            controlsToSpeechEnable="txtDepCity"
            onClientNoReco="OnMumble( )"
        runat="server">
    <Answer id="AnsDepCity"
        StartEvent="onMouseDown"
        StopEvent="onMouseUp"
        >
    <grammar src="/grammars/depCities.gram"/>
    <bind value="//sml/DepCity"
        targetElement="txtCity" />
    </Answer>
</Speech:QA>
<script>
        function OnMumble( ) {
            txtDepCity.value="...recognition error...";
        }
</script>
```

Control Execution Algorithm

In one embodiment, a client-side script or module (herein referred to as "RunSpeech") is provided to the client device. The purpose of this script is to execute dialog flow via logic, which is specified in the script when executed on the client device 30, i.e. when the markup pertaining to the controls is activated for execution on the client due to values contained therein. The script allows multiple dialog turns between page requests, and therefore, is particularly helpful for control of voice-only dialogs such as through telephony browser 216. The client-side script RunSpeech is executed in a loop manner on the client device 30 until a completed form in submitted, or a new page is otherwise requested from the client device 30.

It should be noted that in one embodiment, the controls can activate each other (e.g. question control activating a selected answer control) due to values when executed on the client. However, in a further embodiment, the controls can "activate" each other in order to generate appropriate markup, in which case server-side processing may be implemented.

Generally, in one embodiment, the algorithm generates a dialog turn by outputting speech and recognizing user input. The overall logic of the algorithm is as follows for a voice-only scenario:

1. Find next active output companion control;
2. If it is a statement, play the statement and go back to 1;
   If it is a question or a confirm go to 3;
3. Collect expected answers;
4. Collect commands;
5. Play output control and listen in for input;
6. Activate recognized Answer or Command object or, issue an event if none is recognized;
7. Go back to 1.

In the multimodal case, the logic is simplified to the following algorithm:

1. Wait for triggering event—i.e., user tapping on a control;
2. Collect expected answers;
3. Listen in for input;
4. Activate recognized Answer object or, if none, throw event;
5. Go back to 1.

The algorithm is relatively simple because, as noted above, controls contain built-in information about when they can be activated. The algorithm also makes use of the role of the controls in the dialogue. For example statements are played immediately, while questions and confirmations are only played once the expected answers have been collected.

In a further embodiment, implicit confirmation can be provided whereby the system confirms a piece of information and asks a question at the same time. For example the system could confirm the arrival city of a flight and ask for the travel date in one utterance: "When do you want to go to Seattle?" (i.e. asking 'when' and implicitly confirming 'destination: Seattle'). If the user gives a date then the city is considered implicitly accepted since, if the city was wrong, users would have immediately challenged it. In this scenario, it becomes clear that the knowledge of what a user is trying to achieve is vitally important: are they answering the question, or are they correcting the value, or are they asking for help? By using the role of the user input in the dialogue the system can know when to implicitly accept a value.

In summary, a dialog is created due to the role of the control in the dialog and the relationship with other controls, wherein the algorithm executes the controls and thus manages the dialog. Each control contains information based on its type which is used by the execution algorithm to select (i.e. make active for execution) a given control according to whether or not it serves a useful purpose at that point in the dialog on the client. For example, confirmation controls are only active when there is a value to confirm and the system does not have sufficient confidence in that value to proceed. In a further implementation, most of these built-in pieces of information can be overridden or otherwise adapted by application developers.

The following table summarizes the controls, their corresponding role in the dialog and the relationship with other controls.

| Control | Role in dialogue | Relationship with other controls |
|---|---|---|
| Statement | output: present information to users | (none) |
| Question | output: ask question | selects expected Answers as a response |
| Confirmation | output: confirm a value obtained from the user | selects potential input controls as a response, typically Accept, Deny, Correct |
| Control | Role in dialogue | Relationship with other controls |
| Answer | input: provide an answer to a question | selected by Question/Confirmation |
| Command | input: seek to repair a dialog, or change the topic of conversation | scoped to other controls |
| Accept | input: confirm a value in response to a confirmation | selected by a confirmation |
| Deny | input: deny a value in response to a confirmation | selected by a confirmation |
| Correct | input: correct a value in response to a confirmation | selected by a confirmation |
| QA | | (wrapper: contains all the controls related to a specific topic) |

The use of these controls may be explained with an illustration of a simple human/computer dialog. In the dialog below, each dialog turn on the part of the System or the User is characterized according to the control (indicated in parentheses) which reflects its purpose in the dialog.

1. System (Statement): "Welcome to the travel booking service".
2. System (Question): "Where would you like to go?"
3. User (Answer): "San Francisco."
4. System (Confirmation): "Did you say Seattle?"
5. User (Deny): "No."
6. System (Question): "Where would you like to go?"
7. User (Answer): "San Francisco."
8. System (Confirmation): "Did you say Seattle?"
9. User (Correct): "I said San Francisco."
10. System (Confirmation): "Did you say San Francisco?"
11. User (Correct): "Yes."
12. System (Question): "When would you like to leave?"
13. User (Command): "Help."

Turn 1 is a statement on the part of the System. Since a statement control activates no answer controls in response, the system does not expect input. The system goes on to activate a question control at turn 2. This in turn activates a set of possible answer controls, including one which holds a grammar containing the cities available through the service, including "San Francisco", "Seattle", etc., which permits the user to provide such a city in turn 3.

The user's turn 3 is misrecognized by the system. Although the system believes it has a value from an answer control for the city, its confidence in that value is low (rightly so, since it has recognized incorrectly). This low confidence value in a just-received answer control is sufficient information for RunSpeech to trigger a confirmation control on the part of the system, as generated at turn 4. The confirmation control in turn activates a deny control, a correct control and an accept control and makes their respective grammars available to recognize the user's next turn. User turns 5, 9 and 11 illustrate example responses for these controls. Turn 5 of the user simply denies the value "no". This has the effect of removing the value from the system, so the next action of RunSpeech is to ask the question again to re-obtain the value (turn 6).

Turns 7 and 8 return us to a confirmation control as with 3 and 4.

User turn 9 is a correct control, which has again been activated as a possible response to the confirmation control. A correct control not only denies the value undergoing confirmation, it also provides a new value. So user turn 9 is recognized by the system as a correct control with a new value which, correctly this time, is recognized as "San Francisco".

The system's confidence in the new value is low, however, and yet another confirmation control is generated at turn 10. This in turn activates accept, deny and correct controls in response, and user turn 11 ("Yes" matches an accept control grammar. The recognition of the accept control has the effect of 'grounding' the system's belief in the value which it is trying to obtain, and so RunSpeech is now able to select other empty values to obtain. In turn 12, a new question control is output which asks for a date value. The user's response this time (turn 13) is a command: "help". Command controls are typically activated in global fashion, that is, independently of the different question controls and confirmation controls on the part of the system. In this way the user is able to ask for help at any time, as he does in turn 13. Command controls may also be more sensitively enabled by a mechanism that scopes their activation according to which part of the primary control structure is being talked about.

Referring back to the algorithm, in one exemplary embodiment, the client-side script RunSpeech examines the values inside each of the primary controls and an attribute of the QA control, and any selection test of the QA controls on the current page, and selects a single QA control for execution. For example, within the selected QA control, a single question and its corresponding prompt are selected for output, and then a grammar is activated related to typical answers to the corresponding question. Additional grammars may also be activated, in parallel, allowing other commands (or other answers), which are indicated as being allowable. Assuming recognition has been made and any further processing on the input data is complete, the client-side script RunSpeech will begin again to ascertain which QA control should be executed next. An exemplary implementation and algorithm of RunSpeech is provided in Appendix B.

It should be noted that the use of the controls and the RunSpeech algorithm or module is not limited to the client/server application described above, but rather can be adapted for use with other application abstractions. For instance, an application such as VoiceXML, which runs only on the client device 30, could conceivably include further elements or controls such as question and answer provided above as part of the VoiceXML browser and operating in the same manner. In this case the mechanisms of the RunSpeech algorithm described above could be executed by default by the browser without the necessity for extra script. Similarly, other platforms such as finite state machines can be adapted to include the controls and RunSpeech algorithm or module herein described.

Synchronization

As noted above, the companion controls 306 are associated with the primary controls 302 (the existing controls on the page). As such the companion controls 306 can re-use the business logic and presentation capabilities of the primary controls 302. This is done in two ways: storing values in the primary controls 302 and notifying the primary controls of the changes 302.

The companion controls 306 synchronize or associates their values with the primary controls 302 via the mechanism called binding. Binding puts values retrieved from recognizer into the primary controls 302, for example putting text into a textbox, herein exemplified with the answer control. Since primary controls 302 are responsible for visual presentation, this provides visual feedback to the users in multimodal scenarios.

The companion controls 306 also offer a mechanism to notify the primary controls 302 that they have received an input via the recognizer. This allows the primary controls 302 to take actions, such as invoking the business logic. (Since the notification amounts to a commitment of the companion controls 306 to the values which they write into the primary controls 302, the implementation provides a mechanism to control this notification with a fine degree of control. This control is provided by the RejectThreshold and ConfirmThreshold properties on the answer control, which specify numerical acoustic confidence values below which the system should respectively reject or attempt to confirm a value.)

Figure 12:
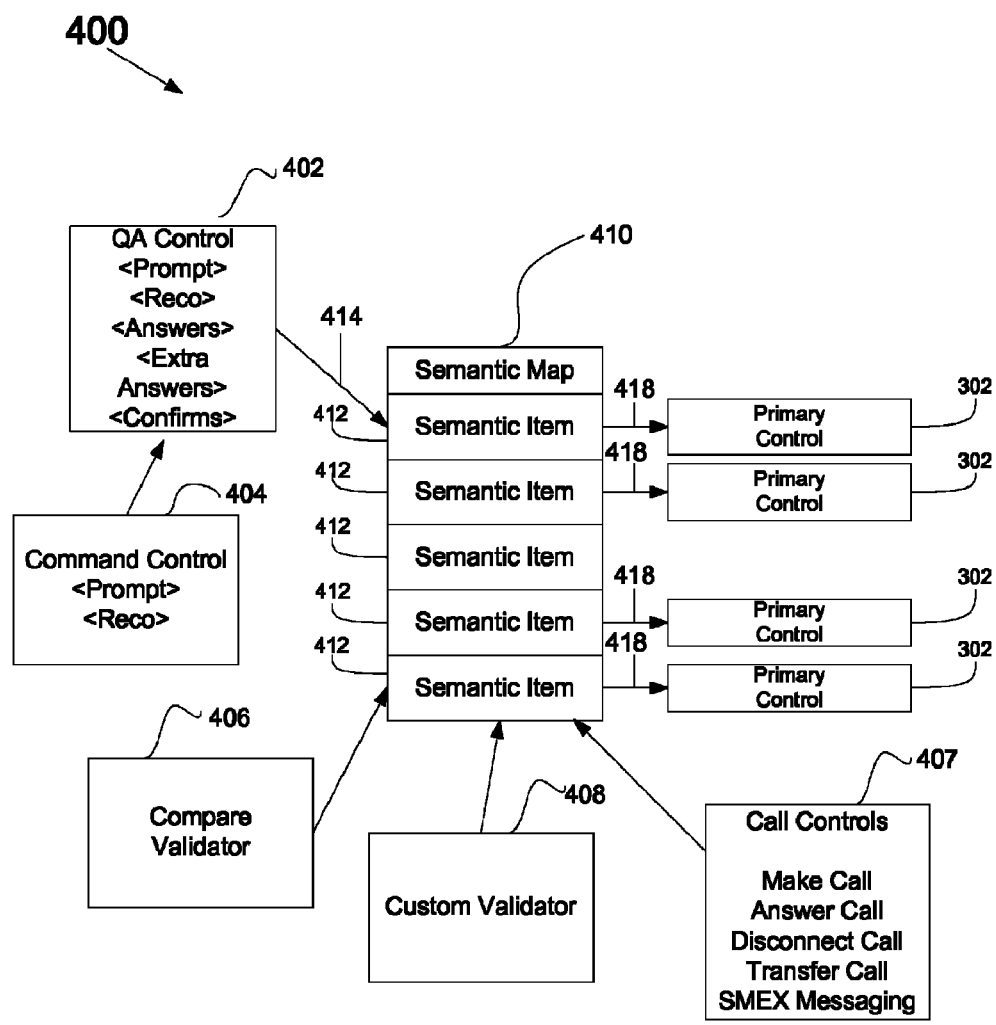
FIG. 12 is a block diagram illustrating companion controls of a second embodiment.

A second exemplary set of companion controls is illustrated in FIG. 12. In this embodiment, the companion controls 400 generally include a QA control 402, a Command control 404, a Compare Validator control 406, a Custom Validator control 408 and a semantic map 410. The semantic map 410 is schematically illustrated and includes semantic items 412 that form a layer between the visual domain primary controls 302 (e.g. HTML) and a non-visual recognition domain of the companion controls 400.

At this point, it should be emphasized that that although the organization of the companion controls QA and Command is different than that of the first set of companion controls discussed above, the functionality remains the same. In particular, the QA control 402 includes a Prompt property that references Prompt objects to perform the functions of output controls, i.e. that provide "prompting" client side markups for human dialog, which typically involves the playing of a prerecorded audio file, or text for text-to-speech conversion, the data included in the markup directly or referenced via a URL. Likewise, the input controls are embodied as the QA control 402 and Command Control 404 and also follow human dialog and include the Prompt property (referencing a Prompt object) and an Answer property that references at least one Answer object. Both the QA control 402 and the Command control 404 associate a grammar with expected or possible input from the user of the client device 30. The QA control 402 in this embodiment can thus be considered a question control, an answer control as well as a confirm control and a statement control since it includes properties necessary for performing these functions.

Although the QA control 402, Command control 404, Compare Validator control 406 and Custom Validator control 408 and other controls as well as the general structure of these controls, the parameters and event handlers, are specifically discussed with respect to use as companion controls 400, it should be understood that these controls, the general structure, parameters and event handlers can be adapted to provide recognition and/or audible prompting in the other two approaches discussed above with respect to FIGS. 7 and 8. For instance, the Semantic Map 410, which comprises another exemplary mechanism to form the association between the companion controls and visual control 302, would not be needed when embodied in the approaches of FIGS. 7 and 8.

At this point, it may be helpful to provide a short description of each of the controls. Detailed descriptions are provided below in Appendix C.

QA Control

In general, the QA control 402 through the properties illustrated can perform one or more of the following: provide output audible prompting, collect input data, perform confidence validation of the input result, allow confirmation of input data and aid in control of dialog flow at the website, to name a few. In other words, the QA control 402 contains properties that function as controls for a specific topic.

The QA control 402, like the other controls, is executed on the web server 202, which means it is defined on the application development web page held on the web server using the server-side markup formalism (ASP, JSP or the like), but is output as a different form of markup to the client device 30. Although illustrated in FIG. 12 where the QA control appears to be formed of all of the properties Prompt, Reco, Answers, ExtraAnswers and Confirms, it should be understood that these are merely options wherein one or more may be included for a QA control.

At this point it may be helpful to explain use of the QA controls 402 in terms of application scenarios. Referring to FIG. 12 and in a voice-only application QA control 402 could function as a question and an answer in a dialog. The question would be provided by a Prompt object, while a grammar is defined through grammar object for recognition of the input data and related processing on that input. An Answers property associates the recognized result with a SemanticItem 412 in the Semantic Map 410 using an Answer object, which contains information on how to process recognition results. Line 414 represents the association of the QA control 402 with the Semantic Map 410, and to a SemanticItem 412 therein. Many SemanticItems 412 are individually associated with a visual or primary control 302 as represented by line 418, although one or more SemanticItems 412 may not be associated with a visual control and used only internally. In a multimodal scenario, where the user of the client device 30 may touch on the visual textbox, for example with a "TapEvent", an audible prompt may not be necessary. For example, for a primary control comprising a textbox having visual text forming an indication of what the user of client device should enter in the corresponding field, a corresponding QA control 402 may or may not have a corresponding prompt such as an audio playback or a text-to-speech conversion, but would have a grammar corresponding to the expected value for recognition, and event handlers to process the input, or process other recognizer events such as no speech detected, speech not recognized, or events fired on timeouts.

In a further embodiment, the recognition result includes a confidence level measure indicating the level of confidence that the recognized result was correct. A confirmation threshold can also be specified in the Answer object, for example, as ConfirmThreshold equals 0.7. If the confirmation level exceeds the associated threshold, the result can be considered confirmed.

It should also be noted that in addition, or in the alternative, to specifying a grammar for speech recognition, QA controls and/or Command controls can specify Dtmf (dual tone modulated frequency) grammars to recognize telephone key activations in response to prompts or questions. Appendix C provides details of a Dtmf object that applies a different modality of grammar (a keypad input grammar rather than, for example, a speech input grammar) to the same question. Some of the properties of the Dtmf object include Preflush, which is a flag indicating if "type-ahead" functionality is allowed in order that the user can provide answers to questions before they are asked. Other properties include the number of milliseconds to wait for receiving the first key press, InitialTimeOut, and the number of milliseconds to wait before adjacent key presses, InterdigitTimeOut. Client-side script functions can be specified for execution through other properties, for example, when no key press is received, OnClientSilence, or when the input is not recognized, OnClientNoReco, or when an error is detected OnClientError.

At this point it should be noted that when a Semanticitem 412 of the Semantic map 410 is filled, through recognition for example, speech or Dtmf, several actions can be taken. First, an event can be issued or fired indicating that the value has been "changed". Depending on if the confirmation level was met, another event that can be issued or fired includes a "confirm" event that indicates that the corresponding semantic item has been confirmed. These events are used for controlling dialog.

The Confirms property can also include answer objects having the structure similar to that described above with respect to the Answers property in that it is associated with a SemanticItem 412 and can include a ConfirmThreshold if desired. The Confirms property is not intended to obtain a recognition result per se, but rather, to confirm a result already obtained and ascertain from the user whether the result obtained is correct. The Confirms property is a collection of Answer objects used to assert whether the value of a previously obtained result was correct. The containing QA's Prompt object will inquire about these items, and obtains the recognition result from the associated SemanticItem 412 and forms it in a question such as "Did you say Seattle?" If the user responds with affirmation such as "Yes", the confirmed event is then fired. If the user responds in the negative such as "No", the associated SemanticItem 412 is cleared.

It should be noted in a further embodiment, the Confirms property can also accept corrections after a confirmation prompt has been provided to the user. For instance, in response to a confirmation prompt "Did you say Seattle?" the user may respond "San Francisco" or "No, San Francisco", in which case, the QA control has received a correction. Having information as to which SemanticItem is being confirmed through the Answer object, the value in the SemanticItem can be replaced with the corrected value. It should also be noted that if desired, confirmation can be included in a further prompt for information such as "When did you want to go to Seattle?", where the prompt by the system includes a confirmation for "Seattle" and a further prompt for the day of departure. A response by the user providing a correction to the place of destination would activate the Confirms property to correct the associated semantic item, while a response with only a day of departure would provide implicit confirmation of the destination.

The ExtraAnswers property allows the application author to specify Answer objects that a user may provide in addition to a prompt or query that has been made. For instance, if a travel oriented system prompts a user for a destination city, but the user responds by indicating "Seattle tomorrow", the Answers property that initially prompted the user will retrieve and therefore bind the destination city "Seattle" to the appropriate SemanticItem, while the ExtraAnswers property can process "Tomorrow" as the next succeeding day (assuming that the system knows the current day), and thereby, bind this result to the appropriate SemanticItem in the Semantic Map. The ExtraAnswers property includes one or more Answer objects defined for possible extra information the user may also state. In the example provided above, having also retrieved information as to the day of departure, the system would then not need to reprompt the user for this information, assuming that the confirmation level exceeded the corresponding ConfirmThreshold. If the confirmation level did not exceed the corresponding threshold, the appropriate Confirms property would be activated.

Command Control

Command controls 404 are user utterances common in voice-only dialogs which typically have little semantic import in terms of the question asked, but rather seek assistance or effect navigation, e.g. help, cancel, repeat, etc. The Command control 404 can include a Prompt property to specify a prompt object. In addition, the Command control 404 can be used to specify not only the grammar (through a Grammar property) and associated processing on recognition (rather like an Answer object without binding of the result to an SemanticItem), but also a 'scope' of context and a type. This allows for the authoring of both global and context-sensitive behavior on the client side markup. The Command control 404 allows additional types of input such as "help" commands, or commands that allow the user of the client device to navigate to other selected areas of the website.

CompareValidator Control

The CompareValidator control compares two values according to an operator and takes an appropriate action. The values to be compared can be of any form such as integers, strings of text, etc. The CompareValidator includes a property SematicItemtoValidate that indicates the SemanticItem that will be validated. The SemanticItem to be validated can be compared to a constant or another SemanticItem, where the constant or other SemanticItem is provided by properties ValuetoCompare and SematicItemtoCompare, respectively. Other parameters or properties associated with the CompareValidator include Operator, which defines the comparison to be made and Type, which defines the type of value, for example, integer or string of the semantic items.

If the validation associated with the

CompareValidator control fails, a Prompt property can specify a Prompt object that can be played instructing the user that the result obtained was incorrect. If upon comparison the validation fails, the associated SemanticItem defined by SematicItemtoValidate is indicated as being empty, in order that the system will reprompt the user for a correct value. However, it may be helpful to not clear the incorrect value of the associated SemanticItem in the Semantic Map in the event that the incorrect value will be used in a prompt to the user reiterating the incorrect value. The CompareValidator control can be triggered either when the value of the associated SemanticItem changes value or when the value has been confirmed, depending on the desires of the application author.

CustomValidator Control

The CustomValidator control is similar to the CompareValidator control. A property SematicItemtoValidate indicates the SemanticItem that will be validated, while a property ClientValidationFunction specifies a custom validation routine through an associated function or script. The function would provide a Boolean value "yes" or "no" or an equivalent thereof whether or not the validation failed. A Prompt property can specify a Prompt object to provide indications of errors or failure of the validation. The CustomValidator control can be triggered either when the value of the associated SemanticItem changes value or when the value has been confirmed, depending on the desires of the application author.

Control Execution Algorithm

As in the previous set of controls, a client-side script or module (herein referred to as "RunSpeech") is provided to the client device for the controls of FIG. 12. Again, the purpose of this script is to execute dialog flow via logic, which is specified in the script when executed on the client device 30, i.e. when the markup pertaining to the controls is activated for execution on the client due to values contained therein. The script allows multiple dialog turns between page requests, and therefore, is particularly helpful for control of voice-only dialogs such as through telephony browser 216. The client-side script RunSpeech is executed in a loop manner on the client device 30 until a completed form is submitted, or a new page is otherwise requested from the client device 30.

Generally, in one embodiment, the algorithm generates a dialog turn by outputting speech and recognizing user input. The overall logic of the algorithm is as follows for a voice-only scenario (reference is made to Appendix C for properties or parameters not otherwise discussed above):

1. Find the first active (as defined below) QA, CompareValidator or CustomValidator control in speech index order.
2. If there is no active control, submit the page.
3. Otherwise, run the control.

A QA is considered active if and only if:
1. The QA's clientActivationFunction either is not present or returns true, AND
2. If the Answers property collection is non empty, the State of all of the SemanticItems pointed to by the set of Answers is Empty OR
3. If the Answers property collection is empty, the State at least one SemanticItem in the Confirm array is NeedsConfirmation.

However, if the QA has PlayOnce true and its Prompt has been run successfully (reached OnComplete) the QA will not be a candidate for activation.

A QA is run as follows:
1. If this is a different control than the previous active control, reset the prompt Count value.
2. Increment the Prompt count value
3. If PromptSelectFunction is specified, call the function and set the Prompt's inlinePrompt to the returned string.
4. If a Reco object is present, start it. This Reco should already include any active command grammar.

A Validator (either a CompareValidator or a CustomValidator) is active if:
1. The SemanticItemToValidate has not been validated by this validator and its value has changed.

A CompareValidator is run as follows:
1. Compare the values of the SemanticItemToCompare or ValueToCompare and SemanticItemToValidate according to the validator's Operator.
2. If the test returns false, empty the text field of the SemanticItemToValidate and play the prompt.
3. If the test returns true, mark the SemanticItemToValidate as validated by this validator.

A CustomValidator is run as follows:
1. The ClientValidationFunction is called with the value of the SemanticItemToValidate.
2. If the function returns false, the semanticItem cleared and the prompt is played, otherwise as validated by this validator.

A Command is considered active if and only if:
1. It is in Scope, AND
2. There is not another Command of the same Type lower in the scope tree.

In the multimodal case, the logic is simplified to the following algorithm:
1. Wait for triggering event—i.e., user tapping on a control;
2. Collect expected answers;
3. Listen in for input;
4. Bind result to SemanticItem, or if none, throw event;
5. Go back to 1.

In a multi-model environment, it should be noted that if the user corrects the text box or other input field associated with a visual presentation of the result, the system can update the associated SemanticItem to indicate that the value has been confirmed.

In a further embodiment, controls are provided that enable application authors to create speech applications that handle telephony transactions. In general, the controls implement or invoke well-known telephony transactions such as ECMA (European Computer Manufactures Associated) CSTA (Computer Supported Telecommunication Application) messages, eventing and services. As is known, CSTA specifies application interfaces and protocols for monitoring and controlling calls and devices in a communication network. These calls and devices may support various media and can reside in various network environments such as IP, Switched Circuit Networks and mobile networks.

In the illustrated embodiment, the controls available to the application author include a SmexMessage control (SMEX-Simple Message Exchange), a TransferCall control, a MakeCall control, a DisconnectCall control and an AnswerCall control. Like the controls described above, these controls can be executed on the server so as to generate client-side markup that when executed on the client device perform the desired telephony transaction.

Referring to FIG. 4, the client-side markup generated by server 202 can be executed by voice browser 216, which in turn provides telephony transactions instructions (e.g. CSTA service calls) to the media server 214 and gateway 210 as necessary to perform the desired telephony transaction. Appendix C provides detailed information regarding each of the properties available in the controls. The controls are commonly used in a voice-only mode such as by voice browser 216 in FIG. 4; however, it should be understood that applications can be written also to be executed in an multi-modal client device.

FIG. 12 schematically illustrates the call controls at 407. The call controls 407 described further below are generally used in conjunction with the controls described above such as the QA control 402, Command control 404 and/or validators 406 and 408 to provide audio prompting, if necessary, and perform recognition so as to perform desired telephony transactions.

The SmexMessage control allows application authors to send and receive raw CTSA messages. Like the controls discussed above, the call-related controls include a SpeechIndex property that controls the order of the object within the RunSpeech algorithm. Since the number and types of events generated by sending a message with the SmexMessage control is unknown, the application author should be careful about when the RunSpeech algorithm can continue.

A required property of the SmexMessage control is the CSTA XML message to be sent. Optional client-side functions can be called before the message is sent in order to modify the message, or a client-side function that is called when a SMEX object receives a SMEX event. SmexMessage control may be used to receive incoming telephone calls.

The call-related server-side controls discussed below deal with a single device and a single active call at any given time. If the application author needs to monitor more than one device or handle more than one active call, SmexMessage control can be used by the application author to provide code to handle CSTA messages.

The TransferCall control is used to transfer the current call using CSTA SingleStepTransfer service. Required properties include a device identifier associated with the transfer to endpoint. Other properties can include client-side functions to be called when the call is transferred or when CSTA returns a failed event. In addition, a server-side event can be issued when the called is transferred.

The MakeCall control makes an outbound call to a given number on a given device when the RunSpeech algorithm runs this object. Required properties include an identifier device that the control will use to place the outbound call and the phone number to dial. The server-side events can be issued when a call is connected. Likewise, client-side events can be called when the call is connected or when the call fails as indicated by a CSTA message returning a failed event.

The DisconnectCall control allows application authors to disconnect or terminate telephone calls using CSTA ClearConnection service. If desired, a server-side event can be issued when the call is disconnected and/or a client-side function can be called when the call is disconnected.

The AnswerCall control answers incoming calls on a given device using CSTA AnswerCall Service. In a manner similar to the DisconnectCall control discussed above, a server-side event can be issued when the call is connected, and/or a client-side function can be called when the call is connected.

From the foregoing, a method and system are provided for generating mark-up for client side devices for speech-enabled applications. The same set of controls can be used in three different forms of interaction including Voice-only, Tap-and-talk (multi-modal) and Hands-free (multi-modal). In Voice-only dialogs are provided on a GUI-less browser such as for telephony applications. This kind of application is driven by a dialog-flow manager that runs on the client (RunSpeech). In Tap-and-talk multi-modal dialogs contain a usable GUI without speech output. System prompts are generally not provided and the interaction is managed by the user's click events on the GUI. In Hands-free multi-modal, dialogs use a GUI display and speech input and output. The dialog may be authored for Tap-and-talk, but may still use the RunSpeech algorithm, or other speech controls features, to enable system driven voice prompting, while confirmation is provided visually. Switching between multi-modal/hands-free and voice-only is done by detecting the type of client the controls are talking to. Generally, Hands-free is switched on on-demand.

Although the present invention has been described with reference to preferred embodiments, workers skilled in the art will recognize that changes may be made in form and detail without departing from the spirit and scope of the invention.

APPENDIX A

1 Introduction

The following tags are a set of markup elements that allows a document to use speech as an input or output medium. The tags are designed to be self-contained XML that can be imbedded into any SGML derived markup languages such as HTML, XHTML, cHTML, SMIL, WML and the like. The tags herein conform generally speech application language tags (SALT). SALT is a developing standard for enabling access to information, applications and web services from personal computers, telephones, tablet PCs and wireless mobile devices, for example. The SALT 1.0 specification may be found online at http://www.SALTforum.org. The tags used herein are similar to SAPI 5.0, which are known methods available from Microsoft Corporation of Redmond, Wash. The tags, elements, events, attributes, properties, return values, etc. are merely exemplary and should not be considered limiting. Although exemplified herein for speech and DTMF recognition, similar tags can be provided for other forms of recognition.

The main elements herein discussed are:

```
<prompt ...>        for speech synthesis configuration
and prompt playing
    <reco ...>      for recognizer configuration and
recognition execution and post-processing
    <grammar ...>   for specifying input grammar
resources
    <bind ...>      for processing of recognition results
    <dtmf ...>      for configuration and control of DTMF
```

2 Reco

The Reco element is used to specify possible user inputs and a means for dealing with the input results. As such, its main elements are <grammar>and <bind>, and it contains resources for configuring recognizer properties.

Reco elements are activated programmatically in uplevel browsers via Start and Stop methods, or in SMIL-enabled browsers by using SMIL commands. They are considered active declaratively in downlevel browsers (i.e. non script-supporting browsers) by their presence on the page. In order to permit the activation of multiple grammars in parallel, multiple Reco elements may be considered active simultaneously.

Recos may also take a partcular mode—'automatic', 'single' or 'multiple'—to distinguish the kind of recognition scenarios which they enable and the behaviour of the recognition platform.

2.1 Reco Content

The Reco element contains one or more grammars and optionally a set of bind elements which inspect the results of recognition and copy the relevant portions to values in the containing page.

In uplevel browsers, Reco supports the programmatic activation and deactivation of individual grammar rules. Note also that all top-level rules in a grammar are active by default for a recognition context.

2.1.1 <Grammar> Element

The grammar element is used to specify grammars, either inline or referenced using the src attribute. At least one grammar (either inline or referenced) is typically specified. Inline grammars can be text-based grammar formats, while referenced grammars can be text-based or binary type. Multiple grammar elements may be specified. If more than one grammar element is specified, the rules within grammars are added as extra rules within the same grammar. Any rules with the same name will be overwritten.

Attributes:

src: Optional if inline grammar is specified. URI of the grammar to be included. Note that all top-level rules in a grammar are active by default for a recognition context.

langID: Optional. String indicating which language speech engine should use. The string format follows the xml:lang definition. For example, langID="en-us" denotes US English. This attribute is only effective when the langID is not specified in the grammar URI. If unspecified, defaults to US English.

If the langID is specified in multiple places then langID follows a precedence order from the lowest scope—remote grammar file (i.e language id is specified within the grammar file) followed by grammar element followed by reco element.

```
<grammar src="FromCity.xml" />
    or
<grammar>
    <rule toplevel="active">
        <p>from </p>
        <ruleref name="cities" />
    </rule>
    <rule name="cities" >
        <l>
            <p> Cambridge </p>
            <p> Seattle </p>
            <p> London </p>
        </l>
    </rule>
</grammar>
```

If both a src-referenced grammar and an inline grammar are specified, the inline rules are added to the referenced rules, and any rules with the same name will be overwritten.

2.1.2 <Bind> Element

The bind element is used to bind values from the recognition results into the page.

The recognition results consumed by the bind element can be an XML document containing a semantic markup language (SML) for specifying recognition results. Its contents include semantic values, actual words spoken, and confidence scores. SML could also include alternate recognition choices (as in an N-best recognition result). A sample SML document for the utterance "I'd like to travel from Seattle to Boston" is illustrated below:

```
<sml confidence="40">
    <travel text="I'd like to travel from
Seattle to Boston">
        <origin_city confidence="45"> Seattle
</origin_city>
        <dest_city confidence="35"> Boston
</dest_city>
    </travel>
</sml>
```

Since an in-grammar recognition is assumed to produce an XML document—in semantic markup language, or SML—the values to be bound from the SML document are referenced using an XPath query. And since the elements in the page into which the values will be bound should be are uniquely identified (they are likely to be form controls), these target elements are referenced directly.

Attributes:

targetElement: Required. The element to which the value content from the SML will be assigned (as in W3C SMIL 2.0).

targetAttribute: Optional. The attribute of the target element to which the value content from the SML will be assigned (as with the attributeName attribute in SMIL 2.0). If unspecified, defaults to "value".

test: Optional. An XML Pattern (as in the W3C XML DOM specification) string indicating the condition under which the recognition result will be assigned. Default condition is true.

value: Required. An XPATH (as in the W3C XML DOM specification) string that specifies the value from the recognition result document to be assigned to the target element.

Example:

So given the above SML return, the following reco element uses bind to transfer the values in origin_city and dest_city into the target page elements txtBoxOrigin and txtBoxDest:

```
<input name="txtBoxOrigin" type="text"/>
<input name="txtBoxDest" type="text" />
<reco id="travel">
    <grammar src="./city.xml" />
    <bind targetElement="txtBoxOrigin"
        value="//origin_city" />
    <bind targetElement="txtBoxDest"
        value="//dest_city" />
</reco>
```

This binding may be conditional, as in the following example, where a test is made on the confidence attribute of the dest_city result as a pre-condition to the bind operation:

```
<bind targetElement="txtBoxDest"
    value="//dest_city"
    test="/sml/dest_city[@confidence $gt$ 40]"
/>
```

The bind element is a simple declarative means of processing recognition results on downlevel or uplevel browsers. For more complex processing, the reco DOM object supported by uplevel browsers implements the onReco event handler to permit programmatic script analysis and post-processing of the recognition return.

2.2 Attributes and Properties

The following attributes are supported by all browsers, and the properties by uplevel browsers.

2.2.1 Attributes

The following attributes of Reco are used to configure the speech recognizer for a dialog turn.

initialTimeout: Optional. The time in milliseconds between start of recognition and the detection of speech. This value is passed to the recognition platform, and if exceeded, an onSilence event will be provided from the recognition platform (see 2.4.2). If not specified, the speech platform will use a default value.

babbleTimeout: Optional. The period of time in milliseconds in which the recognizer must return a result after detection of speech. For recos in automatic and single mode, this applies to the period between speech detection and the stop call. For recos in 'multiple' mode, this timeout applies to the period between speech detection and each recognition return—i.e. the period is restarted after each return of results or other event. If exceeded, different events are thrown according to whether an error has occurred or not. If the recognizer is still processing audio—eg in the case of an exceptionally long utterance—the onNoReco event is thrown, with status code 13 (see 2.4.4). If the timeout is exceeded for any other reason, however, a recognizer error is more likely, and the onTimeout event is thrown. If not specified, the speech platform will default to an internal value.

maxTimeout: Optional. The period of time in milliseconds between recognition start and results returned to the browser. If exceeded, the onTimeout event is thrown by the browser—this caters for network or recognizer failure in distributed environments. For recos in 'multiple' mode, as with babbleTimeout, the period is restarted after the return of each recognition or other event. Note that the maxTimeout attribute should be greater than or equal to the sum of initialTimeout and babbleTimeout. If not specified, the value will be a browser default.

endSilence: Optional. For Recos in automatic mode, the period of silence in milliseconds after the end of an utterance which must be free of speech after which the recognition results are returned. Ignored for recos of modes other than automatic. If unspecified, defaults to platform internal value.

reject: Optional. The recognition rejection threshold, below which the platform will throw the 'no reco' event. If not specified, the speech platform will use a default value. Confidence scores range between 0 and 100 (integer). Reject values lie in between.

server: Optional. URI of speech platform (for use when the tag interpreter and recognition platform are not co-located). An example value might be server=protocol://yourspeechplatform. An application writer is also able to provide speech platform specific settings by adding a querystring to the URI string, eg protocol://yourspeechplatform?bargeinEnergyThreshold=0.5.

langID: Optional. String indicating which language speech engine should use. The string format follows the xml:lang definition. For example, langID="en-us" denotes US English. This attribute is only effective when the langID is not specified in the grammar element (see 2.1.1).

mode: Optional. String specifying the recognition mode to be followed. If unspecified, defaults to "automatic" mode.

2.2.2 Properties

The following properties contain the results returned by the recognition process (these are supported by uplevel browsers).

recoResult Read-only. The results of recognition, held in an XML DOM node object containing semantic markup language (SML), as described in 2.1.2, In case of no recognition, the property returns null.

text Read-only. A string holding the text of the words recognized (i.e., a shorthand for contents of the text attribute of the highest level element in the SML recognition return in recoResult.

status: Read-only. Status code returned by the recognition platform. Possible values are 0 for successful recognition, or the failure values −1 to −4 (as defined in the exceptions possible on the Start method (section 2.3.1) and Activate method (section 2.3.4)), and statuses −11 to −15 set on the reception of recognizer events (see 2.4).

2.3 Object Methods

Reco activation and grammar activation may be controlled using the following methods in the Reco's DOM object. With these methods, uplevel browsers can start and stop Reco objects, cancel recognitions in progress, and activate and deactivate individual grammar top-level rules (uplevel browsers only).

2.3.1 Start

The Start method starts the recognition process, using as active grammars all the top-level rules for the recognition context which have not been explicitly deactivated.

Syntax:
  Object.Start( )
Return value:
  None.
Exception:
  The method sets a non-zero status code and fires an onNoReco event when fails. Possible failures include no grammar (reco status=−1), failure to load a grammar, which could be a variety of reasons like failure to compile grammar, non-existent URI (reco status=−2), or speech platform errors (reco status=−3).

2.3.2 Stop

The Stop method is a call to end the recognition process. The Reco object stops recording audio, and the recognizer returns recognition results on the audio received up to the point where recording was stopped. All the recognition resources used by Reco are released, and its grammars deactivated. (Note that this method need not be used explicitly for typical recognitions in automatic mode, since the recognizer itself will stop the reco object on endpoint detection after recognizing a complete sentence.) If the Reco has not been started, the call has no effect.

Syntax:
  Object.Stop( )
Return value:
  None.
Exception:
  None.

2.3.3 Cancel

The Cancel method stops the audio feed to the recognizer, deactivates the grammar and releases the recognizer and discards any recognition results. The browser will disregard a recognition result for canceled recognition. If the recognizer has not been started, the call has no effect.

Syntax:
  Object.Cancel( )
Return value:
  None.
Exception:
  None.

2.3.4 Activate

The Activate method activates a top-level rule in the context free grammar (CFG). Activation must be called before recognition begins, since it will have no effect during a 'Started' recognition process. Note that all the grammar top-level rules for the recognition context which have not been explicitly deactivated are already treated as active.

Syntax:
  Object.Activate(strName);
Parameters:
  strName: Required. Rule name to be activated.
Return value:
  None.
Exception:
  None.

2.3.5 Deactivate

The method deactivates a top-level rule in the grammar. If the rule does not exist, the method has no effect.

Syntax:
   Object.Deactivate(strName);
Parameters:
   strName: Required. Rule name to be deactivated. An empty string deactivates all rules.
Return value
   None.
Exception
   None.

2.4 Reco Events

The Reco DOM object supports the following events, whose handlers may be specified as attributes of the reco element.

2.4.1 onReco:

This event gets fired when the recognizer has a recognition result available for the browser. For recos in automatic mode, this event stops the recognition process automatically and clears resources (see 2.3.2). OnReco is typically used for programmatic analysis of the recognition result and processing of the result into the page.

Syntax:

| Inline HTML | <Reco onReco = "handler" > |
| Event property | Object.onReco = handler; |
| | Object.onReco = GetRef("handler"); |

Event Object Info:

| Bubbles | No |
| To invoke | User says something |
| Default action | Return recognition result object |

Event Properties:

Although the event handler does not receive properties directly, the handler can query the event object for data (see the use of the event object in the example below).

Example

The following XHTML fragment uses onReco to call a script to parse the recognition outcome and assign the values to the proper fields.

```
<input name="txtBoxOrigin" type="text" />
<input name="txtBoxDest" type="text" />
<reco onReco="processCityRecognition( )"/>
    <grammar src="/grammars/cities.xml" />
</reco>
<script><![CDATA[
    function processCityRecognition ( ) {
        smlResult =
event.srcElement.recoResult;
        origNode =
smlResult.selectSingleNode("//origin_city");
        if (origNode != null)
txtBoxOrigin.value = origNode.text;
        destNode =
smlResult.selectSingleNode("//dest_city");
        if (destNode != null) txtBoxDest.value
= destNode.text;
    }
]]></script>
```

2.4.2 onSilence:

onSilence handles the event of no speech detected by the recognition platform before the duration of time specified in the initialTimeout attribute on the Reco (see 2.2.1). This event cancels the recognition process automatically for the automatic recognition mode.

Syntax:

| Inline HTML | <reco onSilence="handler" . . . > |
| Event property (in ECMAScript) | Object.onSilence = handler |
| | Object.onSilence = GetRef("handler"); |

Event Object Info:

| Bubbles | No |
| To invoke | Recognizer did not detect speech within the period specified in the initialTimeout attribute. |
| Default action | Set status = −11 |

Event Properties:

Although the event handler does not receive properties directly, the handler can query the event object for data.

2.4.3 onTimeout onTimeout handles two types of event which typically reflect errors from the speech platform.

It handles the event thrown by the tags interpreter which signals that the period specified in the maxtime attribute (see 2.2.1) expired before recognition was completed. This event will typically reflect problems that could occur in a distributed architecture.

It also handles (ii) the event thrown by the speech recognition platform when recognition has begun but processing has stopped without a recognition within the period specified by babbleTimeout (see 2.2.1).

This event cancels the recognition process automatically.

Syntax:

| Inline HTML | <reco onTimeout="handler" . . . > |
| Event property (in ECMAScript) | Object.onTimeOut = handler |
| | Object.onTimeOut = GetRef("handler"); |

Event Object Info:

| Bubbles | No |
| To invoke | Thrown by the browser when the period set by the maxtime attribute expires before recognition is stopped. |
| Default action | Set reco status to −12. |

Event Properties:

Although the event handler does not receive properties directly, the handler can query the event object for data.

2.4.4 onNoReco:

onNoReco is a handler for the event thrown by the speech recognition platform when it is unable to return valid recognition results. The different cases in which this may happen are distinguished by status code. The event stops the recognition process automatically.

Syntax:

| Inline HTML | <Reco onNoReco ="handler" > |
| Event property | Object.onNoReco = handler; |
| | Object.onNoReco = GetRef("handler"); |

Event Object Info:

| Bubbles | No |
| To invoke | Recognizer detects sound but is unable to interpret the utterance. |
| Default action | Set status property and return null recognition result. Status codes are set as follows: |
| | status -13: sound was detected but no speech was able to be interpreted; |
| | status -14: some speech was detected and interpreted but rejected with insufficient confidence (for threshold setting, see the reject attribute in 2.2.1). |
| | status -15: speech was detected and interpreted, but a complete recognition was unable to be returned between the detection of speech and the duration specified in the babbleTimeout attribute (see 2.2.1). |

Event Properties:

Although the event handler does not receive properties directly, the handler can query the event object for data.

3 Prompt

The prompt element is used to specify system output. Its content may be one or more of the following:

inline or referenced text, which may be marked up with prosodic or other speech output information;

variable values retrieved at render time from the containing document;

links to audio files.

Prompt elements may be interpreted declaratively by downlevel browsers (or activated by SMIL commands), or by object methods on uplevel browsers.

3.1 Prompt Content

The prompt element contains the resources for system output, either as text or references to audio files, or both.

Simple prompts need specify only the text required for output, eg:

```
<prompt id="Welcome">
    Thank you for calling ACME weather report.
</prompt>
```

This simple text may also contain further markup of any of the kinds described below.

3.1.1 Speech Synthesis Markup

Any format of speech synthesis markup language can be used inside the prompt element. (This format may be specified in the 'tts' attribute described in 3.2.1.) The following example shows text with an instruction to emphasize certain words within it:

```
<prompt id="giveBalance">
    You have <emph> five dollars </emph> left in your account.
</prompt>
```

3.1.2 Dynamic Content

The actual content of the prompt may need to be computed on the client just before the prompt is output. In order to confirm a particular value, for example, the value needs to be dereferenced in a variable. The value element may be used for this purpose.

Value Element value: Optional. Retrieves the values of an element in the document.

Attributes:

targetElement: Optional. Either href or targetElement must be specified. The id of the element containing the value to be retrieved.

targetAttribute: Optional. The attribute of the element from which the value will be retrieved.

href: Optional. The URI of an audio segment. href will override targetElement if both are present.

The targetElement attribute is used to reference an element within the containing document. The content of the element whose id is specified by targetElement is inserted into the text to be synthesized. If the desired content is held in an attribute of the element, the targetAttribute attribute may be used to specify the necessary attribute on the targetElement. This is useful for dereferencing the values in HTML form controls, for example. In the following illustration, the "value" attributes of the "txtBoxOrigin" and "txtBoxDest" elements are inserted into the text before the prompt is output

```
<prompt id="Confirm">
    Do you want to travel from
        <value targetElement="txtBoxOrigin" targetAttribute="value" />
    to
        <value targetElement="txtBoxDest" targetAttribute="value" />
    ?
</prompt>
```

3.1.3 Audio Files

The value element may also be used to refer to a pre-recorded audio file for playing instead of, or within, a synthesized prompt. The following example plays a beep at the end of the prompt:

```
<prompt>
    After the beep, please record your message.
    <value href="/wav/beep.wav" />
</prompt>
```

3.1.4 Referenced Prompts

Instead of specifying content inline, the src attribute may be used with an empty element to reference external content via URI, as in:

```
<prompt id="Welcome"
    src="/ACMEWeatherPrompts#Welcome" />
```

The target of the src attribute can hold any or all of the above content specified for inline prompts.

3.2 Attributes and Properties

The prompt element holds the following attributes (downlevel browsers) and properties (downlevel and uplevel browsers).

3.2.1 Attributes tts: Optional. The markup language type for text-to-speech synthesis. Default is "SAPI 5".

src: Optional if an inline prompt is specified. The URI of a referenced prompt (see 3.1.4).

bargein: Optional. Integer. The period of time in milliseconds from start of prompt to when playback can be interrupted by the human listener. Default is infinite, i.e., no bargein is allowed. Bargein=0 allows immediate bargein. This applies to whichever kind of barge-in is supported by platform. Either keyword or energy-based bargein times can be configured in this way, depending on which is enabled at the time the reco is started.

prefetch: Optional. A Boolean flag indicating whether the prompt should be immediately synthesized and cached at browser when the page is loaded. Default is false.

3.2.2 Properties

Uplevel browsers support the following properties in the prompt's DOM object.

bookmark: Read-only. A string object recording the text of the last synthesis bookmark encountered.

status: Read-only. Status code returned by the speech platform.

3.3 Prompt Methods

Prompt playing may be controlled using the following methods in the prompt's DOM object. In this way, uplevel browsers can start and stop prompt objects, pause and resume prompts in progress, and change the speed and volume of the synthesized speech.

3.3.1 Start

Start playback of the prompt. Unless an argument is given, the method plays the contents of the object. Only a single prompt object is considered 'started' at a given time, so if Start is called in succession, all playbacks are played in sequence.

Syntax:
Object.Start([strText]);
Parameters:
strText: the text to be sent to the synthesizer. If present, this argument overrides the contents of the object.
Return value:
None.
Exception:
Set status=−1 and fires an onComplete event if the audio buffer is already released by the server.

3.3.2 Pause

Pause playback without flushing the audio buffer. This method has no effect if playback is paused or stopped.

Syntax:
Object.Pause( );
Return value:
None.
Exception:
None.

3.3.3 Resume

Resume playback without flushing the audio buffer. This method has no effect if playback has not been paused.

Syntax:
Object.Resume( );
Return value:
None.
Exception:
Throws an exception when resume fails.

3.3.4 Stop

Stop playback, if not already, and flush the audio buffer. If the playback has already been stopped, the method simply flushes the audio buffer.

Syntax:
Object.Stop( );
Return value:
None.
Exception:
None.

3.3.5 Change

Change speed and/or volume of playback. Change may be called during playback.

Syntax:
Object.Change(speed, volume);
Parameters:
speed: Required. The factor to change. Speed=2.0 means double the current rate, speed=0.5 means halve the current rate, speed=0 means to restore the default value.
volume: Required. The factor to change. Volume=2.0 means double the current volume, volume=0.5 means halve the current volume, volume=0 means to restore the default value.
Return value:
None.
Exception:
None.

3.3.6 Prompt Control Example

The following example shows how control of the prompt using the methods above might be authored for a platform which does not support a keyword barge-in mechanism.

```
<html>
<title>Prompt control</title>
<head>
  <script>
    <!--
      function checkKWBargein( ) {
        news.change(1.0, 0.5); // turn down the
  volume while verifying
        if (keyword.text == "") { // result is below
  threshold
          news.change(1.0, 2.0); // restore the
  volume
          keyword.Start( ); // restart the
  recognition
        } else {
          news.Stop( ); // keyword detected! Stop
  the prompt
          // Do whatever that is necessary
        }
      }
    //
  </script>
  <script for="window" event="onload">
    <!--
      news.Start( ); keyword.Start( );
    //
  </script>
</head>
<body>
  <prompt id="news" bargein="0">
```

Stocks turned in another lackluster performance Wednesday as investors received little incentive to make any big moves ahead of next week's Federal Reserve meeting. The tech-heavy Nasdaq Composite Index dropped 42.51 points to close at 2156.26. The Dow Jones Industrial Average fell 17.05 points to 10866.46 after an early-afternoon rally failed.

```
   - <!--
        </prompt>
        <reco    id="keyword"
                 reject="70"
                 onReco="checkKWBargein( )" >
            <grammar
     src=http://denali/news bargein grammar.xml />
        </reco>
    </body>
</html>
```

3.4 Prompt Events

The prompt DOM object supports the following events, whose handlers may be specified as attributes of the prompt element.

3.4.1 onBookmark

Fires when a synthesis bookmark is encountered. The event does not pause the playback.

Syntax:

| Inline HTML | <prompt onBookmark="handler" ...> |
| Event property | Object.onBookmark = handler<br>Object.onBookmark = GetRef("handler"); |

Event Object Info:

| Bubbles | No |
| To invoke | A bookmark in the rendered string is encountered |
| Default action | Returns the bookmark string |

Event Properties:

Although the event handler does not receive properties directly, the handler can query the event object for data.

3.4.2 onBargein:

Fires when a user's barge-in event is detected. (Note that determining what constitutes a barge-in event, eg energy detection or keyword recognition, is up to the platform.) A specification of this event handler does not automatically turn the barge-in on.

Syntax:

| Inline HTML | <prompt onBargein="handler" ...> |
| Event property | Object.onBargein = handler<br>Object.onBargein = GetRef("handler"); |

Event Object Info:

| Bubbles | No |
| To invoke | A bargein event is encountered |
| Default action | None |

Event Properties:

Although the event handler does not receive properties directly, the handler can query the event object for data.

3.4.3 onComplete:

Fires when the prompt playback reaches the end or exceptions (as defined above) are encountered.

Syntax:

| Inline HTML | <prompt onComplete="handler" ...> |
| Event property | Object.onComplete = handler<br>Object.onComplete = GetRef("handler"); |

Event Object Info:

| Bubbles | No |
| To invoke | A prompt playback completes |
| Default action | Set status = 0 if playback completes normally, otherwise set status as specified above. |

Event Properties:

Although the event handler does not receive properties directly, the handler can query the event object for data.

3.4.4 Using Bookmarks and Events

The following example shows how bookmark events can be used to determine the semantics of a user response—either a correction to a departure city or the provision of a destination city—in terms of when bargein happened during the prompt output. The onBargein handler calls a script which sets a global 'mark' variable to the last bookmark encountered in the prompt, and the value of this 'mark' is used in the reco's postprocessing function ('heard') to set the correct value.

```
<script><![CDATA[
    var mark;
    function interrupt( ) {
        mark = event.srcElement.bookmark;
    }
    function ProcessCityConfirm( ) {
        confirm.stop( ); // flush the audio buffer
        if (mark == "mark_origin_city")
            txtBoxOrigin.value = event.srcElement.text;
        else
            txtBoxDest.value = event.srcElement.text;
    }
]]></script>
<body>
    <input name="txtBoxOrigin" value="Seattle" type="text"/>
    <input name="txtBoxDest" type="text" />
    ...
    <prompt id="confirm" onBargein="interrupt( )" bargein="0">
        From <bookmark mark="mark_origin_city" />
        <value targetElement="orgin" targetAttribute="value" />,
        please say <bookmark mark="mark_dest_city" /> the
        destination city you want to travel to.
    </prompt>
    <reco onReco="ProcessCityConfirm( )" >
        <grammar src="/grm/1033/cities.xml" />
    </reco>
    ...
</body>
```

4 DTMF

Creates a DTMF recognition object. The object can be instantiated using inline markup language syntax or in scripting. When activated, DTMF can cause prompt object to fire a barge-in event. It should be noted the tags and eventing discussed below with respect to DTMF recognition and call control discussed in Section 5 generally pertain to interaction between the voice browser 216 and media server 214.

4.1 Content dtmfgrammar: for inline grammar.

bind: assign DTMF conversion result to proper field.

Attributes:

targetElement: Required. The element to which a partial recognition result will be assigned to (cf. same as in W3C SMIL 2.0).

targetAttribute: the attribute of the target element to which the recognition result will be assigned to (cf. same as in SMIL 2.0). Default is "value".

test: condition for the assignment. Default is true.

EXAMPLE 1

Map Keys to Text

```
<input type="text" name="city" />
<DTMF id="city_choice" timeout="2000" numDigits="1">
    <dtmfgrammar>
        <key value="1">Seattle</key>
        <key value="2">Boston</key>
    </dtmfgrammar>
    <bind targetElement="city" targetAttribute="value" />
</DTMF>
```

When "city_choice" is activated, "Seattle" will be assigned to the input field if the user presses 1, "Boston" if 2, nothing otherwise.

EXAMPLE 2

How DTMF can be Used with Multiple Fields

```
<input type="text" name="area_code" />
<input type="text" name="phone_number" />
<DTMF id="areacode" numDigits="3" onReco="extension.Activate( )">
    <bind targetElement="area_code" />
</DTMF>
<DTMF id="extension" numDigits="7">
    <bind targetElement="phone_number" />
</DTMF>
```

This example demonstrates how to allow users entering into multiple fields.

EXAMPLE 3

How to Allow Both Speech and DTMF Inputs and Disable Speech when User Starts DTMF

```
<input type="text" name="credit_card_number" />
<prompt onBookmark="dtmf.Start( ); speech.Start( )" bargein="0">
    Please say <bookmark name="starting" />
    or enter your credit card number now
</prompt>
<DTMF id="dtmf" escape="#" length="16" interdigitTimeout="2000"
        onkeypress="speech.Stop( )">
    <bind targetElement="credit_card_number" />
</DTMF>
<reco id="speech" >
    <grammar src="/grm/1033/digits.xml" />
    <bind targetElement="credit_card_number" />
</reco>
```

4.2 Attributes and Properties
4.2.1 Attributes dtmfgrammar: Required. The URI of a DTMF grammar.

4.2.2 Properties

DTMFgrammar Read-Write.

An XML DOM Node object representing DTMF to string conversion matrix (also called DTMF grammar). The default grammar is

```
<dtmfgrammar>
    <key value="0">0</key>
    <key value="1">1</key>
    ...
    <key value="9">9</key>
    <key value="*">*</key>
    <key value="#">#</key>
</dtmfgrammar >
``` flush
    Read-write, a Boolean flag indicating whether to automatically flush the DTMF buffer on the underlying telephony interface card before activation. Default is false to enable type-ahead.

escape
    Read-Write. The escape key to end the DTMF reading session. Escape key is one key.

numDigits
    Read-Write. Number of key strokes to end the DTMF reading session. If both escape and length are specified, the DTMF session is ended when either condition is met.

dtmfResult
    Read-only string, storing the DTMF keys user has entered. Escape is included in result if typed.

text
    Read-only string storing white space separated token string, where each token is converted according to DTMF grammar.

initialTimeout
    Read-Write. Timeout period for receiving the first DTMF keystoke, in milliseconds. If unspecified, defaults to the telephony platform's internal setting.

interdigitTimeout
    Read-Write. Timeout period for adjacent DTMF keystokes, in milliseconds. If unspecified, defaults to the telephony platform's internal setting.

4.3 Object Methods:

4.3.1 Start

Enable DTMF interruption and start a DTMF reading session.

Syntax:

Object.Start( );

Return value:

None

Exception:

None

4.3.2 Stop

Disable DTMF. The key strokes entered by the user, however, remain in the buffer.

Syntax:

Object.Stop( );

Return value:

None

Exception:

None

4.3.3 Flush

Flush the DTMF buffer. Flush can not be called during a DTMF session.

Syntax:

Object.Flush( );

Return value:

None

Exception:

None

4.4 Events

4.4.1 onkeypress

Fires when a DTMF key is press. This overrides the default event inherited from the HTML control. When user hits the escape key, the onRec event fires, not onKeypress.

Syntax:

| Inline HTML | <DTMF onkeypress="handler" ...> |
| Event property | Object.onkeypress = handler |
| | Object.onkeypress = GetRef("handler"); |

Event Object Info:

| Bubbles | No |
| To invoke | Press on the touch-tone telephone key pad |
| Default action | Returns the key being pressed |

Event Properties:

Although the event handler does not receive properties directly, the handler can query the event object for data.

4.4.2 onReco

Fires when a DTMF session is ended. The event disables the current DTMF object automatically.

Syntax:

| Inline HTML | <DTMF onReco="handler" ...> |
| Event property | Object.onReco = handler |
| | Object.onReco = GetRef("handler"); |

Event Object Info:

| Bubbles | No |
| To invoke | User presses the escape key or the number of key strokes meets specified value. |
| Default action | Returns the key being pressed |

Event Properties:

Although the event handler does not receive properties directly, the handler can query the event object for data.

4.4.3 onTimeout

Fires when no phrase finish event is received before time out. The event halts the recognition process automatically.

Syntax:

| Inline HTML | <DTMF onTimeout="handler" ...> |
| Event property (in ECMAScript) | Object.onTimeout = handler |
| | Object.onTimeout = GetRef("handler"); |

Event Object Info:

| Bubbles | No |
| To invoke | No DTMF key stroke is detected within the timeout specified. |
| Default action | None |

Event Properties:

Although the event handler does not receive properties directly, the handler can query the event object for data.

5 CallControl Object

Represents the telephone interface (call, terminal, and connection) of the telephone voice browser. This object is as native as window object in a GUI browser. As such, the lifetime of the telephone object is the same as the browser instance itself. A voice browser for telephony instantiates the telephone object, one for each call. Users don't instantiate or dispose the object.

At this point, only features related to first-party call controls are exposed through this object.

5.1 Properties address

Read-only. XML DOM node object. Implementation specific. This is the address of the caller. For PSTN, may a combination of ANI and ALI. For VoIP, this is the caller's IP address.

ringsBeforeAnswer

Number of rings before answering an incoming call. Default is infinite, meaning the developer must specifically use the Answer( ) method below to answer the phone call. When the call center uses ACD to queue up the incoming phone calls, this number can be set to 0.

5.2 Methods

Note: all the methods here are synchronous.

5.2.1 Transfer

Transfers the call. For a blind transfer, the system may terminate the original call and free system resources once the transfer completes.

Syntax:
telephone.Transfer(strText);
Parameters:
strText: Required. The address of the intended receiver.
Return value:
None.
Exception:
Throws an exception when the call transfer fails. e.g., when end party is busy, no such number, fax or answering machine answers.

5.2.2 Bridge

Third party transfer. After the call is transferred, the browser may release resources allocated for the call. It is up to the application to recover the session state when the transferred call returns using strUID. The underlying telephony platform may route the returning call to a different browser. The call can return only when the recipient terminates the call.

Syntax:
telephone.Bridge(strText, strUID, [imaxTime]);
Parameters:
strText: Required. The address of the intended receiver.
strUID: Required. The session ID uniquely identifying the current call. When the transferred call is routed back, the srtUID will appear in the address attribute.
imaxTime: Optional. Maximum duration in seconds of the transferred call. If unspecified, defaults to platform-internal value
Return value:
None.
Exception:
None.

5.2.3 Answer

Answers the phone call.
Syntax:
telephone.Answer( );
Return value:
None.
Exception:
Throws an exception when there is no connection. No onAnswer event will be fired in this case.

5.2.4 Hangup

Terminates the phone call. Has no effect if no call currently in progress.
Syntax:
telephone.Hangup( );
Return value:
None.
Exception:
None.

5.2.5 Connect

Starts a first-party outbound phone call.
Syntax:
telephone.Connect(strText, [iTimeout]);
Parameters:
strText: Required. The address of the intended receiver.
iTimeout: Optional. The time in milliseconds before abandoning the attempt. If unspecified, defaults to platform-internal value.
Return value:
None.
Exception:
Throws an exception when the call cannot be completed, including encountering busy signals or reaching a FAX or answering machine (Note: hardware may not support this feature).

5.2.6 Record

Record user audio to file.
Syntax:
telephone.Record(url, endSilence, [maxTimeout], [initialTimeout]);
Parameters:
url: Required. The url of the recorded results.
endSilence: Required. Time in milliseconds to stop recording after silence is detected.
maxTimeout: Optional. The maximum time in seconds for the recording. Default is platform-specific.
initialTimeout: Optional. Maximum time (in milliseconds) of silence allowed at the beginning of a recording.
Return value:
None.
Exception:
Throws an exception when the recording can not be written to the url.

5.3 Event Handlers

App developers using telephone voice browser may implement the following event handlers.

5.3.1 onIncoming( )

Called when the voice browser receives an incoming phone call. All developers can use this handler to read caller's address and invoke customized features before answering the phone call.

5.3.2 onAnswer( )

Called when the voice browser answers an incoming phone call.

5.3.3 onHangup( )

Called when user hangs up the phone. This event is NOT automatically fired when the program calls the Hangup or Transfer methods.

5.4 Example

This example shows scripting wired to the call control events to manipulate the telephony session.

```
<HTML>
<HEAD>
  <TITLE>Logon Page</TITLE>
</HEAD>
  <SCRIPT>
    var focus;
    function RunSpeech( ) {
        if (logon.user.value == "") {
            focus="user";
            p_uid.Start( ); g_login.Start( );
    dtmf.Start( ); return;
        }
        if (logon.pass.value == "") {
            focus="pin";
            p_pin.Start( ); g_login.Start( );
    dtmf.Start( ); return;
        }
        p_thank.Start( ); logon.submit( );
    }
    function login_reco( ) {
        res = event.srcElement.recoResult;
        pNode = res.selectSingleNode("//uid");
        if (pNode != null)
            logon.user.value = pNode.xml;
        pNode = res.selectSingleNode("//password");
        if (pNode != null)
            logon.pass.value = pNode.xml;
    }
    function dtmf_reco( ) {
        res = event.srcElement.dtmfResult;
        if (focus == "user")
            logon.user.value = res;
```

```
        else
            logon.pin.value = res;
        }
    </SCRIPT>
    <SCRIPT for="callControl" event="onIncoming">
    <!--
        // read address, prepare customized stuff if any
        callControl.Answer( );
        //
    </SCRIPT>
    <SCRIPT for="callControl" event="onOffhook">
    <!--
        p_main.Start( ); g_login.Start( ); dtmf.Start( );
        focus="user";
        //
    </SCRIPT>
    <SCRIPT for="window" event="onload">
    <!--
        if (logon.user.value != "") {
            p_retry.Start( );
            logon.user.value = "";
            logon.pass.value = "";
            checkFields( );
        }
    //
    </SCRIPT>
<BODY>
    <reco id="g_login"
        onReco="login_reco( ); runSpeech( )"
        timeout="5000"
        onTimeout="p_miss.Start( ); RunSpeech( )" >
        <grammar
    src=http://kokanee1/etradedemo/speechonly/login.xml/>
    </ reco >
    <dtmf id="dtmf"
        escape="#"
        onkeypress="g_login.Stop( );"
        onReco="dtmf_reco( );RunSpeech( )"
        interdigitTimeout="5000"
        onTimeout="dtmf.Flush( );
        p_miss.Start( );RunSpeech( )" />
    <prompt id="p_main">Please say your user I D and pin
        number</prompt>
    <prompt id="p_uid">Please just say your user I
        D</prompt>
    <prompt id="p_pin">Please just say your pin
        number</prompt>
    <prompt id="p_miss">Sorry, I missed that</prompt>
    <prompt id="p_thank">Thank you. Please wait while I
        verify your identity</prompt>
    <prompt id="p_retry">Sorry, your user I D and pin
        number do not match</prompt>
    <H2>Login</H2>
    <form id="logon">
        UID:   <input name="user" type="text"
            onChange="runSpeech( )" />
        PIN:   <input name="pass" type="password"
            onChange="RunSpeech( )" />
    </form>
</BODY>
</HTML>
```

6 Controlling Dialog Flow 6.1 Using HTML and Script to Implement Dialog Flow

This example shows how to implement a simple dialog flow which seeks values for input boxes and offers context-sensitive help for the input. It uses the title attribute on the HTML input mechanisms (used in a visual browser as a "tooltip" mechanism) to help form the content of the help prompt.

```
<html>
    <title>Context Sensitive Help</title>
<head>
    <script>   var focus;
        function RunSpeech( ) {
            if (trade.stock.value == "") {
                focus="trade.stock";
                p_stock.Start( );
                return;
            }
            if (trade.op.value == "") {
                focus="trade.op";
                p_op.Start( );
                return;
            }
            //.. repeat above for all fields
            trade.submit( );
        }
        function handle( ) {
            res = event.srcElement.recoResult;
            if (res.text == "help") {
                text = "Please just say";
                text += document.all[focus].title;
                p_help.Start(text);
            } else {
                // proceed with value assignments
            }
        }
    </script>
</head>
<body>
    <prompt id="p_help" onComplete="checkFileds( )" />
    <prompt id="p_stock"
        onComplete="g_stock.Start( )">Please say the stock
        name</prompt>
    <prompt id="p_op" onComplete="g_op.Start( )">Do you
        want to buy or sell</prompt>
    <prompt id="p_quantity"
        onComplete="g_quantity.Start( )">How many
        shares?</prompt>
    <prompt id="p_price"
        onComplete="g_price.Start( )">What's the price</prompt>
    <reco id="g_stock" onReco="handle( ); checkFields( )" >
        <grammar src="./g_stock.xml" />
    </ reco >
    <reco id="g_op" onReco="handle( ); checkFields( )" />
        <grammar src="./g_op.xml" />
    </ reco >
    <reco id="g_quantity" onReco="handle( ); checkFields( )"
        />
        <grammar src="./g_quant.xml" />
    </ reco >
    <reco id="g_price" onReco="handle( ); checkFields( )" />
        <grammar src="./g_quant.xml" />
    </ reco >
    <form id="trade">
        <input name="stock" title="stock name" />
        <select name="op" title="buy or sell">
            <option value="buy" />
            <option value="sell" />
        </select>
        <input name="quantity" title="number of shares"
        />
        <input name="price" title="price" />
    </form>
</body>
</html>
```

6.2 Using SMIL

The following example shows activation of prompt and reco elements using SMIL mechanisms.

```
<html xmlns:t="urn:schemas-microsoft-com:time"
      xmlns:sp="urn:schemas-microsoft-
com:speech">
<head>
<style>
    .time { behavior: url (#default#time2); }
</style>
</head>
<body>
<input name="txtBoxOrigin" type="text"/>
<input name="txtBoxDest" type="text" />
<sp: prompt span="time" t:begin="0" >
    Please say the origin and destination cities
</sp:prompt>
<t:par t:begin="time.end"
t:repeatCount="indefinitely">
    <sp:reco class="time" >
        <grammar src="./city.xml" />
        <bind targetElement="txtBoxOrigin"
            value="//origin_city" />
        <bind targetElement="txtBoxDest"
            test="/sml/dest_city[@confidence $gt$ 40]"
            value="//dest_city" />
    </sp:reco>
</t:par>
</body>
</html>
```

APPENDIX B

1 QA Speech Control

The QA control adds speech functionality to the primary control to which it is attached. Its object model is an abstraction of the content model of the exemplary tags in Appendix A.

```
1.1 QA control
    <Speech:QA
        id="..."
        controlsToSpeechEnable="..."
        speechIndex="..."
        ClientTest="..."
        runat="server" >
        <Question ...>
        <Statement ...>
        ...
        <Answer ...>
        <Confirm ...>
        ...
        <Command ...>
        ...
    </Speech:QA>
```

1.1.1 Core Properties

String ControlsToSpeechEnable

ControlsToSpeechEnable specifies the list of IDs of the primary controls to speech enable. IDs are comma delimited.

1.1.2 Activation Mechanisms int SpeechIndex

SpeechIndex specifies the ordering information of the QA control—this is used by RunSpeech. Note: If more than one QA control has the same SpeechIndex, RunSpeech will execute them in source order. In situations where some QA controls have SpeechIndex specified and some QA controls do not, RunSpeech will order the QA controls first by SpeechIndex, then by source order.

String ClientTest

ClientTest specifies a client-side script function which returns a boolean value to determine when the QA control is considered available for selection by the RunSpeech algorithm. The system strategy can therefore be changed by using this as a condition to activate or de-activate QA controls more sensitively than SpeechIndex. If not specified, the QA control is considered available for activation.

1.1.3 Questions, Statements, Answers, Confirms and Commands

Question[ ] Questions

QA control contains an array of question objects or controls, defined by the dialog author. Each question control will typically relate to a function of the system, eg asking for a value, etc. Each question control may specify an activation function using the ClientTest attribute, so an active QA control may ask different kinds of questions about its primary control under different circumstances. For example, the activation condition for main question Q_Main may be that the corresponding primary control has no value, and the activation condition for a Q_GiveHelp may be that the user has just requested help. Each Question may specify answer controlss from within the QA control which are activated when the question control is outputted.

Statement[ ] Statement

QA control contains an array of statement objects or controls. Statements are used to provide information to the listener, such as welcome prompts.

Answer[ ] Answers

QA control contains an array of answer objects or controls. An answer control is activated directly by a question control within the QA control, or by a StartEvent from the Primary control. Where multiple answers are used, they will typically reflect answers to the system functions, e.g. A_Main might provide a value in response to Q_Main, and A_Confirm might providing a yes/no+ correction to Confirm.

Confirm[ ] Confirm

QA control may contain a confirm object or control. This object is a mechanism provided to the dialog authors which simplify the authoring of common confirmation subdialogs.

Command[ ] Command

A Command array holds a set of command controls. Command controls can be thought of as answer controls without question controls, whose behavior on recognition can be scoped down the control tree.

1.2 Question Control

The question control is used for the speech output relating to a given primary control. It contains a set of prompts for presenting information or asking a question, and a list of ids of the answer controls, which may provide an answer to that question. If multiple answer controls are specified, these grammars are loaded in parallel when the question is activated. An exception will be thrown if no answer control is specified in the question control.

```
<Question
    id="..."
    ClientTest="..."
    Answers="..."
    Count="..."
    initialTimeout="..."
    babbleTimeout="..."
    maxTimeout="..."
    Modal="..."
```

-continued

```
        PromptFunction="..."
        OnClientNoReco="..." >
        <prompt ... />
        ...
    </Question>
```

String ClientTest

ClientTest specifies the client-side script function returning a boolean value which determines under which circumstances a question control is considered active within its QA control (the QA control itself must be active for the question to be evaluated). For a given QA control, the first question control with a true condition is selected for output. For example, the function may be used to determine whether to output a question which asks for a value ("Which city do you want?") or which attempts to confirm it ("Did you say London?"). If not specified, the question condition is considered true.

Prompt[ ] Prompts

The prompt array specifies a list of prompt objects, discussed below-Prompts are also able to specify conditions of selection (via client functions), and during RunSpeech execution only the first prompt with a true condition is selected for playback.

String Answers

Answers is an array of references by ID to controls that are possible answers to the question. The behavior is to activate the grammar from each valid answer control in response to the prompt asked by the question control.

Integer initialTimeout

The time in milliseconds between start of recognition and the detection of speech. This value is passed to the recognition platform, and if exceeded, an onSilence event will be thrown from the recognition platform. If not specified, the speech platform will use a default value.

Integer babbleTimeout

The period of time in milliseconds in which the recognition server or other recognizer must return a result after detection of speech. For recos in "tap-and-talk" scenarios this applies to the period between speech detection and the recognition result becoming available. For recos in dictation scenarios, this timeout applies to the period between speech detection and each recognition return—i.e. the period is restarted after each return of results or other event. If exceeded, the onClientNoReco event is thrown but different status codes are possible. If there has been any kind of recognition platform error that is detectable and the babbleTimeout period has elapsed, then an onClientNoReco is thrown but with a status code −3. Otherwise if the recognizer is still processing audio—e.g. in the case of an exceptionally long utterance or if the user has kept the pen down for an excessive amount of time—the onClientNoReco event is thrown, with status code −15. If babbleTimeout is not specified, the speech platform will default to an internal value.

Integer maxTimeout

The period of time in milliseconds between recognition start and results returned to the client device browser. If exceeded, the onMaxTimeout event is thrown by the browser—this caters for network or recognizer failure in distributed environments. For recos in dictation scenarios, as with babbleTimeout, the period is restarted after the return of each recognition or other event. Note that the maxTimeout attribute should be greater than or equal to the sum of initialTimeout and babbleTimeout. If not specified, the value will be a browser default.

Bool Modal

When modal is set to true, no answers except the immediate set of answers to the question are activated (i.e. no scoped Answers are considered). The defaults is false. For Example, this attribute allows the application developer to force the user of the client device to answer a particular question.

String PromptFunction(Prompt)

PromptFunction specifies a client-side function that will be called once the question has been selected but before the prompt is played. This gives a chance to the application developer to perform last minute modifications to the prompt that may be required. PromptFunction takes the ID of the target prompt as a required parameter.

String OnClientNoReco

OnClientNoReco specifies the name of the client-side function to call when the NoReco (mumble) event is received.

1.2.1 Prompt Object

The prompt object contains information on how to play prompts. All the properties defined are read/write properties.

```
    <prompt
        id="..."
        count="..."
        ClientTest="..."
        source="..."
        bargeIn="..."
        onClientBargein="..."
        onClientComplete="..."
        onClientBookmark="..." >
        . . . text/markup of the prompt . . .
    </prompt>
```

Int Count

Count specifies an integer which is used for prompt selection. When the value of the count specified on a prompt matches the value of the count of its question control, the prompt is selected for playback. Legal values are 0-100.

```
    <Question id=Q_Ask">
        <prompt count="1"> Hello </prompt>
        <prompt count="2"> Hello again </prompt>
    </Question>
```

In the example, when Q_Ask.count is equal to 1, the first prompt is played, and if it is equal to 2 (i.e. the question has already been output before), the second prompt is then played.

String ClientTest

ClientTest specifies the client-side script function returning a boolean value which determines under which circumstances a prompt within an active question control will be selected for output. For a given question control, the first prompt with a true condition is selected. For example, the function may be used to implement prompt tapering, eg ("Which city would you like to depart from?" for a function returning true if the user if a first-timer, or "Which city?" for an old hand). If not specified, the prompt's condition is considered true.

String InlinePrompt

The prompt property contains the text of the prompt to play. This is defined as the content of the prompt element. It may contain further markup, as in TTS rendering information, or <value>elements. As with all parts of the page, it may also be specified as script code within <script>tags, for dynamic rendering of prompt output.

String Source

Source specifies the URL from which to retrieve the text of the prompt to play. If an inline prompt is specified, this property is ignored.

Bool BargeIn

BargeIn is used to specify whether or not barge-in (wherein the user of the client device begins speaking when a prompt is being played) is allowed on the prompt. The defaults is true.

String onClientBargein onClientBargein specifies the client-side script function which is invoked by the bargein event.

String onClientComplete onClientComplete specifies the client-side script function which is invoked when the playing of the prompt has competed.

String OnClientBookmark

OnClientBookmark accesses the name of the client-side function to call when a bookmark is encountered.

1.2.2 Prompt Selection

On execution by RunSpeech, a QA control selects its prompt in the following way:

ClientTest and the count attribute of each prompt are evaluated in order. The first prompt with both ClientTest and count true is played. A missing count is considered true. A missing ClientTest is considered true.

1.3 Statement Control

Statement controls are used for information-giving system output when the activation of grammars is not required. This is common in voice-only dialogs. Statements are played only once per page if the playonce attribute is true.

```
<Statement
    id="..."
    playOnce="..."
    ClientTest="..."
    PromptFunction="..." >
    <prompt ... />
    ...
</Statement >
```

Bool playOnce

The playonce attribute specifies whether or not a statement control may be activated more than once per page. playOnce is a Boolean attribute with a default (if not specified) of TRUE, i.e., the statement control is executed only once. For example, the playOnce attribute may be used on statement controls whose purpose is to output email messages to the end user. Setting playOnce="False" will provide dialog authors with the capability to enable a "repeat" functionality on a page that reads email messages.

String ClientTest

ClientTest specifies the client-side script function returning a boolean value which determines under which circumstances a statement control will be selected for output. RunSpeech will activate the first Statement with ClientTest equal to true. If not specified, the ClientTest condition is considered true.

String PromptFunction

PromptFunction specifies a client-side function that will be called once the statement control has been selected but before the prompt is played. This gives a chance to the authors to do last minute modifications to the prompt that may be required.

Prompt[ ] Prompt

The prompt array specifies a list of prompt objects. Prompts are also able to specify conditions of selection (via client functions), and during RunSpeech execution only the first prompt with a true condition is selected for playback.

```
<Speech:QA
    id="QA_Welcome"
    ControlsToSpeechEnable="Label1"
    runat="server" >
    <Statement id="WelcomePrompt" >
        <prompt bargeIn="False">Welcome </prompt>
    </Statement>
</Speech:QA>
```

1.4 Confirm Control

Confirm controls are special types of question controls. They may hold all the properties and objects of other questions controls, but they are activated differently. The RunSpeech algorithm will check the confidence score found in the confirmThreshold of the answer control of the ControlsToSpeechEnable. If it is too low, the confirm control is activated. If the confidence score of the answer control is below the confirmThreshold, then the binding is done but the onClientReco method is not called. The dialog author may specify more than one confirm control per QA control. RunSpeech will determine which confirm control to activate based on the function specified by ClientTest.

```
<Answer ConfirmThreshold=... />
<Confirm>
    ...all attributes and objects of Question...
</Confirm>
```

1.5 Answer Control

The answer control is used to specify speech input resources and features. It contains a set of grammars related to the primary control. Note that an answer may be used independently of a question, in multimodal applications without prompts, for example, or in telephony applications where user initiative may be enabled by extra-answers. Answer controls are activated directly by question controls, by a triggering event, or by virtue of explicit scope. An exception will be thrown if no grammar object is specified in the answer control.

```
<Answer
    id="..."
    scope="..."
    StartEvent="..."
    StopEvent="..."
    ClientTest="..."
    onClientReco="..."
    onClientDTMF="..."
    autobind="..."
    server="..."
    ConfirmThreshold="..."
    RejectThreshold="..." >
    <grammar ... />
    <grammar ... />
    ...
    <dtmf ... />
    <dtmf ... />
    ...
    <bind ... />
    <bind ... />
    ...
</Answer>
```

String Scope

Scope holds the id of any named element on the page. Scope is used in answer control for scoping the availability of user initiative (mixed task initiative: i.e. service jump digressions) grammars. If scope is specified in an answer control, then it will be activated whenever a QA control corresponding to a primary control within the subtree of the contextual control is activated.

String StartEvent

StartEvent specifies the name of the event from the primary control that will activate the answer control (start the Reco object). This will be typically used in multi-modal applications, eg onMouseDown, for tap-and-talk.

String StopEvent

StopEvent specifies the name of the event from the primary control that will de-activate the answer control (stop the Reco object). This will be typically used in multi-modal applications, eg onMouseUp, for tap-and-talk.

String ClientTest

ClientTest specifies the client-side script function returning a boolean value which determines under which circumstances an answer control otherwise selected by scope or by a question control will be considered active. For example, the test could be used during confirmation for a 'correction' answer control to disable itself when activated by a question control, but mixed initiative is not desired (leaving only accept/deny answers controls active). Or a scoped answer control which permits a service jump can determine more flexible means of activation by specifying a test which is true or false depending on another part of the dialog. If not specified, the answer control's condition is considered true.

Grammar[ ] Grammars

Grammars accesses a list of grammar objects.

DTMF[ ] DTMFs

DTMFs holds an array of DTMF objects.

Bind[ ] Binds

Binds holds a list of the bind objects necessary to map the answer control grammar results (dtmf or spoken) into control values. All binds specified for an answer will be executed when the relevant output is recognized. If no bind is specified, the SML output returned by recognition will be bound to the control specified in the ControlsToSpeechEnable of the QA control String OnClientReco OnClientReco specifies the name of the client-side function to call when spoken recognition results become available.

String OnClientDTMF

OnClientDTMF holds the name of the client-side function to call when DTMF recognition results become available.

Boolean Autobind

The value of autobind determines whether or not the system default bindings are implemented for a recognition return from the answer control. If unspecified, the default is true. Setting autobind to false is an instruction to the system not to perform the automatic binding.

String Server

The server attribute is an optional attribute specifying the URI of the speech server to perform the recognition. This attribute over-rides the URI of the global speech server attribute.

integer ConfirmThreshold

Holds a value representing the confidence level below which a confirm control question will be automatically triggered immediately after an answer is recognized within the QA control. Legal values are 0-100.

Note that where bind statements and onClientReco scripts are both specified, the semantics of the resulting Tags are that binds are implemented before the script specified in onClientReco.

integer RejectThreshold

RejectThreshold specifies the minimum confidence score to consider returning a recognized utterance. If overall confidence is below this level, a NoReco event will be thrown. Legal values are 0-100.

1.5.1 Grammar

The grammar object contains information on the selection and content of grammars, and the means for processing recognition results. All the properties defined are read/write properties.

```
<Grammar
    ClientTest="..."
    Source="..."
    >
    ...grammar rules...
</Grammar>
```

String ClientTest

The ClientTest property references a client-side boolean function which determines under which conditions a grammar is active. If multiple grammars are specified within an answer control (e.g. to implement a system/mixed initiative strategy, or to reduce the perplexity of possible answers when the dialog is going badly), only the first grammar with a true ClientTest function will be selected for activation during RunSpeech execution. If this property is unspecified, true is assumed.

String Source

Source accesses the URI of the grammar to load, if specified.

String InlineGrammar

InlineGrammar accesses the text of the grammar if specified inline. If that property is not empty, the Source attribute is ignored.

1.5.2 Bind

The object model for bind follows closely its counterpart client side tags. Binds may be specified both for spoken grammar and for DTMF recognition returns in a single answer control.

```
<bind
    Value="..."
    TargetElement="..."
    TargetAttribute="..."
    Test="..."
/>
```

String Value

Value specifies the text that will be bound into the target element. It is specified as an XPath on the SML output from recognition.

String TargetElement

TargetElement specifies the id of the primary control to which the bind statement applies. If not specified, this is assumed to be the ControlsToSpeechEnable of the relevant QA control.

String TargetAttribute

TargetAttribute specifies the attribute on the TargetElement control in which bind the value. If not specified, this is assumed to be the Text property of the target element.

String Test

The Test attribute specifies a condition which must evaluate to true on the binding mechanism. This is specified as an XML Pattern on the SML output from recognition.

1.5.2.1 Automatic Binding

The default behavior on the recognition return to a speech-enabled primary control is to bind certain properties into that primary control. This is useful for the dialog controls to examine the recognition results from the primary controls across turns (and even pages). Answer controls will perform the following actions upon receiving recognition results:

1. bind the SML output tree into the SML attribute of the primary control
2. bind the text of the utterance into the SpokenText attribute of the primary control
3. bind the confidence score returned by the recognizer into the Confidence attribute of the primary control.

Unless autobind="False" attribute is specified on an answer control, the answer control will perform the following actions on the primary control:

1. bind the SML output tree into the SML attribute;
2. bind the text of the utterance into the SpokenText attribute;
3. bind the confidence score returned by the recognizer into the Confidence attribute;

Any values already held in the attribute will be overwritten. Automatic binding occurs before any author-specified bind commands, and hence before any onClientReco script (which may also bind to these properties).

1.5.3 DTMF

DTMF may be used by answer controls in telephony applications. The DTMF object essentially applies a different modality of grammar (a keypad input grammar rather than a speech input grammar) to the same answer. The DTMF content model closely matches that of the client side output Tags DTMF element. Binding mechanisms for DTMF returns are specified using the targetAttribute attribute of DTMF object.

```
<DTMF
    firstTimeOut="..."
    interDigitTimeOut="..."
    numDigits="..."
    flush="..."
    escape="..."
    targetAttribute="..."
    ClientTest="...">
    <dtmfGrammar ...>
</DTMF>
``` integer firstTimeOut

The number of milliseconds to wait between activation and the first key press before raising a timeout event.

integer interDigitTimeOut

The number of milliseconds to wait between key presses before raising a timeout event.

int numDigits

The maximum number of key inputs permitted during DTMF recognition.

Bool Flush

A flag which states whether or not to flush the telephony server's DTMF buffer before recognition begins. Setting flush to false permits DTMF key input to be stored between recognition/page calls, which permits the user to 'type-ahead'.

String Escape

Holds the string value of the key which will be used to end DTMF recognition (eg '#').

String targetAttribute

TargetAttribute specifies the property on the primary control in which to bind the value. If not specified, this is assumed to be the Text property of the primary control.

String ClientTest

The ClientTest property references a client-side boolean function which determines under which conditions a DTMF grammar is active. If multiple grammars are specified within a DTMF object, only the first grammar with a true ClientTest function will be selected for activation during RunSpeech execution. If this property is unspecified, true is assumed.

1.5.4 DTMFGrammar

DTMFGrammar maps a key to an output value associated with the key. The following sample shows how to map the "1" and "2" keys to text output values.

```
<dtmfgrammar>
    <key value="1">Seattle</key>
    <key value="2">Boston</key>
</dtmfgrammar>
```

1.6 Command Control

The command control is a special variation of answer control which can be defined in any QA control. Command controls are forms of user input which are not answers to the question at hand (eg, Help, Repeat, Cancel), and which do not need to bind recognition results into primary controls. If the QA control specifies an activation scope, the command grammar is active for every QA control within that scope. Hence a command does not need to be activated directly by a question control or an event, and its grammars are activated in parallel independently of answer controls building process. Command controls of the same type at QA controls lower in scope can override superior commands with context-sensitive behavior (and even different/extended grammars if necessary).

```
<Command
    id="..."
    scope="..."
    type="..."
    RejectThreshold="..."
    onClientReco="..." >
    <Grammar ...>
    <dtmf ... >
    ...
</Command>
```

String Scope

Scope holds the id of a primary control. Scope is used in command controls for scoping the availability of the command grammars. If scope is specified for a command control, the command's grammars will be activated whenever a QA control corresponding to a primary control within the subtree of the contextual control is activated.

String Type

Type specifies the type of command (eg 'help', 'cancel' etc.) in order to allow the overriding of identically typed commands at lower levels of the scope tree. Any string value is possible in this attribute, so it is up to the author to ensure that types are used correctly.

integer RejectThreshold

RejectThreshold specifies the minimum confidence level of recognition that is necessary to trigger the command in recognition (this is likely to be used when higher than usual confidence is required, eg before executing the result of a 'Cancel' command). Legal values are 0-100.

String onClientReco onCommand specifies the client-side script function to execute on recognition of the command control's grammar.

Grammar Grammar

The grammar object which will listen for the command.

DTMF DTMF

The dtmf object which will activate the command.

2 Types of Initiatives and Dialog Flows

Using the control described above, various forms of initiatives can be developed, some examples are provided below:

2.1 Mixed Initiative Dialogs

Mixed initiative dialogs provide the capability of accepting input for multiple controls with the asking of a single question. For example, the answer to the question "what are your travel plans" may provide values for an origin city textbox control, a destination city textbox control and a calendar control ("Fly from Puyallup to Yakima on September 30$^{th}$").

A robust way to encode mixed initiative dialogs is to handwrite the mixed initiative grammar and relevant binding statements, and apply these to a single control.

The following example shows a single page used for a simple mixed initiative voice interaction about travel. The first QA control specifies the mixed initiative grammar and binding, and a relevant prompt asking for two items. The second and third QA controls are not mixed initiative, and so bind directly to their respective primary control by default (so no bind statements are required). The RunSpeech algorithm will select the QA controls based on an attribute "SpeechIndex" and whether or not their primary controls hold valid values.

```
<%@ Page language="c#" AutoEventWireup="false"
inherits="SDN.Page" %>
<%@ Register tagPrefix="SDN" Namespace="SDN" Assembly="SDN"
%>
<html>
<body>
<Form id="WebForm1" method=post runat="server">
<ASP:Label id="Label1" runat="server">Departure
city</ASP:Label>
<ASP:TextBox id="TextBox1" runat="server" />
<br>
<ASP:Label id="Label2" runat="server">Arrival
city</ASP:Label>
<ASP:TextBox id="TextBox2" textchanged="TextChanged"
runat="server" />
<!-- speech information -->
<Speech:QA id="QAmixed" controlsToSpeechEnable="TextBox1"
speechIndex="1" runat="server">
    <Question id="Q1" Answers="A1">
        <prompt>"Please say the cities you want to fly
from and to"</prompt>
    </Question>
    <Answer id="A1" >
        <grammar src="..."/>
        <bind targetElement="TextBox1"
value="/sml/path1"/>
        <bind targetElement="TextBox2"
value="/sml/path2"/>
    </Answer>
</Speech:QA>
<Speech:QA id="QA1" controlsToSpeechEnable="TextBox1"
speechIndex="2" runat="server">
    <Question id="Q1" Answers="A1">
        <prompt>"What's the departure city?"</prompt>
    </Question>
    <Answer id="A1">
        <grammar src="..."/>
    </Answer>
</Speech:QA>
<Speech:QA id="QA2" controlsToSpeechEnable="TextBox2"
speechIndex="3" runat="server">
    <Question id="Q1" Answer="A1">
        <prompt>"What's the arrival city"</prompt>
    </Question>
    <Answer id="A1" >
        <grammar src="..."/>
    </Answer>
</Speech:QA>
</Form>
</body>
</html>
```

2.2 Complex Mixed Initiative

Application developers can specify several answer to the same question control with different levels of initiatives. Conditions are specified that will select one of the answers when the question is asked, depending on the initiative settings that they require. An example is provided below:

```
<Speech:QA
    id="QA_Panel2"
    ControlsToSpeechEnable="Panel2"
    runat="server" >
    <Question           answers="systemInitiative,
mixedInitiative" .../>
        <Answer    id="systemInitiative"
                ClientTest="systemInitiativeCond"
                onClientReco="SimpleUpdate" >
                <grammar src="systemInitiative.gram" />
        </Answer>
        <Answer    id="mixedInitiative"
                ClientTest="mixedInitiativeCond"
                onClientReco="MixedUpdate" >
                <grammar src="mixedInitiative.gram" />
        </Answer>
</Speech:QA>
```

2.2 Complex Mixed Initiative

Application developers can specify several answer to the same question control with different levels of initiatives. Conditions are specified the will select one of the answers when the question id asked, depending on the initiative settings that they require. An example is provided below:

```
<Speech:QA
    id="QA_Panel2"
    ControlsToSpeechEnable="Panel2"
    runat="server" >
    <Question           answers="systemInitiative,
mixedInitiative".../>
        <Answer     id="systemInitiative"
                ClientTest="systemInitiativeCond"
                onClientReco="SimpleUpdate" >
                <grammar src="systemInitiative.gram" />
        </Answer>
        <Answer    id="mixedInitiative"
                ClientTest="mixedInitiativeCond"
                onClientReco="MixedUpdate" >
                <grammar src="mixedInitiative.gram" />
        </Answer>
</Speech:QA>
```

Application developers can also specify several question controls in a QA control. Some question controls can allow a mixed initiative style of answer, whilst others are more directed. By authoring conditions on these question controls, application developer can select between the questions depending on the dialogue situation.

In the following example the mixed initiative question asks the value of the two textboxes at the same time (e.g., 'what are your travel plans.?') and calls the mixed initiative answer (e.g., 'from London to Seattle'). If this fails, then the value of each textbox is asked separately (e.g., 'where do you leave from' and 'where are you going to') but, depending on the conditions, the mixed-initiative grammar may still be activated, thus allowing users to provide both values.

```
<Speech:QA
    id="QA_Panel2"
    ControlsToSpeechEnable="TextBox1, TextBox2"
    runat="server" >
    <Question
        ClientTest="AllEmpty( )"
        answers="AnsAll"
        .../>
    <Question
        ClientTest="TextBox1IsEmpty( )"
        answers="AnsAll, AnsTextBox1" .../>
    <Question
        ClientTest="TextBox2IsEmpty( )"
        answers="AnsAll, AnsTextBox2" .../>
    <Answer
        id="AnsTextBox1"
        onClientReco="SimpleUpdate">
        <grammar src="AnsTextBox1.gram" />
    </Answer>
    <Answer
        id="AnsTextBox2"
        onClientReco="SimpleUpdate" >
        <grammar src=" AnsTextBox2.gram" />
    </Answer>
    <Answer
        id="AnsAll"
        ClientTest="IsMixedInitAllowed( )"
        onClientReco="MixedUpdate"
        >
        <grammar src="AnsAll.gram" />
    </Answer>
</Speech:QA>
```

2.3 User Initiative

Similar to the command control, a standard QA control can specify a scope for the activation of its grammars. Like a command control, this QA control will activate the grammar from a relevant answer control whenever another QA control is activated within the scope of this context. Note that its question control will only be asked if the QA control itself is activated.

```
<Speech:QA
    id="QA_Panel2"
    ControlsToSpeechEnable="Panel2"
    runat="server" >
    <Question ... />
    <Answer    id="AnswerPanel2"
        scope="Panel2"
        onClientReco="UpdatePanel2( )" >
        <grammar src="Panel2.gram" />
    </Answer>
</Speech:QA>
```

This is useful for dialogs which allow 'service jumping'— user responses about some part of the dialog which is not directly related to the question control at hand.

2.4 Short Time-Out Confirms

Application developers can write a confirmation as usual but set a short time-out. In the timeout handler, code is provided to that accept the current value as exact.

```
<Speech:QA
    id="QA_Panel2"
    ControlsToSpeechEnable="Panel2"
    runat="server" >
    <Confirm timeOut="20"
        onClientTimeOut="AcceptConfirmation"... />
    <Answer    id="CorrectPanel2"
        onClientReco="UpdatePanel2( )" >
        <grammar src="Panel2.gram" />
    </Answer>
</Speech:QA>
```

2.5 Dynamic Prompt Building and Editing

The promptFunction script is called after a question control is selected but before a prompt is chosen and played. This lets application developers build or modify the prompt at the last minute. In the example below, this is used to change the prompt depending on the level of experience of the users.

```
<script language=javascript>
    function GetPrompt( ) {
        if(experiencedUser == true)
            Prompt1.Text = "What service do you want?";
        else
            Prompt1.Text = "Please choose between e-mail,
                                calendar and news";
        return;
    }
</script>
<Speech:QA
    id="QA_Panel2"
    ControlsToSpeechEnable="Panel2"
    runat="server" >
    <Question PromptFunction="GetPrompt"... >
        <Prompt id="Prompt1" />
    </Question>
    <Answer ... />
</Speech:QA>
```

2.6 Using Semantic Relationships

Recognition and use of semantic relationships can be done by studying the result of the recognizer inside the onReco event handler.

```
<script language="javascript">
function Reco( ) {
    /*
```

Application developers can access the SML returned by the recogniser or recognition server. If a semantic relationship (like sport-news) is identified, the confidence of the individual elements can be increased or take any other appropriate action.

```
    */
}
</script>
<Speech:QA
    id="QA_Panel2"
```

```
        ControlsToSpeechEnable="Panel2"
        runat="server" >
    <Question ... />
    <Answer onClientReco="Reco" >
        <grammar src="Panel2.gram" />
    </Answer>
</Speech:QA>
```

3 Implementation and Application of RunSpeech

A mechanism is needed to provide voice-only clients with the information necessary to properly render speech-enabled pages. Such a mechanism must provide the execution of dialog logic and maintain state of user prompting and grammar activation as specified by the application developer.

Such a mechanism is not needed for multimodal clients. In the multimodal case, the page containing speech-enabled controls is visible to the user of the client device. The user of the client device may provide speech input into any visible speech-enabled control in any desired order using the a multimodal paradigm.

The mechanism used by voice-only clients to render speech-enabled pages is the RunSpeech script or algorithm. The RunSpeech script relies upon the SpeechIndex attribute of the QA control and the SpeechGroup control discussed below.

3.1 SpeechControl

During run time, the system parses a control script or webpage having the server controls and creates a tree structure of server controls. Normally the root of the tree is the Page control. If the control script uses custom or user control, the children tree of this custom or user control is expanded. Every node in the tree has an ID and it is easy to have name conflict in the tree when it expands. To deal with possible name conflict, the system includes a concept of NamingContainer. Any node in the tree can implement NamingContainer and its children lives within that name space.

The QA controls can appear anywhere in the server control tree. In order to easily deal with SpeechIndex and manage client side rendering, a SpeechGroup control is provided. The Speechgroup control is hidden from application developer.

One SpeechGroup control is created and logically attached to every NamingContainer node that contain QA controls in its children tree. QA and SpeechGroup controls are considered members of its direct NamingContainer's SpeechGroup. The top level SpeechGroup control is attached to the Page object. This membership logically constructs a tree—a logical speech tree—of QA controls and SpeechGroup controls.

For simple speech-enabled pages or script (i.e., pages that do not contain other NamingContainers), only the root SpeechGroup control is generated and placed in the page's server control tree before the page is sent to the voice-only client. The SpeechGroup control maintains information regarding the number and rendering order of QA controls on the page.

For pages containing a combination of QA control(s) and NamingContainer(s), multiple SpeechGroup controls are generated: one SpeechGroup control for the page (as described above) and a SpeechGroup control for each NamingContainer. For a page containing NamingContainers, the page-level SpeechGroup control maintains QA control information as described above as well as number and rendering order of composite controls. The SpeechGroup control associated with each NamingContainer maintains the number and rendering order of QAs within each composite.

The main job of the SpeechGroup control is to maintain the list of QA controls and SpeechGroups on each page and/or the list of QA controls comprising a composite control. When the client side markup script (e.g. HTML) is generated, each SpeechGroup writes out a QACollection object on the client side. A QACollection has a list of QA controls and QACollections. This corresponds to the logical server side speech tree. The RunSpeech script will query the page-level QACollection object for the next QA control to invoke during voice-only dialog processing.

The page level SpeechGroup control located on each page is also responsible for:
    Determining that the requesting client is a voice-only client; and
    Generating common script and supporting structures for all QA controls on each page.

When the first SpeechGroup control renders, it queries the System.Web.UI.Page.Request.Browser property for the browser string. This property is then passed to the RenderSpeechHTML and RenderSpeechScript methods for each QA control on the page. The QA control will then render for the appropriate client(multimodal or voice-only).

3.2 Creation of SpeechGroup Controls

During server-side page loading, the onLoad event is sent to each control on the page. The page-level SpeechGroup control is created by the first QA control receiving the onLoad event. The creation of SpeechGroup controls is done in the following manner: (assume a page containing composite controls)

Every QA control will receive onLoad event from run time code. onLoad for a QA:
    Get the QA's NamingContainer N1
    Search for SpeechGroup in the N1's children
        If already exists, register QA control with this SpeechGroup. onLoad returns.
        If not found:
            Create a new SpeechGroup G1, inserts it into the N1's children
            If N1 is not Page, find N1's NamingContainer N2
            Search for SpeechGroup in N2's children, if exists, say G2, add G1 to G2. If not, create a new one G2, inserts in to N2's children
            Recursion until the NamingContainer is the Page (top level)

During server-side page rendering, the Render event is sent to the speech-enabled page. When the page-level SpeechGroup control receives the Render event, it generates client side script to include RunSpeech.js and inserts it into the page that is eventually sent to the client device. It also calls all its direct children to render speech related HTML and scripts. If a child is SpeechGroup, the child in turn calls its children again. In this manner, the server rendering happens along the server side logical speech tree.

When a SpeechGroup renders, it lets its children (which can be either QA or SpeechGroup) render speech HTML and scripts in the order of their SpeechIndex. But a SpeechGroup is hidden and doesn't naturally have a SpeechIndex. In fact, a SpeechGroup will have the same SpeechIndex as its NamingContainer, the one it attaches to. The NamingContainer is usually a UserControl or other visible control, and an author can set SpeechIndex to it.

3.3 RunSpeech

The purpose of RunSpeech is to permit dialog flow via logic which is specified in script or logic on the client. In one embodiment, RunSpeech is specified in an external script file, and loaded by a single line generated by the server-side rendering of the SpeechGroup control, e.g.:

```
<script language="javascript"
    src="/scripts/RunSpeech.js" />
```

The RunSpeech.js script file should expose a means for validating on the client that the script has loaded correctly and has the right version id, etc. The actual validation script will be automatically generated by the page class as inline functions that are executed after the attempt to load the file.

Linking to an external script is functionally equivalent to specifying it inline, yet it is both more efficient, since browsers are able to cache the file, and cleaner, since the page is not cluttered with generic functions.

3.4 Events 3.4.1 Event Wiring

Tap-and-talk multimodality can be enabled by coordinating the activation of grammars with the onMouseDown event. The wiring script to do this will be generated by the Page based on the relationship between controls (as specified in the ControlsToSpeechEnable property of the QA control in).

For example, given an asp:TextBox and its companion QA control adding a grammar, the <input> and <reco> elements are output by each control's Render method. The wiring mechanism to add the grammar activation command is performed by client-side script generated by the Page, which changes the attribute of the primary control to add the activation command before any existing handler for the activation event:

```
<!-- Control output -->
<input id="TextBox1" type="text" .../>
<reco id="Reco1" ... />
    <grammar src="..." />
</reco>
<!-- Page output -->
<script>
    TextBox1.onMouseDown =
    "Reco1.Start( );"+TextBox1.onMouseDown;
</script>
```

By default, hook up is via onmousedown and onmouseup events, but both StartEvent and StopEvent can be set by web page author.

The textbox output remains independent of this modification and the event is processed as normal if other handlers were present.

3.4.2 Page Class Properties

The Page also contains the following properties which are available to the script at runtime:

SML—a name/value pair for the ID of the control and it's associated SML returned by recognition.

SpokenText—a name/value pair for the ID of the control and it's associated recognized utterance Confidence—a name/value pair for the ID of the control and it's associated confidence returned by the recognizer.

4 RunSpeech Algorithm

The RunSpeech algorithm is used to drive dialog flow on the client device. This may involve system prompting and dialog management (typically for voice-only dialogs), and/or processing of speech input (voice-only and multimodal dialogs). It is specified as a script file referenced by URI from every relevant speech-enabled page (equivalent to inline embedded script).

Rendering of the page for voice only browsers is done in the following manner:

The RunSpeech module or function works as follows (RunSpeech is called in response to document.onreadystate becoming "complete"):

(1) Find the first active QA control in speech index order (determining whether a QA control is active is explained below).
(2) If there is no active QA control, submit the page.
(3) Otherwise, run the QA control.

A QA control is considered active if and only if:
(1) The QA control's ClientTest either is not present or returns true, AND
(2) The QA control contains an active question control or statement control (tested in source order), AND
(3) Either:
    a. The QA control contains only statement controls, OR
    b. At least one of the controls referenced by the QA control's ControlsToSpeechEnable has an empty or default value.

A question control is considered active if and only if:
(1) The question control's ClientTest either is not present or returns true, AND
(2) The question control contains an active prompt object.

A prompt object is considered active if and only if:
(1) The prompt object's ClientTest either is not present or returns true, AND
(2) The prompt object's Count is either not present, or is less than or equal to the Count of the parent question control.

A QA control is run as follows:
(1) Determine which question control or statement control is active and increment its Count.
(2) If a statement control is active, play the prompt and exit.
(3) If a question control is active, play the prompt and start the Recos for each active answer control and command control.

An answer control is considered active if and only if:
(1) The answer control's ClientTest either is not present or returns true, AND
(2) Either:
    a. The answer control was referenced in the active question contol's Answers string, OR
    b. The answer control is in Scope A command control is considered active if and only if:
(1) It is in Scope, AND
(2) There is not another command control of the same Type lower in the scope tree.

RunSpeech relies on events to continue driving the dialog—as described so far it would stop after running a single QA control. Event handlers are included for Prompt.OnComplete, Reco.OnReco, Reco.OnSilence, Reco.OnMaxTimeout, and Reco.OnNoReco. Each of these will be described in turn.

RunSpeechOnComplete works as follows:
(1) If the active Prompt object has an OnClientComplete function specified, it is called.
(2) If the active Prompt object was contained within a statement control, or a question control which had no active answer controls, RunSpeech is called.

RunSpeechOnReco works as follows:
(1) Some default binding happens—the SML tree is bound to the SML attribute and the text is bound to the SpokenText attribute of each control in ControlsToSpeechEnable.

(2) If the confidence value of the recognition result is below the ConfidenceThreshold of the active answer control, the Confirmation logic is run.

(3) Otherwise, if the active answer control has on OnClientReco function specified, it is called, and then RunSpeech is called.

RunSpeechOnReco is responsible for creating and setting the SML, SpokenText and Confidence properties of the ControlsToSpeechEnable. The SML, SpokenText and Confidence properties are then available to scripts at runtime.

RunSpeechOnSilence, RunSpeechOnMaxTimeout, and RunSpeechOnNoReco all work the same way:

(1) The appropriate OnClientXXX function is called, if specified.

(2) RunSpeech is called.

Finally, the Confirmation logic works as follows:

(1) If the parent QA control of the active answer control contains any confirm controls, the first active confirm-control is found (the activation of a confirm control is determined in exactly the same way as the activation of a question control).

(2) If no active confirm control is found, RunSpeech is called.

(3) Else, the QA control is run, with the selected confirm control as the active question control.

For multi-modal browsers, only the grammar loading and event dispatching steps are carried out.

APENDIX C

1 Design Principles

In this embodiment, there is no concept of primary control to speech-enable as it existed in Appendix B. The speech layer provides input to the visual layer as well as explicit support for dialog flow management. The semantic layer implements the logic needed for confirmation and validation. In a multi-modal interaction, the semantic layer does not need to be used as confirmation and validation are visual and implemented using standard ASP.NET constructs. If desired though, the sematic layer can be updated with value changes made through visual or GUI interfaces in order that confirmation and validation can be still implemented.

Figure 13:
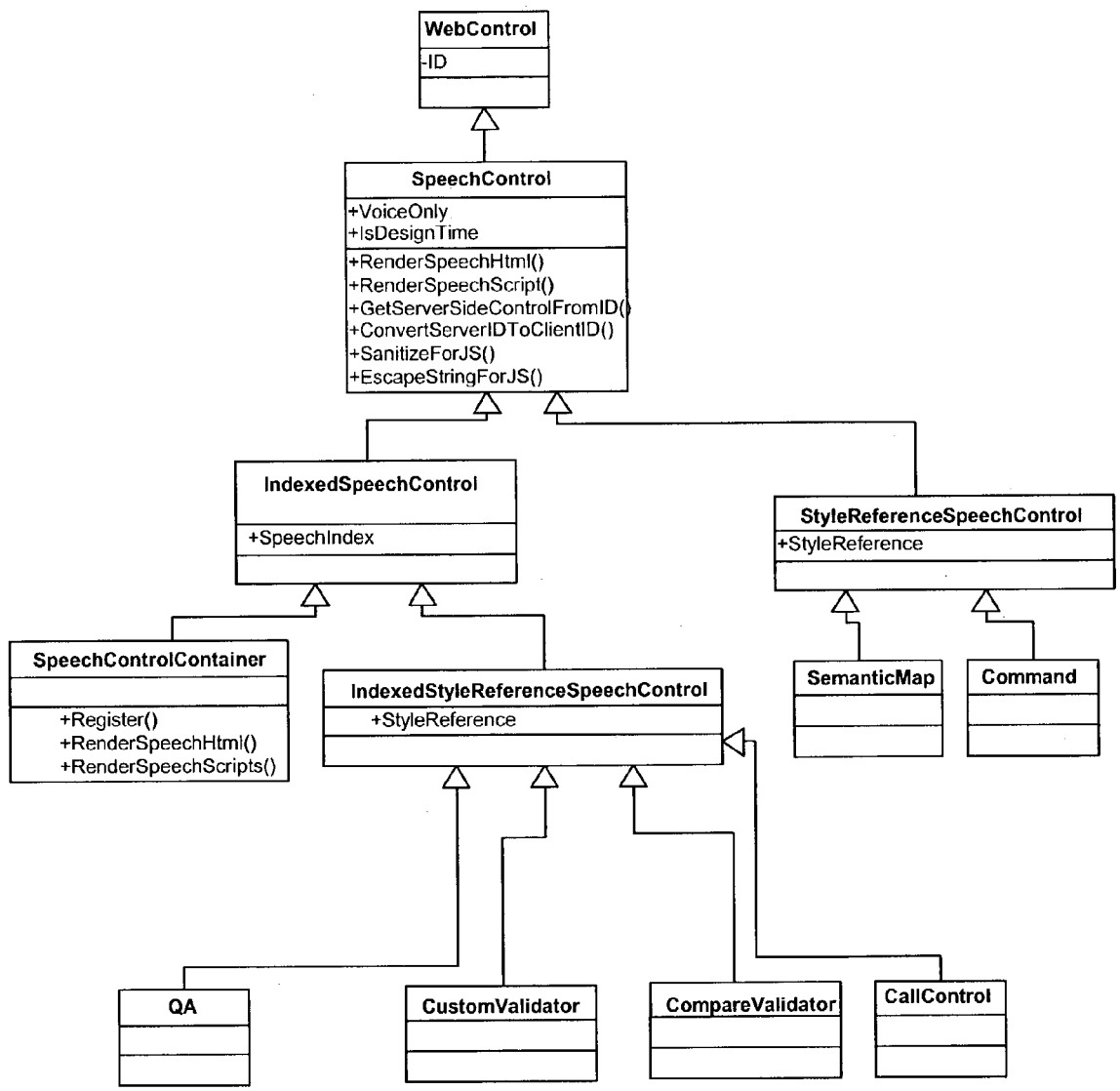
FIG. 13 is a block diagram illustrating speech controls inheritance for the second embodiment.

FIG. 13 illustrates the speech controls inheritance diagram.

2 Authoring Scenarios

The following provides examples of various forms of application scenarios.

2.1 Multimodal app, Tap-And-Talk

```
<speech:QA id="qa1" runat="server">
    <Answers>
        <speech:Answer SemanticItem="siText" ID="answer1"
            XpathTrigger="/sml/value"      runat="server">
        </speech:Answer>
    </Answers>
    <Reco StartEvent="textbox1.onmousedown"
    StopEvent="textbox1.onmouseup" ID="reco1"
    Mode="Single">
        <Grammars>
            <speech:Grammar
            Src="http://mysite/mygrammar.grxml"
            ID="Grammar1" runat="server">
            </speech:Grammar>
        </Grammars>
    </Reco>
</speech:QA>
```

2.2 Multimodal app, Click-And-Wait-For-Recognition

```
<speech:QA id="qa1" runat="server">
    <Reco id="reco1" StartEvent="textbox1.onmousedown"
    mode="automatic">
        <Grammars>
            <speech:grammar
            src="htp://mysite/mygrammar.grxml"
                    rnat="server"></speech:grammar>
        </Grammars>
    </Reco>
    <Answers>
        <speech:answer id="answer1"
        XpathTrigger="/sml/value" SemanticItem="siText"
        runat="server">
        </speech:answer>
    </Answers>
</speech:QA>
```

2.3 Multimodal app, Do-Field

```
<speech:QA id="qa1" runat="server">
    <Reco id="reco1"
    StartEvent="dofieldButton.onmousedown"
            StopEvent="dofieldButton.onmouseup"
    mode="multiple">
        <Grammars>
            <speech:grammar
        src="http://mysite/mylargegrammar.xml" runat="server">
            </speech:grammar>
        </Grammars>
    </Reco>
    <Answers>
        <speech:answer id="answer1"
        XpathTrigger="/sml/value1" SemanticItem="siOne"
        runat="server">
        </speech:answer>
        <speech:answer id="answer2"
        XpathTrigger="/sml/value2" SemanticItem="siTwo"
        runat="server">
        </speech:answer>
        speech:answer id="answer3"
        XpathTrigger="/sml/value3" SemanticItem="siThree"
            runat="server">
        </speech:answer>
        <speech:answer id="answer4"
        XpathTrigger="/sml/value4" SemanticItem="siFour"
        runat="server">
        </speech:answer>
        <speech:answer id="answer5"
        XpathTrigger="/sml/value5" SemanticItem="siFive"
        runat="server">
        </speech:answer>
    </Answers>
</speech:QA>
```

2.4 Voice Only app, Statement

```
<speech:QA id="welcome" PlayOnce="true" runat="server">
    <Prompt InLineprompt="Hello there!"></Prompt>
</speech:QA>
```

2.5 Voice Only app, Simple Question

```
<speech:QA id="qa1" runat="server">
    <Reco id="reco1" mode="automatic">
        <Grammars>
            <speech:grammar
        src="http://mysite/citygrammar.grxml"
        runat="server"></speech:grammar>
        </Grammars>
```

-continued

```
        </Reco>
        <Prompt InLinePrompt="Which city do you want to fly
to?"></Prompt>
        <Answers>
            <speech:answer id="answer1"
XpathTrigger="/sml/city" SemanticItem="siCity"
runat="server">
            </speech:answer>
        </Answers>
</speech:QA>
```

2.6 Voice Only app, Question with Mixed-Initiative (Optional Answers)

```
<speech:QA id="qa1" runat="server">
    <Reco id="reco1" mode="automatic">
        <Grammars>
            <speech:grammar
src="http://mysite/cityANDstate.xml"
runat="server"></speech:grammar>
        </Grammars>
    </Reco>
    <Prompt InLinePrompt="Which city do you want to fly
to?"></Prompt>
    <Answers>
        <speech:answer id="answer1"
XpathTrigger="/sml/city" SemanticItem = "siCity"
runat="server">
        </speech:answer>
    </Answers>
    <ExtraAnswers>
        <speech:answer id="answer2"
XpathTrigger="/sml/state" SemanticItem = "siState"
runat="server">
        </speech:answer>
    </ExtraAnswers>
</speech:QA>
```

2.7 Voice Only app, Explicit Confirmation

```
<speech:QA id="qa1" runat="server">
    <Reco id="reco1" mode="automatic">
        <Grammars>
            <speech:grammar
src="http://mysite/citygrammar.xml" runat="server">
            </speech:grammar>
        </Grammars>
    </Reco>
    <Prompt InLinePrompt="Which city do you want to fly
to?"></Prompt>
    <Answers>
        <speech:answer id="answer1"
XpathTrigger="/sml/city" SemanticItem="siCity"
confirmThreshold="0.75"           runat="server">
        </speech:answer>
    </Answers>
</speech:QA>
<speech:QA id="qa2" runat="server"
xpathAcceptConfirms="/sml/accept"
xpathDenyConfirms="/sml/deny">
    <Prompt InLinePrompt="Did you say
<SALT:value>textbox1.value</SALT:value>"></Prompt>
    <Reco id="reco1" mode="automatic">
        <Grammars>
            <speech:grammar
src="http://mysite/yes_no_city.xml"
runat="server"></speech:grammar>
        </Grammars>
    </Reco>
    <Confirms>
        <speech:answer id="answer2"
XpathTrigger="/sml/city" SemanticItem="siCity"
confirmThreshold="0.75"           runat="server">
        </speech:answer>
    </Confirms>
</speech:QA>
```

2.8 Voice Only app, Short Time-Out Confirmation

```
<speech:QA id="qa1" runat="server"
xpathAcceptConfirms="/sml/accept"
xpathDenyConfirms="/sml/deny"
    firstInitialTimeout="500">
    <Prompt InLinePrompt="Did you say
<SALT:value>textbox1.value</SALT:value>"></Prompt>
    <Reco id="reco1" InitialTimeout="350"
mode="automatic">
        <Grammars>
            <speech:grammar
src="http://mysite/yes_no_city.grxml"
runat="server"></speech:grammar>
        </Grammars>
    </Reco>
    <Confirms>
        <speech:answer XpathTrigger="/sml/city"
SemanticItem="siCity" confirmThreshold="0.75"
            runat="server">
        </speech:answer>
    </Confirms>
</speech:QA>
```

2.9 Voice Only app, Commands

```
<speech:QA id="qa1" runat="server">
    <Prompt id="prompt1" InLinePrompt="Where do you want
to fly to?"></Prompt>
    <Reco id="reco1" mode="automatic">
        <Grammars>
            <speech:grammar
src="http://mysite/city.grxml"
                runat="server"></speech:grammar>
        </Grammars>
    </Reco>
    <Answers>
        <speech:answer id="answer1"
XpathTrigger="/sml/city" SemanticItem="siCity"
runat="server"></speech:answer>
    </Answers>
</speech:QA>
<speech:Command id="command1" type="cancel" scope="qa1"
OnClientCommand="myCommand"
    runat="server"></speech:Command>
<script>
    function myCommand( )
    {    CallControl.HangUp( );   }
</script>
```

2.10 Voice Only app, Prompt Selection

```
<speech:QA id="qa1" runat="server">
    <Prompt id="prompt1" InLinePrompt="Where do you want
to fly to?"></Prompt>
    <Reco id="reco1" mode="automatic">
        <Grammars>
            <speech:grammar
src="http://mysite/city.grxml"
runat="server"></speech:grammar>
        </Grammars>
    </Reco>
    <Answers>
        <speech:answer id="answer1"
```

```
XpathTrigger="/sml/city" SemanticItem="siCity"
            runat="server"></speech:answer>
    </Answers>
</speech:QA>
<speech:Command id="command1" type="cancel" scope="qa1"
OnClientCommand="myCommand"
    runat="server"></speech:Command>
<script>
    function myCommand( )
    {    CallControl.Hangup( ); }
</script>
<speech:qa id="qa1" runat="server">
    <Prompt id="prompt1"
PromptSelectFunction="promptSelection" />
        <Reco id="reco1" mode="automatic">
            <Grammars>
                <speech:grammar src="http://mysite/city.xml"
runat="server"></speech:grammar>
            </Grammars>
        </Reco>
        <Answers>
            <speech:answer id="answer1"
XpathTrigger="/sml/city" SemanticItem="siCity"
            runat="server"></speech:answer>
    </Answers>
</speech:qa>
<script>
function promptSelection (lastCommandOrException, count,
answerArray)
{
    if (lastCommandOrException == "Silence")
    {
        return "Sorry, I couldn't hear you. Please speak
louder. Where do you want to fly to?";
    }
    else if (count>3)
    {
        return "Communication problems are preventing me
from hearing the arrival city. Please try again later.";
    }
        return "Where do you want to fly to?"; //Default
prompt
    }
}
</script>
```

2.11 Voice Only app, Implicit Confirmation

```
<speech:qa id="qa1" runat="server"
xpathDenyConfirms="/sml/deny"
xpathAcceptConfirms="/sml/accept">
    <Prompt id="prompt1"
PromptSelectFunction="promptSelection"></Prompt>
        <Reco id="reco1" mode="automatic">
            <Grammars>
                <speech:grammar
src="http://mysite/yes_no_city.xml"
runat="server"></speech:grammar>
            </Grammars>
        </Reco>
        <Answers>
            <speech:answer id="answer1"
XpathTrigger="/sml/date" SemItem="siDate"
            runat="server"></speech:answer>
        </Answers>
        <Confirms>
            <speech:answer id="confirm1"
XpathTrigger="/sml/city" SemItem="siCity"
            runat="server"></speech:answer>
        </Confirms>
</speech:qa>
<script>
function promptSelection (lastCommandOrException, count,
SemanticItemList)
{
    var myPrompt = "";
    if (SemanticItemList["siCity"].value != null)
    {
        myPrompt = "Flying from " +
SemanticItemList["siCity"].value + ". ";
        myPrompt += "On what date?";
    }
    else
    { myPrompt = "On what date?";
    }
        return myPrompt;
}
</script>
```

2.12 Voice Only app, QA with reco and dtmf

```
<speech:qa id="qa1" runat="server">
    <Prompt id="prompt1" InLinePrompt="Press or say one if
you accept the charges, two           if you
don't."></Prompt>
        <Reco id="reco1" mode="automatic">
            <Grammars>
                <speech:grammar
src="http://mysite/acceptCharges.xml"
            runat="server"></speech:grammar>
            </Grammars>
        </Reco>
        <Dtmf smlContext="sml/accept"></Dtmf>
        <Answers>
            <speech:answer id="answer1"
XpathTrigger="/sml/accept"
            SemanticItem="siAccept"
runat="server"></speech:answer>
        </Answers>
</speech:qa>
```

2.13 Voice-Only app, Record-Only QA

```
<speech:qa id="qa1" runat="server">
    <Answers>
        <speech:answer id="a1"
XpathTrigger="/SML/@recordlocation"
        SemanticItem = "foo"
runat="server"></speech:answer>
    </Answers>
    <Reco id="recordonly">
        <record beep="true"></record>
    </Reco>
</speech:qa></FORM>
```

3 Design Details

3.1 QA Activation (Voice-Only)

QA are tested for activeness in SpeechIndex order (see run-time behavior).

A QA is active when clientActivationFunction returns true AND

If the Answers array is non empty, the SemanticItems pointed to by the set of Answers are empty OR If the answers array is empty, at least one item in the Confirm array does need confirmation A QA can have only Answers (normal question: Where do you want to go?), only Confirms (explicit confirmation: Did you say Boston? or short time-out confirmation: Boston.), both (implicit confirmation: When do you want to fly to Boston?) or none (statement: Welcome to my application!).

A QA can have extra answers even if it has no answers (e.g., mixed initiative).

3.2 Answer, Confirm.

Upon recognition, commands are processed first, followed by Answers, ExtraAnswers and Confirms.

A target element (e.g. textbox1.value) can be in one of these states: empty, invalid, needsConfirmation, confirmed. A target is empty before any recognition result is associated with this item, or if the item has been cleared. A target is in needsConfirmation state when a recognition result has been associated with it, but the confidence level is below the confirmationThreshold for this item. And a target is confirmed when either a recognition result has been associated with it with a confidence level high enough or a confirmation loop set it to this state explicitly.

Answers are therefore responsible for setting the value in the target element and the confidence level (this is done in a semantic layer). Confirms are responsible for confirming the item, clearing it or setting it to a new value (with a new confidence level).

3.3 Command Execution (and Scope)

Commands specify a scope and are active for all QA's within that scope. The default processing of a command is to set the current QA's lastCommandException to the command's type. If the command specifies a Grammar, this grammar is activated in parallel with any grammars in the current Reco object. QAs can be modal (allowCommands=false), in which case, no commands will be processed for that particular QA.

3.4 Validators

A CompareValidator will be active when the value of the SemanticItemToValidate it refers to has not been validated by this validator. If SemanticItemToCompare is specified (rather than ValueToCompare), then the CompareValidator will only be active if the value of the SemanticItemToCompare is non-empty (i.e. if it has been assigned a value by a previous QA).

A CustomValidator will be active when the value of the SemanticItemToValidate it refers to has not been validated by this validator.

4 Run Time Behavior

4.1 Client Detection

The speech controls do pay attention to the variety of client that they are rendering for. If the client doesn't support SALT, the controls won't render any speech-related tags or script. Client detection is done by checking the browser capabilities and detecting whether it's a voice-only client (browser is Quadrant), or multimodal (IE, PocketIE, etc, with SALT support).

Hands-free is not a mode in the client, but rather an application-specific modality, and therefore the only support required is SALT (as in multimodal). Hands-free operation is therefore switched-on by application logic.

4.2 Multimodal

Support for multimodal applications is built in the speech controls. In multimodal operations commands, dtmf, confirm, prompts, etc do not make sense from an interaction point of view, so they won't be rendered. Tap-and-talk (or any other type of interaction, like click-and-wait-for-recognition) is enabled by hooking up the calls to start and stop recognition with GUI events using the Reco object attributes startElement/startEvent and stopElement/stopEvent, plus the Reco object mode attribute.

During render time, the speech controls are passed information specifying whether the client is a voice-only client or multmodal client. If the client is multimodal, the rendering process hooks the call to start recognition to the GUI event specified by the StartEvent attribute of the Reco object. The rendering process also hooks the call to stop recognition to the GUI event specified by the StopEvent attribute of the Reco object.

The multimodal client needs a mechanism which will invoke author-specified functions to handle speech-related events (e.g., timeouts) or recognition processing. This mechanism is the Multimodal.js script. Multimodal.js is specified in an external script file and loaded by a single line generated by server-side rendering, e.g.,

```
<script language="javascript"
src="/scripts/Multimodal.js" />
```

This method mirrors the ASP.NET way of generating 'system' client-side script loaded via URI. Linking to an external script is functionally equivalent to specifying it inline, yet is more efficient since clients are able to cache the file, and cleaner, since the page is not clutered with generic functions.

4.3 Voice-Only

4.3.1 Runtime Script (RunSpeech)

Unlike in a multimodal interaction, where the user initiates all speech input by clicking/selecting visual elements in the GUI, a mechanism is needed to provide voice-only clients with the information necessary to properly render speech-enabled ASP.NET pages. Such a mechanism must guarantee the execution of dialog logic and maintain state of user prompting and grammar activation as specified by the author.

The mechanism used by the Speech Controls is a client-side script (RunSpeech.js) that relies upon the SpeechIndex attribute of the QA control, plus the flow control mechanisms built in the framework (ClientActivationFunction, default activation rules, etc.). RunSpeech is loaded via URI similar to the loading mechanism of Multimodal.js as described above.

4.3.2 SpeechIndex

SpeechIndex is an absolute ordering index within a naming container.

If more than one speech control has the same SpeechIndex, they are activated in source order. In situations where some controls have SpeechIndex specified and some controls do not, those with SpeechIndex will be activated first, then the rest in source order.

NOTE: Speech index is automatically set to 0 for new controls. Dialog designers should leave room in their numbering scheme to insert new QA's later. Begin with a midrange integer and increment by 100, for example. For example number QA's 1000, 1100, 1200 instead of 1, 2, 3. this leaves room for a large number of QA's at any point the dialog and plenty of room to add QA's at the beginning.

4.3.3 ClientActivationFunction clientActivationFunction specifies a client-side script function which returns a boolean value to determine when this control is considered available for selection by the runtime control selection algorithm. If not specified, it defaults to true (control is active).

The system strategy can therefore be changed by using this as a condition to activate or de-activate QAs more sensitively than SpeechIndex. If not specified, the QA is considered available for activation.

4.3.4 Count

Count is a property of the QA control that indicates how many times that control has been activated consecutively. This Count property will be reset if the previously active QA is different that the current QA (same applies for Validators), otherwise, it is incremented by one. The Count property is exposed to application developers through the PromptSectionFunction of the Prompt object.

Controls Reference

General Authoring Notes

1. Script References are not Validated at Render Time.

The Speech Controls and objects described in this section contain attributes whose values are references to script functions written by the dialog author. These functions are executed on client devices in response to speech-related events (e.g. expiration of timeout) or as run time processing (e.g. modification of prompt text prior to playback). Render time validation is not performed on script references, i.e., no checks for existence of script functions is done during rendering of controls. If an attribute contains a reference to a client-side script function and the function does not exist, client-side exceptions will be thrown.

In voice-only mode, script functions generating exceptions during runtime will cause a redirection to the error page defined in the Web.config file. If no error page is defined, RunSpeech will continue to execute without reporting the exception.

2. All Speech Controls should be contained within ASP.NET <Form> Tag or Equivalant.

The Speech Control described in this section must all be placed in ASP.NET web pages inside the <form> tag. Behavior of controls placed outside the <form> tag is undefined.

3. Client-Side Script References must Refer to Function and not Include Parenthes.

Using the PromptSelectFunction as an example. the following is correct syntax:

```
<Prompt id="P1" PromptSelectFunction="mySelectFunction" />
//using "mySelectFunction( )" is incorrect syntax
```

4. IE Requires Exact Cases when Running Jscript.

Therefore, the case for event values specified in the StartEvent and StopEvent attributes of the Prompt object must be exactly as those events are defined. This happens to be all lowercase letters for most standard IE events. For example, the onmouseup and onmousedown events must be specified in all lowercase letters.

5. All Speech Controls Expose the Common Attribute id.

6. Behavior of Visible and Enabled Properties of Speech Controls.

Setting the visible or enabled properies of Speech Controls to "False" will cause them not to render.

7. Mimimum Client Requirements

In one embodiment, clients must be running IE6.0 or greater and JScript 5.5 or greater for speech controls and associated script functions to work properly.

8. Rendering <smex> to Telserver

The speech controls automatically handle rendering <smex> tags to the telephony server on every page as is required by the server. In one embodiiment, smex tags are rendered whether the client is the tel server or the desktop client.

5 Global Application Settings

Speech Controls provide mechanisms that allow dialog authors to specify values to control properties on an application or page basis.

5.1 Application-Level Settings 5.1.1 Application Global Variables

Dialog authors may use their application's Web.config file to set values of global variables for speech-enabled web applications. The values of the global variables persist throughout the entrie lifetime of the web application. 'Errorpage' is the only global variable that may be specified and is set for the application during render time.

```
<appSettings>
    <add key="errorpage" value="..." />
</appSettings>
```

The <appsettings> tag must be placed one level inside the <configuration> tag within the Web.config file.

The errorpage key specifies a URI to a default error page. Redirection to this error page will occur during run time when the speech platform or the DTMF engine returns an error. A default error page is included with the SDK; the user can also create a custom error page.

Note: Developers who create their own error page must call window.close at the bottom of the error page in the voice only case in order to release the call.

5.1.2 Application-Level Setting of Common Control Properties

Dialog authors may use their application's Web.config file to set values of common control properties and have those values persist during the lifetime of the web application. For example, an author may wish use the Web.config file to set the maxTimeout value for Reco objects in their application. The properties are set in the Web.config file using the following syntax:

```
<configuration>
    <SpeechStyleSheet>
        <Style id="style1" >
            <QA allowCommands="false">
                ...
                <Prompt bargein="false" ... />
                <Reco maxTimeout="5000"... />
                <Dtmf preFlush="true" ... />
                <Answers confirmThreshold="0.80" ... />
                <ExtraAnswers confirmThreshold="0.80"
        .../>
                <Confirms confirmThreshold="0.80"... />
            </QA>
            <Command .../>
            <CustomValidator .../>
            <CompareValidator .../>
            <SemanticItem .../>
        </Style>
    </SpeechStyleSheet>
</configuration>
```

The Reco corresponding Reco object would reference the "style1" Style:
<Reco id="reco1" . . . StyleReference="style1" . . . />

If the Style id is "globalstyle," the property values set in the Style apply application-wide to pertinent controls. So, in the above example, if id=" " (or the property is omitted from the Style tag), a maxTimeout of 5000 milliseconds will be used for all Reco objects in the application (uless overridden).

For a complete list of properties which are settable through the SpeechStyleSheet, see below.

6 StyleSheet Control

The StyleSheet control allows dialog authors to set values to common control properties at a page-level scope. The StyleSheet control is a collection of Style objects. The Style object exposes properties of each control that are settable on a page-level basis. The StyleSheet control is rendered for both multimodal and voice-only modes. An exception will be thrown if the StyleSheet control contains an object which is not a Style object.

```
class StyleSheet : SpeechControl
{
    string          id{get; set;};
    StyleCollection Styles{get;};
}
```

6.1 StyleSheet Properties

Styles

Optional. Used in both multimodal and voice-only modes. The Styles property is a collection of Style objects used to set property values for Speech Controls and their objects. The property values last during the lifetime of the current page.

7 Style Object

The Style object is used to set property values for Speech Controls and their objects. The property values last during the lifetime of the current page.

```
class Style : Control
{
    string              id{get; set;};
    string              StyleReference{get; set;};
    QAStyle             QA{get; set;};
    CommandStyle        Command{get; set;};
    CustomValidatorStyle    CustomValidator{get; set;};
    CompareValidatorStyle   CompareValidator{get; set;};
    SemanticItemStyle       SemanticItem{get; set;};
}
```

7.1 Style Properties id

Required. The programmatic name of the Style object.

StyleReference

Optional. Used in both multimodal and voice-only modes. Specifies the name of a Style object. At render time, the StyleSheet control will search for the named Style object and also set property values specified in the named Style. An exception is thrown for an invalid StyleReference.

For every property of a speech control with a StyleReference, the value is determined as follows:

1. the value is set directly in the speech control
2. the style object directly referenced
3. any style referenced by a style
4. the global style object
5. the speech control default value.

The following example sets shows two QA properties are set using StyleReference:

```
<speech:StyleSheet id="SS">
    <speech:Style id="base_style" >
        <QA OnClientActive="myOnClientActive"/>
    </speech:Style>
    <speech:Style id="derived_style"
        StyleReference="base_style">
        <QA PlayOnce="true"/>
    </speech:Style>
</speech:StyleSheet>
```

QA

Optional. The QA property of the Style object is used to set property values for all QA controls on a page that reference this Style. The following example shows how to set the AllowCommands and PlayOnce properties for the QA controls that reference this Style:

```
<speech:StyleSheet id="SS1">
    <speech:Style id="WelcomePageQA_Style" >
        <QA AllowCommands="false" PlayOnce="true"/>
    </speech:Style>
</speech:StyleSheet>
<QA id="..." StyleReference="WelcomePageQA_Style" .../>
```

The next example shows how to set the bargein property of all Prompt objects on a given page using Params:

```
<speech:StyleSheet id="SS2">
<Style Name="Style1">
    <QA>
        <Answers ConfirmThreshold="0.8" Reject="0.4"/>
        <Prompt>
            <Params>
                <Param name="BargeinType" value="grammar"/>
                <Param name="foo" value="bar" />
            <Params>
        </Prompt>
    </QA>
</Style>
</speech:StyleSheet>
```

The next example shows how to set the bargein property of all Prompt objects on a given page using Params:

```
<speech:StyleSheet id="SS2">
<Style Name="Style1">
    <QA>
        <Answers ConfirmThreshold="0.8" Reject="0.4"/>
        <Prompt>
            <Params>
                <Param name="BargeinType" value="grammar"/>
                <Param name="foo" value="bar" />
            <Params>
        </Prompt>
    </QA>
</Style>
</speech:StyleSheet>
```

Command

Optional. The Command property of the Style object is used to set property values for all Command controls on a page that reference this Style.

CustomValidator

Optional. The CustomValidator property of the Style object is used to set property values for all CustomValidator controls on a page that reference this Style.

CompareValidator

Optional. The CompareValidator property of the Style object is used to set property values for all CompareValidator controls on a page that reference this Style.

SemanticItem

Optional. The SemanticItem property of the Style object is used to set property values for all SemanticItem controls on a page the reference this Style.

The following properties may be set using the Style object.

QA Properties

AllowCommands
PlayOnce
XpathAcceptConfirms
XpathDenyConfirms
AcceptRejectThreshold
DenyRejectThreshold
FirstInitialTimeout
ConfirmByOmission
ConfirmIfEqual
OnClientActive
OnClientListening
OnClientComplete.

Prompt Properties

These apply to Prompts in QA, CompareValidator, CustomValidator and Command controls.
Bargein
OnClientBookmark
OnClientError
Prefetch
Type
Lang
Params
Reco Properties
StartEvent
StopEvent
Mode
InitialTimeout
BabbleTimeout
MaxTimeout
EndSilence
Reject
OnClientSpeechDetected
OnClientSilence
OnClientNoReco
OnClientError
Lang
Params
Grammar Properties These apply to both Reco and Dtmf grammars.
Type
Lang
Dtmf Properties
InitialTimeout
InterDigitTimeout
OnClientSilence
OnClientKeyPress
OnClientError
Params
Answer Properties These apply to the Answers, ExtraAnswers and Confirms collections.
ConfirmThreshold
Reject
Command Properties
Scope
AcceptCommandThreshold
CompareValidator Properties
ValidationEvent
Operator
Type
InvalidateBoth
CustomValidator Properties
ValidationEvent
SemanticItem Properties
BindOnChange

8 QA Control

The QA control is responsible for querying the user with a prompt, starting a corresponding recognition object and processing recognition results.

The QA control is rendered for both multimodal and voice-only modes.

```
class QA : IndexedStyleReferenceSpeechControl
{
    string      id{get; set;};
    int         SpeechIndex{get; set;};
    string      ClientActivationFunction{get; set;};
```

-continued

```
    string              OnClientActive{get; set;};
    string              OnClientComplete{get; set;};
    string              OnClientListening{get; set;};
    bool                AllowCommands{get; set;};
    bool                PlayOnce{get; set;};
    string              XpathAcceptConfirms{get; set;};
    string              XpathDenyConfirms{get; set;};
    float               AcceptRejectThreshold{get; set;};
    float               DenyRejectThreshold{get; set;};
    float               FirstInitialTimeout{get; set;};
    string              StyleReference{get; set;};
    bool                ConfirmByOmission{get; set;};
    bool                ConfirmIfEqual{get; set;};
    AnswerCollection    Answers{get;};
    AnswerCollection    ExtraAnswers{get;};
    AnswerCollection    Confirms{get;};
    Prompt              Prompt{get;};
    Reco                Reco{get;};
    Dtmf                Dtmf{get;};
}.
```

8.1 QA Properties

All properties of the QA control are available to the application developer at design time.

SpeechIndex

Optional. Default is Zero, which is equivalent to no SpeechIndex. Only used in voice-only mode. Specifies the activation order of speech controls on a page and the activation order of composite controls. All controls with SpeechIndex>0 will be run and then controls with SpeechIndex=0 will be run in source order. If more than one control has the same SpeechIndex, they are activated in source order. In situations where some controls specify SpeechIndex and some controls do not, those with SpeechIndex specified will be activated first, then the rest in source order. SpeechIndex values start at 1. An exception will be thrown for non-valid values of SpeechIndex.

ClientActivationFunction

Optional. Only used in voice-only mode. Specifies a client-side script function which returns a Boolean value to determine when a QA control is considered available for selection by the run-time control selection algorithm. If not specified, it defaults to true (control is active). The signature for ClientActivationFunction is as follows:

bool ClientActivationFunction (object lastActiveObj, string lastCommandorException, int count)

where:

lastActiveObj is the last active control, e.g. QA, CustomValidator or CompareValidator. For the first activated QA on a page, lastActiveObj will be null.

lastCommandOrException is a Command type (e.g., "Help") or a Reco event (e.g., "Silence" or "NoReco") of the last active control. For the first activated QA on a page or if the last active control is a validator, lastCommandOrException will be an empty string.

count number of times the last active QA has been activated consecutively, 1 if this is the first acvtive QA on the page. Count starts at 1 and has no limit. However, for the first activated QA on a page, count will be set to zero.

OnClientActive

Optional. Used in both multimodal and voice-only modes. Specifies a client-side script that will be called after RunSpeech determines this QA is active (voice-only mode) or after the startEvent is fired (in multimodal) and before processing the QA (e.g., playing a prompt or starting recognition). The onClientActive function does not return values. The signature for onClientActive is as follows:

function onClientActive(string eventsource, string lastCommandOrException, int Count, object SemanticItemList)
where:
eventsource is the id of the object (specified by Reco.StartEvent) whose event started the Reco associated with the QA (for multimodal). eventsource will be null in voice-only mode.
lastCommandOrException is a Command type (e.g., "Help") or a Reco event (e.g., "Silence" or "NoReco") for voice-only mode. lastCommandOrException is the empty string for multimodal.
Count is the number of times the QA has been activated consecutively. Count starts at 1 and has no limit for voice-only mode. Count is zero for multimodal.
SemanticItemList For voice-only mode, SemanticItemList is an associative array that maps semantic item id to semantic item objects. For multimodal, SemanticItemList will be null.
OnClientComplete
Optional. Used in both multimodal and voice-only modes. Specifies a client-side script that will be called after execution of a QA (successfully or not) and before passing dialog control back to the RunSpeech algorithm (in voice-only) or the end user (in multimodal). The OnClientComplete function is called before postbacks to the server for QAs whose AutoPostBack attribute of the Answer object is set to true. The onClientComplete function does not return values. The signature for onClientComplete is as follows:
function onClientComplete (string eventsource, string lastCommandOrException, int Count, object SemanticItemList)
where:
eventsource is the id of the object (specified by Reco.StopEvent) whose event stopped the Reco associated with the QA (for multimodal). eventsource will be null in voice-only mode.
lastCommandOrException is a Command type (e.g., "Help") or a Reco event (e.g., "Silence" or "NoReco") for voice-only mode. lastCommandOrException is the empty string for multimodal.
Count is the number of times the QA has been activated consecutively. Count starts at 1 and has no limit for voice-only mode. Count is zero for multimodal.
SemanticItemList For voice-only mode, SemanticItemList is an associative array that maps semantic item id to semantic item objects. For multimodal, SemanticItemList will be null.
OnClientListening
Optional. Used in both multimodal and voice-only modes. Specifies a client-side script (function) that will be called/executed after successful start of the reco object. The main use is so the GUI can change to show the user that they can start speaking. The function does not return any values. The signature for OnClientListening is as follows:
function onClientListening(string eventsource, string lastCommandOrException, int Count, object SemanticItemList)
where:
eventsource is the id of the object (specified by Reco.StartEvent) whose event started the Reco associated with the QA (for multimodal). eventsource will be null in voice-only mode.
lastCommandOrException is a Command type (e.g., "Help") or a Reco event (e.g., "Silence" or "NoReco") for voice-only mode. lastCommandOrException is the empty string for multimodal.
Count is the number of times the QA has been activated consecutively. Count starts at 1 and has no limit for voice-only mode. Count is zero for multimodal.
SemanticItemList For voice-only mode, SemanticItemList is an associative array that maps semantic item id to semantic item objects. For multimodal, SemanticItemList will be null.

Note: In multimodal mode OnClientListening is only available if author chooses to use StartEvent. If author decides to start reco programmatically, then onClientListening is not called for the author because the author can detect when reco.start returns successfully.

Note: OnClientListening is ignored when specified in QA's that do not contain reco objects.

AllowCommands
Optional. Only used in voice-only mode. Indicates whether or not Commands may be activated for a QA control. When AllowCommands is set to false, no commands may be activated. Defaults to true.

PlayOnce
Optional. Only used in voice-only mode. Specifies whether or not a QA may be activated more than once per page. If not specified, PlayOnce is set to false. PlayOnce="true" may be used to author statements like welcoming prompts. When a QA is reduced to a statement (no reco), setting PlayOnce="false" will provide dialog authors with the capability to enable a "repeat" functionality on a page that reads email messages.

XpathAcceptConfirms
Optional. Only used in voice-only mode. Specifies the path in the sml document (recognition result) that indicates the confirm items were accepted. Required if Confirms are specified. If XpathAcceptConfirms is specified without a Confirm being specified it is ignored. XpathAcceptConfirms must be a valid xml path. An invalid xml path will cause a redirection to the default error page during run time.

XpathDenyConfirms
Optional. Used only in voice-only mode. Specifies the path in the sml document that indicates the confirm items were denied. Required if Confirms are specified. If a Confirm is specified and XpathDenyConfirms is not set an exception is thrown. If XpathDenyConfirms is specified without a Confirm being specified it is ignored. XpathDenyConfirms must be a valid xml path. An invalid xml path will cause a redirection to the default error page during run time.

AcceptRejectThreshold
Optional. Used only in voice-only mode. If confidence for an accept confirm is not above this threshold no action will be taken. Legal values are 0-1 and are platform specific. An exception will be thrown for out of range AcceptRejectThreshold values. Default is zero DenyRejectThreshold
Optional. Used only in voice-only mode. If confidence for a deny confirm is not above this threshold no action will be taken. Legal values are 0-1 and are platform specific. An exception will be thrown for out of range DenyRejectThreshold values. Default is zero.

FirstInitialTimeout
Optional. Only used in voice-only mode. Specifies the initial timeout in msec for the QA when count==1. The status of the TargetElements specified in the Confirms answer list will be set to "Confirmed" if no speech is detected within firstInitialTimeout milliseconds. If not specified the default value of firstInitialTimeout is 0, which means that silence does not imply confirmation of the Answer. An exception will be thrown if firstInitialTimeout is specified for a QA that does not contain Confirms. An exception will be thrown for negative values of FirstInitialTimeout.

StyleReference

Optional. Used in both multimodal and voice-only modes. Specifies the name of a Style object. At render time, the QA control will search for the named Style control and will use any property values specified on the Style as default values for its own properties. Explicitly set property values on the control will override those set on the Style.

ConfirmByOmission

Optional. Used only in voice-only mode. Default is true. This flag controls confirmation of more than one item. If the flag is set to true, then any semantic items whose xpath is not present in the reco result, will be set to Confirmed. ConfirmByOmission enables the following scenario:
(ConfirmByOmission=true)
Q: Flying from?
A: Boston.
Q: Flying to?
A: Seattle.
Q: From Boston to Seattle?
A: From NY.
(Seattle is confirmed as destination city).

ConfirmIfEqual

Optional. Used only in voice-only mode. Default is true. This flag controls the processing of corrections during confirmation. If ConfirmIfEqual is true and a recognized correction is the same value already in the semantic item, the item is maked confirmed. If ConfirmIfEqual is false and a recognized correction is the same value already in the semantic item, the item is maked as needing confirmation.

Answers

Optional. An array of answer objects. This list of objects is used both to determine activation, and to carry out semantic processing logic. An exception will be thrown if an Answers collection contains non-answer objects.

ExtraAnswers

Optional. An array of answer objects. These items are not used for activation, but they are taken into account when processing recognition results. If an ExtraAnswer is recognized, it will overwrite the semantic item it points to, even if it was previously confirmed.

Confirms

Optional. An array of answer objects. These items are used for activation if the answers array is empty and they affect the confirmation logic.

Prompt

Optional for multimodal. Required for voice-only. An exception is thrown if a Prompt is not specified in voice-only mode.

Reco

Optional for multimodal and voice-only. Typically, only one reco can be specified in a QA.

Dtmf

Optional. Only used in voice-only mode. Typically, only one Dtmf can be specified in a QA.

9 Command Control

The Command control provides a way for obtaining user input that is not an answer to the question at hand (eg, Help, Repeat, Cancel), and which does not map to textual input into primary controls. A Command specifies an activation scope, which means that its grammar is active (in parallel with the current recognition grammar) for every QA within that scope. Commands have a type attribute which is used to implement a chain of events: Commands of the same type at QAs lower in scope can override superior commands with context-sensitive behavior (and even different/extended grammars if necessary) and to notify the QA what command was uttered (via the reason parameter)

Commands are not rendered for multimodal mode.

```
class Command : SpeechControl
{
    string              id{get; set;};
    string              Scope{get; set;};
    string              Type{get; set;};
    string              XpathTrigger{get; set;};
    float               AcceptCommandThreshold{get; set;};
    string              OnClientCommand{get; set;};
    bool                AutoPostBack{get; set;};
    TriggeredEventHandler    OnTriggered;
    string              StyleReference{get; set;};
    Prompt              Prompt{get;};
    Grammar             Grammar{get;};
    Grammar             DtmfGrammar{get;};
}
```

9.1 Conmand Properties

All properties of the Command control are available to the application developer at design time.

Scope

Required. Only used in voice-only mode. Specifies the id of a QA or other ASP.NET control (e.g., form, panel, or table). Scope is used in Commands to specify when the Command's grammars will be active. Exceptions are thrown if Scope is invalid or not specified.

Type

Required. Only used in voice-only mode. Specifies the type of command (eg 'help', 'cancel' etc.) in order to allow the overriding of identically typed commands at lower levels of the scope tree. Any string value is possible in this attribute, so it is up to the author to ensure that types are used correctly. An exception is thrown if Type is not specified.

Note: An exception will be thrown if more than 1 Command of same Type has the same Scope. For example, 2 Type-"Help" Commands for the same QA (Scope="QA1").

AcceptCommandThreshold

Optional. Only used in voice-only mode. Specifies the minimum confidence level of recognition that is necessary to trigger the command (this is likely to be used when higher than usual confidence is required, e.g. before executing the result of a 'Cancel' command). Legal values are 0-1. Default value is 0. Exceptions will be thrown for out of range AcceptCommandThreshold values.

If a command is matched (its xpathTrigger is present in the recoResult) no further commands will be processed, and no Answers, ExtraAnswers, Confirms, etc. will be processed. Then, if the confidence of the node specified by XpathTrigger is greater than or equal to the acceptThreshold, the active QAs LastCommandOrException is set to the Command's type, and the Command's onCommand function is called. Otherwise (if the confidence of the node is less than the acceptThreshold) the active QAs LastCommandOrException is set to "NoReco" and the active QAs Reco's OnClientNoReco function is called.

XpathTrigger

Required. Only used in voice-only mode. SML document path that triggers this command. An exception will be thrown if XpathTrigger is not specified. XpathTrigger must be a valid xml path. An invalid xml path will cause a redirection to the default error page during run time.

OnClientCommand

Optional. Only used voice-only mode. Specifies the client-side script function to execute on recognition of the Command's grammar. The function does not return any values. The signature for OnClientCommand is as follows:

function OnClientCommand(XMLNode smlNode)
where: smlNode is the matched SML node.

Note: If AutoPostBack is set to true, the OnClientCommand function is executed before posting back to the server. If the author wishes to persist any page state across postback, the OnClientCommand function is a good place to invoke the ClientViewState object of RunSpeech.

AutoPostBack

Optional. Only used in voice-only mode. Specifies whether or not the Command control posts back to the server each time a Command grammar is recognized. Default is false. If set to true, the server-side Triggered event is fired.

The internal state of the voice-only page is maintained automatically during postback. Authors may use the ClientViewState object of RunSpeech to declare and set additional values they wish to persist across postbacks.

OnTriggered

Optional. Only used in voice-only mode. Specifies a server-side script function to be executed when the Triggered event is fired (see autopostback attribute above). This handler must have the form (in C#—the signature would look slightly different in other languages):

void myFunction (object sender, CommandTriggeredEventArgs e);

The handler can be assigned to in two different ways—declaratively:

```
<speech:Command ... OnTriggered="myFunction" .../>
or programmatically:
Command.Triggered += new TriggeredEventHandler( myFunction
);
```

TriggeredEventHandler is what is called a "delegate"—it basically specifies the signature of functions which can handle its associated event type. It looks like this:

public delegate void TriggeredEventHandler(object sender, TriggeredEventArgs e);

where:

TriggeredEventArgs is a class derived from System.EventArgs which contains one public property, string Value.

An exception will be thrown if AutoPostBack is set to true and no handler is specified for the Triggered event. An exception will be thrown if AutoPostBack is set to false and a handler is specified for the Triggered event.

StyleReference

Optional. Only used in voice-only mode. Specifies the name of a Style object. At render time, the QA control will search for the named Style control and will use any property values specified on the Style as default values for its own properties. Explicitly set property values on the control will override those set on the Style.

Prompt

Optional. May be used to specify prompt to be played for global commands.

Granmar

Optional. The grammar object which will listen for the command.

Note: The grammar object is optional because the QA scoped by this command may contain the rule that generates this command's Xpath. The author has the flexibility of specifying the rule in the QA control or the Command control.

DtmfGrammar

Optional. The DtmfGrammar object which will activate the command. Available at run time.

Note: The DtmfGrammar object is optional because the QA scoped by this command may contain the rule that generates this command's Xpath. The author has the flexibility of specifying the rule in the QA control or the Command control. DtmfGrammars for all Commands along the QA's scope chain will be combined into the Grammars collection for the QA's Dtmf object.

Speech Controls does not provide a set of common commands—e.g., help, cancel, repeat.

10 CompareValidator Control

This control compares two values, applying the operator, and if the comparison is false, invalidates the item specified by SemanticItemToValidate. Optionally, both items (ToCompare and ToValidate) are invalidated. The CompareValidator is triggered on the client by change or confirm events; however, validation prompts are played in SpeechIndex order.

The CompareValidator control is rendered for voice-only mode. For multimodal, ASP.NET validator controls may be used.

```
class CompareValidator : IndexedStyleReferenceSpeechControl
{
    string                  id{get; set;};
    int                     SpeechIndex{get; set;};
    ValidationType          Type{get; set;};
    string                  ValidationEvent{get; set;};
    string                  SemanticItemToCompare{get;
set;};
    string                  ValueToCompare{get; set;};
    string                  SemanticItemToValidate{get;
set;};
    ValidationCompareOperator    Operator{get; set;};
    bool                    InvalidateBoth{get; set;};
    string                  StyleReference{get; set;};
    Prompt                  Prompt{get;};
}
```

10.1 CompareValidator Properties

All properties of the CompareValidator control are only used in voice-only mode and are available to the application developer at design time.

SpeechIndex

Optional. Specifies the activation order of CompareValidator controls on a page. If more than one control has the same SpeechIndex, they are activated in source order. In situations where some controls specify SpeechIndex and some controls do not, those with SpeechIndex specified will be activated first, then the rest in source order. SpeechIndex values start at 1. An exception will be thrown for non-valid values of SpeechIndex.

Type

Required. Sets the datatype of the comparison. Legal values are "String", "Integer", "Double", "Date", and "Currency". Default value is "String".

ValidationEvent

Default is "onconfirmed". ValidationEvent may be set to one of two values, either "onchange" or "onconfirmed".

If ValidationEvent is set to "onchanged", the CompareValidator will be run each time the value of the Text property of the associated SemanticItem changes. The CompareValidator control will be run before the SemanticItem's OnChanged handler is called. The SemanticItem's OnChanged handler will only be called if the CompareValidator does indeed validate the changed data. If the CompareValidator invalidates the data, the State of the SemanticItem is set to Empty and the OnChanged handler is not called.

If ValidationEvent is set to "onconfirmed", the CompareValidator will be run each time the State of the associated SemanticItem changes to Confirmed. The CompareValidator control will be run before the SemanticItem's OnConfimed handler is called. The SemanticItem's OnConfirmed handler will only be called if the CompareValidator does indeed validate the changed data. If the CompareValidator invalidates the data, the State of the SemanticItem is set to Empty and the OnConfirmed handler is not called.

After processing all SemanticItems involved a recognition turn, RunSpeech starts again. At that point, the previously failed validators will be active and RunSpeech will select the first QA/Validator that is active in SpeechIndex order. It is the author's responsibility to place the validator controls directly before the QA control that collects the answer for the SemanticItem in order to get the correct behavior.

SemanticItemToCompare

Optional. Either SemanticItemToCompare or ValueToCompare must be specified. Specifies the Id of the SemanticItem which will be used. as the basis for the comparison. Available at design time and run time. An exception will be thrown if either SemanticItemToCompare or ValueToCompare is not specified.

ValueToCompare

Optional. Either SemanticItemToCompare or ValueToCompare must be specified. Specifies the value to be used as the basis for the comparison. The author may wish to specify the value here instead of taking the value from the semantic item. If both ValueToCompare and SemanticItemToCompare are set, SemanticItemToCompare takes precedence. An exception will be thrown if either SemanticItemToCompare or ValueToCompare is not specified. An exception will be thrown if ValueToCompare can not be converted to a valid Type.

SemanticItemToValidate

Required. Specifies the Id of the SemanticItem that is being validated against either ValueToCompare or SemanticItemToCompare. An exception will be thrown for unspecified SemanticItemToValidate.

Operator

Optional. One of "Equal", "NotEqual", "GreaterThan", "GreaterThanEqual", "LesserThan", "LesserThanEqual", "DataTypeCheck". Default value is "Equal". The values are compared in the following order: Value to Validate [operator] ValueToCompare.

InvalidateBoth

Optional. If true, both SemanticItemToCompare and SemanticItemToValidate are marked Empty. Default is false (i.e., invalidate only the SemanticItemtToInvalidate). If SemanticItemToValidate has not been set (i.e. ValueToCompare has been specified), InvalidateBoth is ignored.

The following example illustrates the usage of the InvalidateBoth attribute. The scenario is an itinerary application. The user has already been prompted and answered the question for departing city. At this point in the dialog an ASP.NET textbox control has been filled with the recognition results (assume txtDepartureCity.Value="Austin").

The next QA prompts the user for the arrival city, the SemanticItem object binds to txtArrivalCity.Value.

In response to the prompt, the user says "Boston". However, the recognition engine returns "Austin" (e.g. arrival city is same as departing city).

The CompareValidator control may be used to direct the dialog flow in this case to re-prompt the user for both departing and arriving cities:

```
<CompareValidator    id="compareCities" SpeechIndex="5"
Type="String"
         SemanticItemToCompare="si__DepartureCity"
         SemanticItemToValidate="si__ArrvivalCity"
         Operator="NotEqual"
         InvalidateBoth="True"
         runat="server"
</CompareValidator>
```

StyleReference

Optional. Specifies the name of a Style object. At render time, the QA control will search for the named Style control and will use any property values specified on the Style as default values for its own properties. Explicitly set property values on the CompareValidator control will override those set on the Style.

Prompt

Optional. Prompt to indicate the error.

11 Customvalidator Control

The CustomValidator control is used to validate recognition results when complex validation algorithms are required. The control allows dialog authors to specify their own validation routines. The CustomValidator is triggered on the client by change or confirm events; however, validation prompts are played in SpeechIndex order.

The CustomValidator control is only rendered for voice-only mode. For multimodal, ASP.NET validator controls may be used.

```
class CustomValidator : IndexedStyleReferenceSpeechControl
{
    string    id{get; set;};
    int       SpeechIndex{get; set;};
    string    ValidationEvent{get; set;};
    string    SemanticItemToValidate{get; set;};
    string    ClientValidationFunction{get; set;};
    string    StyleReference{get; set;};
    Prompt    Prompt{get;};
}
```

11.1 CustomValidator Properties

All properties of the CustomValidator control are only used in voice-only mode and are available to the application developer at design time.

SpeechIndex

Optional. Only used in voice-only mode. Specifies the activation order of speech controls on a page and the activation order of composite controls. If more than one control has the same SpeechIndex, they are activated in source order. In situations where some controls specify SpeechIndex and some controls do not, those with SpeechIndex specified will be activated first, then the rest in source order. SpeechIndex values start at 1. An exception will be thrown for non-valid values of SpeechIndex.

ValidationEvent

Default is "onconfirmed". ValidationEvent may be set to one of two values; either "onchange" or "onconfirmed".

If ValidationEvent is set to "onchanged", the CustomValidator will be run each time the value of the Text property of the associated SemanticItem changes. The CustomValidator control will be run before the SemanticItem's OnChanged handler is called. The SemanticItem's OnChanged handler will only be called if the CustomValidator does indeed validate the changed data. If the CustomValidator invalidates the data, the State of the SemanticItem is set to Empty and the OnChanged handler is not called.

If ValidationEvent is set to "onconfirmed", the CustomValidator will be run each time the State of the associated SemanticItem changes to Confirmed. The CustomValidator control will be run before the SemanticItem's OnConfimed handler is called. The SemanticItem's OnConfirmed handler will only be called if the CustomValidator does indeed validate the changed data. If the CustomValidator invalidates the data, the State of the SemanticItem is set to Empty and the OnConfirmed handler is not called.

After processing all SemanticItems involved a recognition turn, RunSpeech starts again. At that point, the previously failed validators will be active and RunSpeech will select the first QA/Validator that is active in SpeechIndex order. It is the author's responsibility to place the validator controls directly before the QA control that collects the answer for the SemanticItem in order to get the correct behavior.

SemanticItemToValidate

Required. Specifies the id of the SemanticItem that is being validated. An exception will be thrown for unspecified SemanticItem ToValidate.

ClientValidationFunction

Required. Specifies a function that checks the value of the SemanticItemToValidate.AttributeToValidate and returns true or false indicating whether the value is valid or invalid. The signature for ClientValidationFunction is as follows:

bool ClientValidationFunction (string value)

where:

value is the contents of
ElementToValidate.AttributeToValidate.
An exception will be thrown if ClientValidationFunction is not specified StyleReference Optional. Specifies the name of a Style object. At render time, the QA control will search for the named Style control and will use any property values specified on the Style as default values for its own properties. Explicitly set property values on the control will override those set on the Style.

Prompt

Optional. Prompt to indicate the error.

12 Answer Object

The Answer object contains information on how to process recognition results and bind the results to controls on an ASP.NET page.

How Answer object is used.

Voice-only mode.

The RunSpeech script uses the Answer object to perform answer processing on the client. Answer processing begins when the OnReco event fired by the speech platform is received by the client. The resultant SML document returned by the speech platform is searched for the node specified by the required XpathTrigger attribute. If the XpathTrigger node is found in the SML document and contains a non-null value, the value is is filled into the semantic item specified in the SemanticItem property of the answer.

For non-existant XpathTrigger in the SML document or null value of XpathTrigger, RunSpeech looks for the next QA to activate.

After the non-null value of the XpathTrigger node is found, RunSpeech invokes the ClientNormalization function (if specified). The ClientNormalizationFunction returns a text string that reflects the author-defined transformation of the value of the XpathTrigger node. For example, the author may wish to transform the date "Nov. 17, 2001" returned by the speech platform to "Nov. 17, 2001". Semantic items are used for both simple and complex data binding.

The SML document returned by the speech platform may contain a platform-specific confidence rating for each XpathTrigger node. During answer processing, RunSpeech compares this confidence rating to the value specified in the ConfirmThreshold attribute of the Answer object. Results of the comparison are then used to set the internal confirmed state of the semantic item. This state information is subsequently used to determine whether or not an answer requires confirmation from the user.

RunSpeech internally marks an answer as needing confirmation if the confidence returned with the XpathTrigger is less than or equal to the value of the ConfirmThreshold attribute. Otherwise RunSpeech internally marks the semantic item associated with the answer as confirmed. This internal state information is used during confirmation processing.

Multimodal.

The Answer object is used in multimodal scenarios by the Multimodal.js script just as it is used by RunSpeech in voice-only (described above) with one exception. In multimodal, platform-specific confidence ratings are not compared to the ConfirmThreshold attribute of the Answer object, therefore internal state information of each answer is not maintained. Confirmation of results is done visually. If an incorrect result is bound to a visual control, the user senses the problem visually and may then initiate another speech input action to correct the error.

Rendered for both multimodal and voice-only modes

```
class Answer : Control
{
    string  id{get; set;};
    float   Reject{get; set;};
    float   ConfirmThreshold{get; set;};
    string  XpathTrigger{get; set;};
    string  SemanticItem{get; set;};
    string  ClientNormalizationFunction{get; set;};
    string  StyleReference{get; set;};
}
```

12.1 Answer Properties

All properties of the Answer object are available to the application developer at design time.

Reject

Optional. Used in both multimodal and voice-only modes. Specifies the rejection threshold for the Answer. Answers having confidence values below Reject will cause a noReco event to be thrown. If not specified, the value 0 will be used. Legal values are 0-1 and are platform specific. An exception will be thrown for out of range Reject values.

Rejected Answers are treated as if they were not present in the reco result to begin with. If, after this processing, no relevant information remains (no Answers, ExtraAnswers, Confirms, Commands, or xpathAcceptConfirms/xpathDenyConfirms), an onnoreco event is fired (which mimics exactly the tags version).

ConfirmThreshold

Optional. Used in voice-only mode. Specifies the minimum confidence level of recognition that is necessary to mark this item as confirmed. If the confidence of the matched item is less than or equal to this threshold, the item is marked as needing confirmation. Legal values are 0-1. Default value is 0. An exception will be thrown for out of range ConfirmThreshold values.

XpathTrigger

Required for Answers and ExtraAnswers. Optional for Confirms. Used in both multimodal and voice-only modes. Specifies what part of the SML document this answer refers to. It is specified as an XPath on the SML output from recognition. An exception will be thrown if XpathTrigger is not specified for Answers or ExtraAnswers. XpathTrigger must be a valid xml path. An invalid xml path will cause a redirection to the default error page during run time.

For Confirms, if XpathTrigger is not set or set to the empty string, the confirm won't allow for correction. Yes/no confirmations are enabled when XpathTrigger is used in this way.

SemanticItem

Optional. Used in both multimodal and voice-only modes.

ClientNormalizationFunction

Optional. Used in both multimodal and voice-only modes. Specifies a client-side function that will take the matched sml node as a parameter and returns a string that reflects author-specified normalization (transformation) of the recognized item. The signature for ClientNormalizationFunction is as follows:

string ClientNormalizationFunction(XMLNode SMLnode, object SemanticItem)

where:

SMLnode is the node specified in the Xpath.

SemanticItem is the client-side SemanticItem object specified in the Answer object.

StyleReference

Optional. Used in both multimodal and voice-only modes. Specifies the name of a Style object. At render time, the Answer object will search for the named Style control and will use any property values specified on the Style as default values for its own properties. Explicitly set property values by the Answer object will override those set on the referenced Style.

13 SemanticMap Control

SemanticMap is a container of SemanticItem objects.

```
class SemanticMap : SpeechControl
{
    SemanticItemCollection SemItems{get;};
    SemanticItem GetSemanticItem (string name);
}
```

13.1 SemanticMap Properties

SemItems

A collection of SemanticItem objects.

13.2 SemanticMap Methods

GetSemanticItem

This is a function that takes the id of a SemanticItem and returns the SemanticItem object. The signature of GetSemanticItem is:

function GetSemanticItem(string id)

14 SemanticItem Object

The SemanticItem object describes where and when an Answer's recognition results are written to visual controls on a page. The object also keeps track of the current state of Answers, i.e., whether an Answer has changed or been confirmed.

```
class SemanticItem : Control
{
    string          id{get; set;};
    string          TargetElement{get; set;};
```

-continued

```
    string          TargetAttribute{get; set;};
    bool            BindOnChanged{get; set;};
    string          BindAt{get; set;};
    bool            AutoPostBack{get; set;};
    string          OnClientChanged{get; set;};
    string          OnClientConfirmed{get; set;};
    SemanticEventHandler    Changed;
    SemanticEventHandler    Confirmed;
    string          Text{get;};
    SemanticState   State{get;};
    StringDictionary        Attributes{get; set;};
    string          StyleReference{get;};
}
```

14.1 SemanticItem Properties id

Required. The programmatic id of this semantic item.

TargetElement

Optional. Used in both multimodal and voice-only modes. Specifies the id of the visual control to which the recognition results should be written. If specified, default binding will occur when the value is changed or confirmed depending on the value of BindOnChanged. An exception is thrown if TargetElement is the id of multiple controls.

TargetAttribute

Optional. Used in both mutimodal and voice-only modes. Specifies the property name of the TargetElement to which this answer should be written. The default value is null. An exception will be thrown if TargetElement is specified and TargetAttribute is not specified.

BindOnChanged

Optional. Used voice-only mode, ignored in multimodal. Default is false. In VoiceOnly mode, BindOnChanged controls when to bind recognition results to visual elements.

A value of true causes binding everytime the value of the SemanticItem changes.

A value of false causes binding only when the SemanticItem has been confirmed.

BindAt

Optional. Used in both mutimodal and voice-only modes. Can be omitted or set to "server". Default is null (omitted). If BindAt is set to "server", it indicates that the TargetElement/TargetAttribute pair refers to a server-side control or property. An exception will be thrown when BindAt is set to an invalid value.

If BindAt is "server", an exception will be thrown if:

SemanticItem.TargetElement is not a server-side control, or

SemanticItem.TargetAttribute is not a member of the control specified by SemanticItem.TargetElement, or SemanticItem.TargetAttribute is a member of SemanticItem.TargetElement, but is not of type string, or SemanticItem.TargetAttribute is a string, but is read-only. only.

AutoPostBack

Optional. Used in both multimodal and voice-only modes. Specifies whether or not the control posts back to the server when the binding event is fired. The binding event can be onChanged or onConfirmed and is controlled by the value of BindonChange. Default is false.

The state of the voice-only page is maintained automatically during postback. Authors may use the ClientViewState object of RunSpeech to declare and set any additional values they wish to persist across postbacks.

OnClientChanged

Optional. Used in both multimodal and voice-only modes. Specifies a client-side function to be called when the value of the Text property of this SemanticItem changes. The function does not return any values. The signature for OnClientChanged is as follows:

function OnClientChanged(object SemanticItem)

where SemanticItem is the client-side SemanticItem object.

Note: If AutoPostBack is set to true, the OnClientChanged function is executed before posting back to the server. If the author wishes to persist any page state across postback, the OnClientChanged function is a good place to access the ClientViewState object of RunSpeech.

OnClientConfirmed

Optional. Used in both multimodal and voice-only modes.

Specifies a client-side function to be called when this SemanticItem's [value is confirmed. The function does not return any values. The signature for OnClientConfirmed is as follows:

function OnClientConfirmed(object SemanticItem)

where SemanticItem is the client-side SemanticItem object.

Note: If AutoPostBack is set to true, the OnClientConfirmed function is executed before posting back to the server. If the author wishes to persist any page state across postback, the OnClientConfirmed function is a good place to access the ClientViewState object of RunSpeech Changed Optional. Used in both multimodal and voice-only modes. Specifies a server-side script function to be executed when the Changed event is fired.

The signature of a SemanticEventHandler is: (in C#—the signature would look slightly different in other languages)

public delegate void SemanticEventHandler (object sender, SemanticEventArgs e where:

SemanticEventArgs is a class derived from System.EventArgs.

```
public class SemanticEventArgs : EventArgs
{
    public string    Text {get;};
    public StringDictionary Attributes {get;}
}
```

Text

Returns the value that this SemanticItem has been set to.

State

Returns the state of this SemanticItem.

Confirmed

Optional. Used in both multimodal and voice-only modes. Specifies a server-side script function to be executed when the Confirmed event is fired. In multimodal mode, the Confirmed event will be fired immediately after the Changed event.

The signature of a SemanticEventHandler is: (in C#—the signature would look slightly different in other languages)

public delegate void SemanticEventHandler (object sender, SemanticEventArgs e);

where:

SemanticEventArgs is a class derived from System.EventArgs.

```
public class SemanticEventArgs : EventArgs
{
    public string Text {get;}
    public StringDictionary Attributes {get;}
}
```

Text

Read only. Returns the value that this SemanticItem has been set to.

State

Read only. Returns the state of this SemanticItem.

Text

The text value that this SemanticItem has been set to. Default is null.

State

The confirmation state of this SemanticItem. Values of State will be one of SemanticState.Empty, SemanticState.NeedsConfirmation or SemanticState.Confirmed.

Attributes

Optional. Used in both multimodal and voice-only modes. This is a collection of name/value pairs. Attributes is used to pass user defined information to the client-side semantic item and back to the server (they are kept synchronized). Attributes may only be set programmatically. For example:

SemanticItem.Attributes["myvarname"]="myvarvalue"

Attributes are not cleared when the SemanticItem is reset by the system. If developers wish to reset the attributes, they must do so manually.

StyleReference

Optional. Used in both multimodal and voice-only modes. Specifies the name of a Style object. At render time, the QA SemanticItem object will search for the named Style control and will use any property values specified on the style as default values for its own properties. Explicitly set property values by the SemanticItem object will override those set on the referenced Style.

14.2 SemanticItem Client-Side Object

```
//Notation doesn't imply programming language
class SemanticItem
{
    SemanticItem (sco, id, targetElement, targetAttribute,
        bindOnChanged, bindAtServer, autoPostback,
        onClientChanged, onClientConfirmed,
    hiddenFieldID,
        value, state);
    SetText (string text, boolean isConfirmed);
    Confirm( );
    Clear( );
    Empty( );
    AddValidator (validator);
    IsEmpty( );
    NeedsConfirmation( );
    IsConfirmed( );
    Encode( );
    Object value; //Read only
    string state; //Read only
    object attributes;
}
```

SetText (String Text, Boolean isConfirmed)
The SetText method of the client side semantic item object is used to alter the value property. The partmeters are
string text the string which will become the value of the the Semantic Item
Boolean isConfirmed determines whether the Semantic Item state property is "confirmed" (if true) or "needs confirmation" if false Confirm( )
This method sets the state property of the Semantic Item property to "confirmed."

Clear( )
This method sets the value property of the Semantic Item to NULL and sets the state property to "empty."

Empty( )
AddValidator (validator)
IsEmpty( )
This method checks to see if the state property of the Semantic Item and returns true if it is "empty" and false if it is "needs confirmation" or "confirmed."

NeedsConfirmation( )
This method checks to see if the state property of the Semantic Item and returns true if it is "needs confirmation" and false if it is "empty" or "confirmed."

IsConfirmed( )
This method checks to see the state property of the Semantic Item and returns true if it is "confirmed" and false if it is "needs confirmation" or "empty."

Encode( )
Object Value
ReadOnly.
String State
Read Only.
Object Attributes 14.3 Run-Time Behavior As a general rule, the order of execution for every transition Empty->NeedsConfirmation or NeedsConfirmation->Confirmed:
Client-side binding (if needed)
Client-side event
If (Autopostback), trigger submit.
On the server, the order of execution is:
Server-side binding (if needed)
Server-side event.
If the semantic item is programmatically changed in the server, no events (server or client side) will be thrown.
If (BindonChanged=false) and (Autopostback=true) and we have both Changed and Confirmed handlers, both events will be triggered, in order.
Changed events will be thrown in the server (if needed and handlers are set) even if the server-side value is the same as the previous one (didn't change apparently).
If AutoPostBack is set to true, the controls will cause two postbacks, synchronized with onChanged, and onConfirmed.

15 Prompt Object

The prompt object contains information on how to play prompts. All the properties defined are read/write properties.
Rendered for voice-only. Not rendered for multimodal.
How Prompt Object is Used
Voice-Only
The Prompt object is a required element of the QA control-RunSpeech uses the Prompt object to select the appropriate text for the prompt and then play the prompt on the client.
After RunSpeech determines which QA to activate it either increments or initializes the count attribute of the QA. The count attribute is incremented if the QA being activated was the same QA that was active during the last loop through RunSpeech. The count attribute is initialized to count=1 if this is the first time the QA has been activated. The QA's count attribute may be used by the script specified in the PromptSelectFunction attribute of the Prompt object.
RunSpeech then sets out to determine which text will be synthesized and played back to the user. The dialog author has the option of providing a script function for prompt text that is complex to build, or simply specifying the prompt text as content of the Prompt object. If RunSpeech detects the existence of an author-specified PromptSelectFunction, it passes the text returned from the PromptSelectFunction to the speech platform for synthesis and playback to the user. Otherwise RunSpeech will pass the text in the content of the Prompt object to the speech platform.
If a serious or fatal error occurs during the synthesis process, the speech platform will fire the onError event. RunSpeech receives this event, sets lastCommandOrException to "PromptError" and calls the script function specified by the OnClientError attribute. The dialog author may then choose to take appropriate action based upon the type of error that occurred.
After the prompt playback has finished, the speech platform fires the oncomplete event which is caught by RunSpeech. RunSpeech then looks for the Reco object associated with the current QA. If a Reco object is found (i.e., the QA is not just a prompting mechanism), RunSpeech requests the speech platform to start the recognition process.
Finally, RunSpeech examines the value of the PlayOnce attribute of the QA containing the Prompt object. If PlayOnce is true, RunSpeech disables the Prompt object for subsequent activations of this same QA.
If speech is detected during the playing of the prompt, the playback of the prompt will be stopped automatically by the platform. RunSpeech catches the onbargein event and halts execution. Since a prompt.OnComplete event may not follow a bargein, RunSpeech resumes when a listen event is received.
If a bookmark is encountered, Runspeech activates the function specified by the OnClientBookmark property.

Multimodal.
The Prompt object is not used in multimodal scenarios.
PromptSelectFunction
The following three examples illustrate using the PromptSelectionFunction to select or modify prompt text using the parameters available to PromptSelectFunction.
The first example shows how to use the count parameter to select a prompt based upon the number of times the QA has been activated. The scenario is:
A user calls a menu based service, enters password. Server-side processing determines the user's first and last name and inserts the name information into hidden textboxes (txtFirstName.value and txtLastName.value) on the welcome page. The welcome page contains a QA which prompts the user to enter the desired service. The QA's Prompt object is built to handle 1) the prompt to play for a first time pass and 2) the prompt to play if the user fails to select a service at the first prompting (i.e., the same QA is activated after a timeout expires).

```
<speech:QA id="welcomeQA" runat="server">
    <Prompt id="welcomePrompt"
            PromptSelectFunction="SelectWelcomePrompt"
    />
    <Reco id="welcomeReco" mode="automatic">
        <Grammars>
            <speech:grammar id="welcomeGrammar"
                src="http://mysite/services.xml"
```

-continued

```
        runat="server" />
            </Grammars>
        </Reco>
        <Answers>
            <speech:answer id="servicesAnswer" SemanticItem
=            "siService" runat="server" />
        </Answers>
    </speech:QA>
    <script>
    function SelectWelcomePrompt(lastCommandOrException, count,
assocArray)
    {
        switch(count)
        {
            case 1: return "Welcome to Acme Services
<SALT:value>txtFirstName.value</SALT:value>. Please select
the Email, Calendar or Stock service.";
            case 2: return "Welcome Please select the Email,
Calendar or Stock service.";
            case 3: return "Welcome Please select the Email,
Calendar or Stock service.";
            default: return "I'm sorry
<SALT:value>txtFirstName.value</SALT:value>, we're having
communication problems. Good Bye.";
        }
    }
    </script>
```

The next example shows how to use the lastCommandOrException parameter to modify a prompt based upon a event previous event in the dialog. The scenario is:

A user is asked to provide the name of a departing airport. The QA contains a Prompt object that is built to handle the initial prompt, a prompt if the user asks for help, and a prompt if the user fails to respond (i.e. a timeout occurs).

```
<speech:qa id="qa1" runat="server">
    <Prompt id="prompt1"
    PromptSelectFunction="SelectDepartingAirport" />
    <Reco id="reco1" mode="automatic">
        <Grammars>
            <speech:grammar id="gram1"
            src="http://mysite/NYAirport.xml"
                runat="server" />
        </Grammars>
    </Reco>
    <Answers>
        <speech:answer id="ans1" SemanticItem="siAns1"
            runat="server" />
    </Answers>
</speech:qa>
<speech:command id="command1" runat="server"
XpathTrigger="/sml/help"       scope="qa1" type="HELP">
    <Grammar src="http://mysite/help.xml" runat="server"
/>
</speech:command>
<script>
function SelectDepartingAirport(lastCommandOrException,
count, assocArray)
{
    if (count==1) return "From which airport would you
like to depart?";
    switch(lastCommandOrException)
    {
        case "SILENCE": return "I'm sorry I didn't catch that.
From which airport would you like to depart?";
        case "HELP":       return "You may choose from Kennedy,
La Guardia, or that little airport on Long Island. From
which airport would you like to depart?";
        default return "What we have here is a failure to
communicate. Good bye.";
    }
}
</script>
```

The last example shows how to use the assocArray parameter to modify a prompt during a confirmation pass. The scenario is:

The user is asked to provide itinerary details: departing and arrival cities and travel date. The QA is constructed to implicitly confirm the departing and arrival city information and explicitly confirm the travel date. The Prompt object is built to provide appropriate prompting of items requiring confirmation.

```
<speech:qa id="qa1" runat="server">
    <Prompt id="prompt1" InLinePrompt="What is your
desired                 itinerary?"></Prompt>
    <Reco id="reco1" mode="Automatic">
        <Grammars>
            <speech:grammar id="grm1"
                    src="http://mysite/city_date.xml"
                        runat="server" />
        </Grammars>
    </Reco>
    <Answers>
    <speech:answer id="A1" XpathTrigger="/sml/departCity"
        SemanticItem="siTb1" ConfirmThreshold="0.90"
runat="server" />
        <speech:answer id="A2" XpathTrigger="/sml/arrivalCity"
        SemanticItem="siTb2" ConfirmThreshold="0.90"
runat="server" />
        <speech:answer id="A3" XpathTrigger="/sml/departDate"
        SemanticItem="siTb3" ConfirmThreshold="1.00"
runat="server" />
    </Answers>
</speech:qa>
<speech:qa id="qa2" runat="server"
XpathDenyConfirms="/sml/deny"
XpathAcceptConfirms="/sml/accept">
    <Prompt id="prompt2"
PromptSelectFunction="myPromptFunction" />
    <Reco id="reco2" mode="automatic">
        <Grammars>
            <speech:grammar id="grm2"
        src="http://mysite/cityANDdateANDyes_no.xml"
                runat="server" />
        </Grammars>
    </Reco>
    <Confirms>
        <speech:answer id="conf1"
XpathTrigger="/sml/departCity"       SemanticItem="siTb1"
ConfirmThreshold="0.90" runat="server" />
        <speech:answer id="conf2"
XpathTrigger="/sml/arrivalCity"       SemanticItem="siTb2"
ConfirmThreshold="0.90" runat="server" />
        <speech:answer id="conf3"
XpathTrigger="/sml/departDate"
        SemanticItem="siTb2" ConfirmThreshold="1.00"
runat="server" />
    </Confirms>
</speech:qa>
<script>
function myPromptFunction(lastCommandOrException, count,
assocArray)
{
var promptext = "Did you say ";
    if (assocArray["siTb1"] !=null && assocArray["siTb1"]
!="")
    {
        promptText += "from" + assocArray["siTb1"];
        return promptText;
    }
    if (assocArray["siTb2"] !=null && assocArray["siTb2"]
!="")
    {
        promptText += "to" + assocArray["siTb2"];
        return promptText;
    }
    if (assocArray["siTb1"] !=null && assocArray["siTb3"]
!="")
    {
```

-continued

```
        promptText += "on" + assocArray["siTb3"];
        return promptText;
    }
}
</script>
class Prompt : Control
{
    string      id{get; set;};
    string      type{get; set;};
    bool        prefetch{get; set;};
    string      lang{get; set;};
    bool        bargein{get; set;};
    string      src{get; set;};
    string      PromptSelectFunction{get; set;};
    string      OnClientBookmark{get; set;};
    string      OnClientError{get; set;};
    string      InlinePrompt{get; set;};
    string      StyleReference{get; set;};
    ParamCollection   Params{get; set:};
}
```

15.1 Prompt Properties

All properties of the Prompt object are available at design time.

Type

Optional. Only used in voice-only mode. The mime-type corresponding to the speech output format used. No default value. The type attribute mirrors the type attribute on the SALT Prompt object.

Prefetch

Optional. Only used in voice-only mode. Flag to indicate whether the prompt should be immediately synthesized and cached at browser when the page is loaded. Default value is false. The prefetch attribute mirrors the prefetch attribute on the SALT Prompt object.

Lang

Optional. Only used in voice-only mode. Specifies the language of the prompt content. The value of this attribute follows the RFC xml:lang definition. Example: lang="en-us" denotes US English. No default value. If specified, this overrides the value set in the Web.config file. The lang attribute mirrors the lang attribute on the SALT Prompt object.

Bargein

Optional. Used only for voice-only mode. Flag that indicates whether or not the speech platform is responsible for stopping prompt playback when speech or DTMF input is detected. If true, the platform will stop the prompt in response to input and flush the prompt queue. If false, the platform will take no default action. If unspecified, default to true.

PromptSelectFunction

Optional. Only used in voice-only mode. Specifies a client-side function that allows authors to select and/or modify a prompt string prior to playback. The function returns the prompt string. PromptSelectFunction is called once the QA has been activated and before the prompt playback begins. If PromptSelectFunction is specified, src and InLinePrompt are ignored.

The signature for PromptSelectFunction is as follows:
String PromptSelectFunction(string lastCommandOrException, int Count, object SemanticItemList)
where:
    lastCommandOrException is a Command type (e.g., "Help") or a Reco event (e.g., "Silence" or "NoReco").
    Count is the number of times the QA has been activated consecutively. Count starts at 1 and has no limit.
    SemanticItemList For voice-only mode, SemanticItemList is an associative array that maps semantic item id to semantic item objects. For multimodal, SemanticItemList will be null.

If the PromptSelectFunction is being called from within a Prompt object specified by a CustomValidator control, the SemanticItemList will contain the SemanticItem being validated.

If the PromptSelectFunction is being called from within a Prompt object specified by a CompareValidator control, the SemanticItemList will contain the SemanticItem being validated and (if specified) the SemanticItem to which it is being compared.

OnClientBookmark

Optional. Only used in voice-only mode. Specifies a client side function which is called when a Bookmark is reached in the prompt text during playback. The function does not return a value. The signature for OnClientBookmark is as follows:

function OnClientBookmark( )

OnClientError

Optional. Only used in voice-only mode. Specifies a client side function which is called in response to an error event in the client. Error events are generated from the event object. The function returns a Boolean value. The RunSpeech algorithm will continue executing if an OnClientError script returns true. The RunSpeech algorithm will navigate to the default error page specified in the Web.config file if an OnClientError script returns false or if an error occurs and the OnClientError function is not specified. When navigating to the error page, both status and description will be passed in the query string. For example, if the error page is http://myErrorPage, we will navigate to http://myErrorPage?status=X&description=Y (where X is the status code associated with the error and Y is the description of that error given in the Speech Tags Specification. The signature for OnClientError is as follows:

bool OnClientError(int status)

where status is the code returned in the event object.

Note: For the SDK Beta release, it is advisable to specify a default error page using the syntax described in Section 5 Global Application Settings InlinePrompt Optional. Only used in voice-only mode. The text of th prompt to be played. It may contain further markup, as in TTS rendering information, or <value>elements. If a PromptSelectFunction function is specified, the InlinePrompt is ignored.

StyleReference

Optional. Used in both multimodal and voice-only modes. Specifies the name of a Style object. At render time, the Prompt object will search for the named Style control and will use any property values specified on the Style as default values for its own properties. Explicitly set property values by the Prompt object will override those set on the referenced Style.

Params

Optional. An collection of param objects that specify additional, non-standard configuration parameter values to the speech platform. The exact nature of the configurative parameters will differ according to the proprietary platform used. Values of parameters may be specified in an XML namespace, in order to allow complex or structured values. An exception will be thrown if the Params collection contains a non-param object.

For example, the following syntax could be used to specify the location of a remote prompt engine for distributed architectures:

```
<Params>
    <speech:param name="promptServer"
runat="server">//myplatform/promptServer</speech:param>
</Params>
```

16 Reco Object

Reco is rendered for both multimodal and voice-only modes. The Reco object is used to specify speech input resources and features as well as provide for the management of cases when vaild recognition results are not returned.

How Reco object is used.

Voice-Only

During the processing of the Prompt object, RunSpeech determines whether or not the currently active QA contains a Reco object. If it does, RunSpeech asks the speech platform to start the recognition process using the grammar specified by the Reco's Grammar object. RunSpeech calls the function specified by OnClientListening immediately after activating the Reco's underlying <listen> tag. The recognition process is stopped depending on the value of the mode attribute. RunSpeech processes successful recognition results using information specified in the Answer object.

RunSpeech uses the Reco object to handle the situations when the speech platform is not able to return valid recognition results, i.e., speech platform errors, timeouts, silence, or inability of the speech platform to recognize an utterance. In each of these cases, RunSpeech calls the appropriate handler (if specified) after setting the value of the lastCommandOrException attribute.

Multimodal

The Reco object is used by the Multimodal.js client-side script just as it is used by the RunSpeech voice-only client-side script (as described above) with one exception, starting/stopping the recognition process. Multimodal scenarios do not require speech output as a mechanism to prompt the user for input. In fact, prompting in speech controls is not available in multimodal scenarios as the Prompt object is not rendered to the client. Therefore, an alternate mechanism is required to start the recognition process.

Multimodal.js uses the event specified in the StartElement/StartEvent attributes to start the recognition process. The function specified by the OnClientListening attribute is called after the recognition process has started. Multimodal.js uses the combination of the StopEvent and mode attributes to stop the recognition process.

```
class Reco : Control
{
    string    id{get; set;};
    string    StartElement{get; set;};
    string    StartEvent{get; set;};
    string    StopElement{get; set;};
    string    StopEvent{get; set;};
    int       initialTimeout{get; set;};
    int       babbleTimeout{get; set;};
    int       maxTimeout{get; set;};
    int       endSilence{get; set;};
    float     reject{get; set;};
    string    mode{get; set;};
    string    lang{get; set;};
    string    GrammarSelectFunction{get; set;};
    string    OnClientSpeechDetected{get; set;};
```

```
    string    OnClientSilence{get; set;};
    string    OnClientNoReco{get; set;};
    string    OnClientError{get; set;};
    string    StyleReference{get; set;};
    GrammarCollection    Grammars{get; set;};
    ParamCollection      Params{get;set;};
    Control   record{get; set;};
}
```

16.1 Reco Properties

All properties are available at design time.

Start Element

Optional, but must be present if StartElement is specified. Used only in multimodal mode. Specifies the name of the GUI element with which the start of the Reco is associated. See StartEvent. No default value.

StartEvent

Optional, but must be present if StartElement is specified. Only used in multimodal mode. Specifies the name of the event that will activate (start) the underlying client-side Reco object. See start Element No default value.

Start Element

Optional, but must be present if StopElement is specified. Used only in multimodal mode. Specifies the name of the GUI element with which the stop of the Reco is associated. See StopEvent. No default Value StopEvent Optional, but must be present if StartElement is specified. Only used in multimodal mode. Specifies the name of the event that will stop the underlying client-side Reco object. See stop Element. No default value.

StartEvent and StopEvent will be used in multi-modal applications, typically for tap-and-talk interactions. E.g. StartEvent=Button1.onmousedown, StopEvent=Button1.onmouseup.

StartEvent and StopEvent are allowed to be the same (click to start, click to stop). However, it is the author's responsibility to de-activate Recos before starting new ones in the case when the end user fires two StartEvents in succession (e.g., click on one control to start a reco then click on a different control to start another reco before stopping first reco).

Note: IE requires exact cases when running Jscript. Therefore, the case for event values specified in the StartEvent and StopEvent attributes must be exactly as those events are defined. For example, the onmouseup and onmousedown events are specified in all lower case letters.

Note: StartEvent and StopEvent are not rendered for voice-only mode.

initialTimeout

Optional. Used in both multimodal and voice-only modes. The max time in milliseconds between start of recognition and the detection of speech. This value is passed to the recognition platform, and if exceeded, an onSilence event will be thrown from the recognition platform. If not specified, the speech platform will use a default value. No default value. An exception will be thrown for non-integer or negative integer value.

Note: The sum of the initialTimeout and babbleTimeout values should be smaller or equal to the global maxTimeout attribute or the Reco attribute maxTimeout (see below) if it is set.

Note: The initialTimeout attribute mirrors the initialTimeout attribute on the SALT Reco object.

babbleTimeout

Optional. Used in both multimodal and voice-only modes. Optional. The maximum period of time in milliseconds for an utterance. For recos in automatic and single mode, this applies to the period between speech detection and the speech endpoint or stop call. For recos in 'multiple' mode, this timeout applies to the period between speech detection and each phrase recognition—i.e. the period is restarted after each return of results or other event. If exceeded, the onnoreco event is thrown with status code −15. This can be used to control when the recognizer should stop processing excessive audio. For automatic mode listens, this will happen for exceptionally long utterances, for example, or when background noise is mistakenly interpreted as continuous speech. For single mode listens, this may happen if the user keeps the audio stream open for an excessive amount of time (eg by holding down the stylus in tap-and-talk). If the attribute is not specified, the speech platform will use a default value. No default value. An exception will be thrown for non-integer or negative integer values.

Note: The sum of the initialTimeout and babbleTimeout values should be smaller or equal to the global maxTimeout attribute or the Reco attribute maxTimeout (see below) if it is set.

Note: The babbleTimeout attribute mirrors the babbleTimeout attribute on the SALT Reco object.

maxTimeout

Optional. Used in both multimodal and voice-only modes. The period of time in milliseconds between recognition start and results returned to the browser. If exceeded, an OnError event is thrown by the browser—this provides for network or recognizer failure in distributed environments. For Recos in "multiple" mode, as with babbleTimeout, the period is restarted after the return of each recognition or other event. No default value. An exception will be thrown for non-integer or negative integer values.

Note: maxTimeout should be greater than or equal to the sum of initialTimeout and babbleTimeout. If specified, the value of this attribute over-rides the value of maxTimeout set in the Web.config file. No default value.

Note: The maxTimeout attribute mirrors the maxTimeout attribute on the SALT Reco object.

endSilence

Optional. Used in both multimodal and voice-only modes. For Reco objects in "automatic" mode, the period of silence in milliseconds after the end of an utterance which must be free of speech after which the recognition results are returned. Ignored for Recos of modes other than "automatic". If not specified, defaults to platform internal value. An exception will be thrown for non-integer or negative integer values.

Reject

Optional. Used in both multimodal and voice-only modes. Specifies the rejection threshold, below which the platform will throw the noReco event. If not specified, the speech platform will use an internal default value. Legal values are 0-1 and are platform specific. An exception will be thrown for out of range reject values. Default is 0.

Lang

Optional. Used in both multimodal and voice-only modes. Specifies the language of the speech recognition engine. The value of this attribute follows the RFC xml:lang definition. Example: lang="en-us" denotes US English. No default value. This over-rides the global setting in the Web.config file. The lang attribute mirrors the lang attribute on the SALT Reco object.

Mode

Optional. Used in both multimodal and voice-only modes. Specifies the recognition mode to be followed. Default is "automatic". Legal values are "automatic", "single", and "multiple".

Mode="Automatic"

Used for recognitions in telephony scenarios. The speech platform itself (not the application) is in control of when to stop the recognition process. Mode="automatic" is the only mode setting that works in voice-only, other modes will be ignored and "automatic" will be used.

Mode="Single"

Used for multimodal (tap-to-talk) scenarios. The return of a recognition result is under the control of an explicit call to stop the recognition process by the application. However, exceeding babbleTimeout or maxTimeout will stop recognition. Mode="single" is ignored for voice-only.

Mode-"Multiple"

Used for "open-microphone" or dictation scenarios. Recognition results are returned at intervals until the application makes an explicit call to stop the recognition process (or babbleTimeout or maxTimeout periods are exceeded). Multiple mode recos are not supported in voice-only mode dialogs. If the browser is a voice-only browser and reco mode is set to "multiple", an exception will be thrown at render time. Mode="multiple" is ignored for voice-only.

GrammarSelectFunction

Optional. Used in both multimodal and voice-only modes. Specifies a client-side script that will be called prior to starting the recognition process. The script is written by the dialog author and may be used to select or modify the Grammar objects associated with the Reco object. The script may also be used to adjust speech recognition features or confidence/rejection thresholds. The GrammarSelectFunction function does not return values. The signature for GrammarSelectFunction is as follows:

function GrammarSelectFunction(object recoObj, string lastCommandOrException, int Count, object SemanticItemList)

where:

recoObj is the Reco object about to start.

lastCommandOrException is a Command type (e.g., "Help") or a Reco event (e.g., "Silence" or "NoReco"). For multimodal dialogs, lastCommandOrException will be an empty string Count is the number of times the QA containing the Reco object has been activated consecutively. Count starts at 1 and has no limit. For multimodal dialogs, count will be zero.

SemanticItemList For voice-only mode, SemanticItemList is an associative array that maps semantic item id to semantic item objects. For multimodal dialogs, SemanticItemList will be null.

OnClientSpeechDetected

Optional. Used in both multimodal and voice-only modes. Specifies a client-side script function that will be called when the onspeechdetected event is fired by the speech recognition platform on the detection of speech. Determining the actual time of firing is left to the platform (which may be configured on certain platforms using the <param> element. This may be anywhere between simple energy detection (early) or complete phrase or semantic value recognition (late). This event also triggers onbargein on a prompt which is in play and may disable the initial timeout of a started dtmf object. This function can be used in multimodal scenarios, for example, to generate a graphical indication that recognition is occurring, or in voice-only scenarios to enable fine control over other processes underway during recognition. The function does not return any values. The signature for OnClientSpeechDetected is as follows:

function OnClientSpeechDetected( )

If a Dtmf object is active when the OnClientSpeechDetected function is called, the timeouts of the Dtmf object will be disabled.

OnClientSilence

Optional. Used in both multimodal and voice-only modes. Specifies a client-side script that will be called after detecting silence (in response to SALT reco onSilence event). The function does not return any values. The signature for OnClientSilence is as follows:

function OnClientSilence(int status)

where status is the code returned in the event object.

If a Dtmf object is active when the OnClientSilence function is called, the Dtmf object will be stopped.

OnClientNoReco

Optional. Used in both multimodal and voice-only modes. Specifies a client-side script that will be called after detecting no recognition (in response to SALT reco onNoReco event). The function does not return any values. The signature for OnClientNoReco is as follows:

function OnClientNoReco(int status)

where status is the code returned in the event object.

If a Dtmf object is active when the OnClientNoReco function is called, the Dtmf object will be stopped.

OnClientError

Optional. Used in both multimodal and voice-only modes. Specifies a client side function which is called in response to an error event in the client. Error events are generated from the event object. The function returns a boolean value. The RunSpeech algorithm will continue executing if an OnClientError script returns true. The RunSpeech algorithm will navigate to the default error page specified in the Web.config file if an OnClientError script returns false or if an error occurs and the OnClientError function is not specified. When navigating to the error page, both status and description will be passed in the query string. For example, if the error page is http://myErrorPage, we will navigate to http://myErrorPage?status=X&description=Y (where X is the status code associated with the error and Y is the description of that error given in the Speech Tags Specification. The signature for OnClientError is as follows:

bool OnClientError(int status)

where status is the code returned in the event object.

Note: the return value of OnClientError is ignored in multimodal mode.

If a Dtmf object is active when the OnClientError function is called, the Dtmf object will be stopped.

StyleReference

Optional. Used in both multimodal and voice-only modes. Specifies the name of a Style object. At render time, the Reco object will search for the named Style control and will use any property values specified on the Style as default values for its own properties. Explicitly set property values by the Reco object will override those set on the referenced Style.

Grammars

Optional. An array of grammar objects as specified below. An exception will be thrown if a Grammars collection contains a non-grammar object.

Params

Optional. Used in both multimodal and voice-only modes. An collection of param objects that specify additional, non-standard configuration parameter values to the speech platform. The exact nature of the configurative parameters will differ according to the proprietary platform used. Values of parameters may be specified in an XML namespace, in order to allow complex or structured values. An exception will be thrown if the Params collection contains a non-param object.

For example, the following syntax could be used to specify the location of a remote speech recognition server for distributed architectures:

```
<Params>
    <speech:param                name="recoServer"
runat="server">//myplatform/recoServer</speech:param>
</Params>
```

Record

Optional. Used in both multimodal and voice-only modes. The record object is used for recording audio input from the user. Recording may be used in addition to recognition or in place of it, according to the abilities of the platform and its profile. Only one record object is permitted in a single <reco>.

17 Grammar Object

The grammar object contains information on the selection and content of grammars, and the means for processing recognition results. All the properties defined are read/write properties.

```
class Grammar : Control
{
    string    id{get; set;};
    string    type{get; set;};
    string    lang{get; set;};
    string    src{get; set;};
    string    InLineGrammar{get; set;};
    string    StyleReference{get; set;};
}
```

17.1 Grammar Properties

Grammar is rendered for both multimodal and voice-only modes. All properties are available at design time and run time.

Type

Optional. Used in both multimodal and voice-only modes. The mime-type corresponding to the grammar format used. No default value. The type attribute mirrors the type attribute on the SALT Grammar object.

Lang

Optional. Used in both multimodal and voice-only modes. String indicating which language the grammar refers to. The value of this attribute follows the RFC xml:lang definition. Example: lang="en-us" denotes US English. No default value. Over-rides the global value set in the Web.config file. The lang attribute mirrors the lang attribute on the SALT Grammar object.

src

Optional. Used in both multimodal and voice-only modes. Specifies the URI of the grammar to load. If an inline grammar and src are both specified the inline grammar takes precendence and src is ignored. The src attribute mirrors the src attribute on the SALT Grammar object. An exception will be thrown if one of src or InlineGrammar is not specified.

InlineGrammar

Optional. Used in both multimodal and voice-only modes InlineGrammar accesses the text of the grammar specified inline. If InlineGrammar and src are both specified, InlineGrammar takes precendence and src is ignored. An exception will be thrown if one of src or InlineGrammar is not specified.

Inline grammars must be HTML Encoded, they are HTML encoded when sent down to the server. Authors must use > for > and < for < and adhere to all other HTML Encoding standards. It is recommended that authors use the property builder in DET, which will handle the HTML encoding automatically.

StyleReference

Optional. Used in both multimodal and voice-only modes. Specifies the name of a Style object. At render time, the Grammar object will search for the named Style control and will use any property values specified on the Style as default values for its own properties. Explicitly set property values by the Grammar object will override those set on the referenced Style.

18 Dtmf Object

Dtmf may be used by QA controls in telephony applications. The Dtmf object essentially applies a different modality of grammar (a keypad input grammar rather than a speech input grammar) to the same question.

```
class Dtmf : Control
{
    string          id{get; set;};
    bool            preflush{get; set;};
    int             initialTimeOut{get; set;};
    int             interDigitTimeOut{get; set;};
    int             endSilence{get; set;};
    string          OnClientSilence{get; set;};
    string          OnClientKeyPress{get; set;};
    string          OnClientError{get; set;};
    string          StyleReference{get; set;};
    ParamCollection Params{get; set;};
    GrammarCollection Grammars{get;set;};
}
```

18.1 Dtmf Properties

All properties are available at design time.

Preflush

Optional. Flag to indicate whether to automatically flush the DTMF buffer on the underlying telephony interface card before activation. Default is "false" (to enable type-ahead functionality). The preflush attribute mirrors the preflush attribute on the SALT DTMF object.

InitialTimeOut

Optional. The number of milliseconds to wait for receiving the first key press before raising a timeout event. If this timeout occurs the DTMF collection end automatically. If unspecified, initialTimeout defaults to a telephony platform internal setting. An exception is thrown if initialTimeout is a negative value. The initialTimeout attribute mirrors the initialTimeout attribute on the SALT DTMF object.

InterdigitTimeout

Optional. The timeout period in milliseconds for adjacent DTMF presses before raising a timeout event. If this timeout occurs the DTMF collection ends automatically. If unspecified, interdigitTimeout defaults to a telephony platform internal setting. An exception is thrown if initialTimeout is a negative value. The interdigitTimeout attribute mirrors the interdigitTimeout attribute on the SALT DTMF object.

EndSilence

Optional. The timeout period in milliseconds when input matches a complete path through the grammar but further input is still possible. This timeout specifies the period of time in which further input is permitted after the complete match. Once exceeded, onreco is thrown. (For a complete grammar match where further input is not possible, the endsilence period is not required, and onreco is thrown immediately.) If this attribute is not supported directly by a platform, or unspecified in the application, the value of endsilence defaults to that used for interdigittimeout. An exception is thrown if endSilence is a negative value.

OnClientSilence

Optional. Specifies a client-side script function to be called if there is no DTMF key press before initialTimeout expires. The platform halts DTMF collection automatically. The QA treats this as a silence. The function returns no values. The signature for OnClientSilence is as follows:

function OnClientSilence( )

If a Reco object is active when the OnClientSilence function is called, the Reco object will be stopped.

OnClientKeyPress

Optional. Specifies a client-side script function that is called on every pressing of a DTMF key which is legal according to the input grammar. If a prompt is in playback, the onkeypress event will trigger the onbargein event on the prompt (and cease its playback if the prompt's bargein attribute is set to true). If a Reco object is active, the first onkeypress event will disable the timeouts of the Reco object.

OnClientError

Optional. Specifies a client-side function which is called in response to a serious or fatal error with the DTMF collection/recognition process. Error events are generated from the event object. The function returns a boolean value. The RunSpeech algorithm will continue executing if an OnClientError script returns true. The RunSpeech algorithm will navigate to the default error page specified in the Web.config file if an OnClientError script returns false or if an error occurs and the OnClientError function is not specified. When navigating to the error page, both status and description will be passed in the query string. For example, if the error page is http://myErrorPage, we will navigate to http://myErrorPage?status=X&description=Y (where X is the status code associated with the error and Y is the description of that error given in the Speech Tags Specification. The signature for OnClientError is as follows:

bool OnClientError(int status)

where status is the code returned in the event object.

If a Reco object is active when the OnClientError function is called, the Reco object will be stopped.

OnClientNoReco

Optional. Specifies a client side function which is called in response to a failure to recognize by the DTMF collection/recognition process. This is most lokely to occur when the input detected does not match an path through the active grammars. The function does not need to return a value. The prototype for the function is:

OnClientNoReco(int status)

Where status is the code returned the in the event object.

StyleReference

Optional. Used in both multimodal and voice-only modes. Specifies the name of a Style object. At render time, the Dtmf object will search for the named Style control and will use any property values specified on the Style as default values for its own properties. Explicitly set property values by the Dtmf object will override those set on the referenced Style.

Grammars

Optional. An array of grammar objects.

Params

An collection of param objects that specify additional, non-standard configuration parameter values to the speech platform. The exact nature of the configurative parameters will differ according to the proprietary platform used. Values of parameters may be specified in an XML namespace, in order to allow complex or structured values. An exception will be thrown if the Params collection contains a non-param object.

For example, the following syntax shows how to specify a parameter on particular DTMF platform.
<Params>

```
<speech:param name="myDTMFParam" runat="server">
myDTMFValue </speech:param>
</Params>
```

19 Param Object

The param object allows authors to specify the names and values of additional, non-standard configuration parameters to the speech platform. The exact nature of the configurative parameters will differ according to the proprietary platform used. Values of parameters may be specified in an XML namespace, in order to allow complex or structured values.

```
class param : Control
{
    string    name{get; set;};
    string    Value{get; set;};
}
```

Note that the value of a param object is specified between the param tags.

19.1 Param Properties
Name
Required. The name of the parameter to be configured. An exception will be thrown for <param>elements that do not contain the name attribute.
Value
Optional. The value which will be assigned to the named parameter.

20 Record Object

The record object is used to record audio input from the user. Recording may be used in addition to recognition or in place of it, according to the abilities of the platform and its profile.

```
class record : Control
{
    bool      enabled{get; set;};
    string    type{get; set;};
    bool      beep{get; set;};
}
```

20.1 Record Properties
Enabled
Optional. Flag to indicate whether or not to record the user input. Defaults to "false".
Type
Optional. MIME type of the recording. MIME types can be specified such as "audio/wav" for WAV (RIFF header) 8 kHz 8-bit mono mu-law [PCM] single channel or "audio/basic" for Raw (headerless) 8 kHz 8-bit mono mu-law [PCM] single channel. If unspecified, defaults to G.711 wave file.
Beep
Optional. Boolean value, if true, the platform will play a beep before recording begins. Defaults to false.

21 Call Control
All call-related server-side controls deal with a single device and a single active call at any given time. If the dialog author needs to monitor more than one device or handle more than one active call, the custom SmexMessage can be used and the author will have to handle CSTA messages.

All call control controls are only used in voice-only mode. The SpeechContrbls.dll will implement a support class (CallInfo), a base class (SmexMessageBase), and the following WebControls:

```
SmexMessage
    for custom / advanced CSTA messages, and messages
        to any non-CSTA <smex> elements by specifying a
        client side <smex> element
TransferCall
    for CSTA SingleStepTransfer service
MakeCall
    for CSTA MakeCall service
DisconnectCall
    for CSTA ClearConnection service
AnswerCall
    for CSTA AnswerCall service
```

21.1 Common Classes
21.1.1 CallInfo

```
class CallInfo
{
    string MonitorCrossRefId {get;};
    string DeviceId {get;};
    string CallId {get;};
    string CallingDevice {get;};
    string CalledDevice {get;};
}
```

21.1.1.1 CallInfo Properties

MonitorCrossRefId: The id returned by the start page's MonitorStart.

DeviceId: The device id for the current active call.

CallId: The call id for the current active call. These properties can be used in the custom SmexMessage object to form the correct CSTA xml message on the web server side.

CallingDevice: This represents the calling device information provided by the network (ANI, for example). This information will always remain with the call and will never change (unlike the callingDevice).

CalledDevice: This represents the called device information provided by the network (DNIS, for example). This information will always remain with the call and will never change (unlike the calledDevice).

21.1.2 SmexMessageBase

This is an internal class. Authors that need to create new call-control controls should derive from SmexMessage.

```
internal class abstract SmexMessageBase
{
    string    ID {get; set };
    int       Timer (get; set};
    bool      AutoPostback {get; set};
    string    ClientActivationFunction {get; set});
    string    OnClientError {get, set};
    string    OnClientTimeout {get; set};
    CallInfo  CurrentCall {get; }
}
```

21.1.2.1 SmexMessageBase Properties

ID: ASP.NET control ids.

SpeechIndex: Same as for other speech controls controls. This index controls the order of the object within RunSpeech. Default 0, meaning source order after all non-zero indexed speech objects.

Timer: Number in milliseconds indicating the time span before a timeout event will be triggered. This set on the client side <smex>object before the CSTA message is sent. The default is 0, meaning no timeout. An exception will be thrown for neagtive values of Timer.

AutoPostback: Whether to cause a postback when the object's event is fired. Default is false.

ClientActivationFunction: The client side function called by RunSpeech to determine whether an object is active. When not specified, the object is considered active only once (the PlayOnce behavior). ClientActivationFunction returns a bool to indicate whether the associated object should be active (true) or not (false). The signature for ClientActivationFunction is:

function ClientActivationFunction(object sender)
where sender is the current object OnClientError: Optional. Default is false when not specified. The client side function called when <smex> fires the onerror event. OnClientError returns a bool—true to continue RunSpeech and false to go to the error page. The signature for OnClientError is:

function OnClientError(object sender, int status)
where
sender is the current object, and
status is the value of the object's status property.

OnClientTimeout: Optional. Default is true when not specified. The client side function called when <smex> fires the ontimeout event. OnClientTimeout returns a bool—true to continue RunSpeech and false to go to the error page. The signature for OnClientTimeout is:

function OnClientTimeout(object sender
where
sender is the current object.

CurrentCall: Returns the current active call object.

21.2 Server-Side Classes

21.2.1 SmexMessage

This is a generic class for sending raw CSTA messages and receiving CSTA events.

Since the number and types of events generated by this message is unknown, the author needs to be careful about when RunSpeech can continue.

RunSpeech will be paused just before calling author's OnClientBeforeSend function when the message is about to be sent.

If OnClientReceive is not specified, RunSpeech will resume when any smex event is received after message is sent.

If OnClientReceive is specified, the author returns true to indicate RunSpeech can resume after receiving the expected event.

RunSpeech will resume after Error or Timeout happens.

The Smex Timer will be set to the given value before the message is sent and back to zero right before RunSpeech resumes.

When an unexpected smex event arrives, i.e. when the current active object in RunSpeech is not a call related object, the smex event is ignored.

When AutoPostback is set to true, all events will execute the client handler, then cause a post-back to the web server where the corresponding server event will be fired.

```
class SmexMessage : SmexMessageBase
{
    string Message {get; set};
    string ClientSmexId {get; set};
    string OnClientBeforeSend {get; set};
    string OnClientReceive {get; set};
    event   Receive;
}
```

21.2.1.1 SmexMessage Properties

Message: Required. The CSTA XML message to be sent. An exception will be thrown if Message is not specified.

OnClientBeforeSend: Optional. Client side function called just before the message is sent. This is to give the author a last chance to modify the message. OnClientBeforeSend returns a string containing the new message. If null is returned, original message will be sent. The signature for OnClientBeforeSend is:

function OnClientBeforeSend(object sender, string Message)
where:
sender is the client-side SmexMessage object, and
Message is the original message.

Receive: Optional. Server side event when client side <smex>object receives smex events. The signature of a ReceiveEventHandler is:

void ReceiveEventHandler(object sender, ReceiveEventArgs e)
where
sender will be the server side SmexMessage object. The second argument e is of following type:

```
class ReceiveEventArgs : EventArgs
{
    string    Received {get};
}
``` where
Received contains the event message received from <smex>.

OnClientReceive: Optional. Client-side function called when client side <smex>object receives smex events. OnClientReceive returns a bool—true means that this object has got all the events and RunSpeech can continue, false means that this object expects more events before RunSpeech can continue. The signature for OnClientReceive is:

function OnClientReceive(object sender, string Message)
where
sender is the client-side SmexMessage object, and
Message is the received message.

ClientSmexId: Optional. This is the client side <smex> element id. If not set, messages will be sent through the default Call Manager <smex> element. If set to, non-empty string, it has be to be id of an existing SALT <smex> element, which the author has to add to the page.

21.2.2 TransferCall

The TransferCall control transfers the current call using CSTA SingleStepTransfer service. When RunSpeech runs this object, it blocks any further speech dialog until transfer succeeds or fails.

```
class TransferCall : SmexMessageBase
{
    string  TransferredTo {get; set};
    string  OnClientFailed {get; set};
    string  OnClientTransferred {get; set};
    event   Transferred;
}
```

21.2.2.1 TransferCall Properties

TransferredTo: Required. The device identifier associated with the transferred to endpoint.

Transferred: Optional. Server side event fired when the call is transferred. The signature of an EventHandler is:
void EventHandler(object sender, EventArgs e);
where
   sender is the server side TransferCall object, and
   e is of the standard EventArgs type.

OnClientTransferred: Optional. Client side function called when the call is transferred. OnClientTransferred returns nothing. The signature of OnClientTransferred is
function OnClientTransferred(object sender)
where:
   sender is the client-side TransferCall object.

OnClientFailed: Client-side function called when CSTA returns FAILED event. OnClientFailed returns a bool—true to continue RunSpeech and false to go to error page. The signature for OnClientFailed is:
function OnClientFailed(object sender, string cause)
where
   sender is the client-side TransferCall object, and
   cause is the reason for failure returned from <smex>.

21.2.3 MakeCall

The MakeCall control makes an outbound call to the given number on the given device when RunSpeech runs this object. Further speech dialog is blocked until the call is connected or fails to connect.

```
class MakeCall : SmexMessageBase
{
    string  CallingDevice {get; set}
    string  CalledDirectoryNumber {get; set};
    string  OnClientFailed {get; set};
    string  OnClientConnected {get; set);
    event   Connected;
}
```

21.2.3.1 MakeCall Properties

CallingDevice: Required. Default is the internal CallInfor DeviceId. The control will use this device to place the outbound call.

CalledDirectoryNumber: Required. Phone number to dial. An exception will be thrown if CalledDirectoryNumber is not specified.

Connected: Server side event when the call is connected. The signature of an EventHandler is:
void EventHandler(object sender, EventArgs e)
where
   sender is the server side MakeCall object, and
   e is of the standard EventArgs type.
At this point, the CurrentCall property should contain the information about the call in progress.

OnClientConnected: Client side function called when the call is connected. OnClientConnected returns nothing. The signature for OnClientConnected is:
function OnClientConnected(object sender, string CalledDirectoryNumber
where:
   sender is the client-side MakeCall object, and
   CalledDirectoryNumber is the property of the MakeCall object.

OnClientFailed: Client side function called when CSTA returns FAILED event. OnClientFailed returns a bool—true to continue RunSpeech and false to goto error page. The signature for OnClientfailed is:
function OnClientFailed(object sender, string cause)
where
   sender is the client-side MakeCall object, and
   cause is the reason for failure returned from <smex>.

21.2.4 DisconnectCall

```
class DisconnectCall : SmexMessageBase
{
    string OnClientFailed {get; set};
    string OnClientDisconnected {get; set};
    event Disconnected;
}
```

21.2.4.1 DisconnectCall Properties

Disconnected: Optional. Server side event when the call is disconnected. The signature of an EventHandler is:
void EventHander(object sender, EventArgs e)
where:
   sender is the server side DisconnectCall object and,
   e is of the standard EventArgs type.

OnClientDisconnected: Optional. Client side function called when the call is disconnected. OnClientDisconnected returns nothing. The signature for OnClientDisconnected is:
function OnClientDisconnected(object sender)
   where sender is the client-side Disconnect Call object.

OnClientFailed: Optional. Client side function called when CSTA returns FAILED event. OnClientailed returns a bool true to continue RunSpeech and false to goto error page. The signature for OnClientFailed is:
function OnClientFailed(object sender, string cause)
where
   sender is the client-side Disconnect Call object, and
   cause is the reason for failure returned from <smex>.

21.2.5 AnswerCall

The AnswerCall control answers incoming calls on the given device. When activated, this object will block RunSpeech until an incoming call is answered.

Server-Side Class:

```
class AnswerCall : SmexMessageBase
{
    string OnClientConnected {get; set};
    string OnClientFailed {get; set};
    event Connected;
}
```

21.2.5.1 AnswerCall Properties

Connected: Optional. Server side event when the call is connected. The signature of a ConnectedEventHandler is:
void EventHandler(object sender, EventArgs e)
where:
   sender is the server side AnswerCall object and
   e is of the standard EventArgs type.
At this point, the CurrentCall property should contain information of the call in progress.

OnClientConnected: Optional. Client side function called when the call is connected. OnClientConnected returns nothing. The signature for OnClientConected is:

function OnClientConnected(object sender, string callid, string CallingDevice, string CalledDevice)

where:

sender is the client side AnswerCall object
callid is the id of the current call
CallingDevice is the caller's network device id
CalledDevice is the recipient's network device id.

OnClientFailed: Optional. Client side function called when CSTA returns FAILED event. OnClientFailed returns a bool—true to continue RunSpeech and false to go to error page. The signature of OnClientFailed is:

function OnClientFailed(object sender, string cause)

where sender is the client-side AnswerCall object.
cause is the reason for failure returned from <smex>.

22 RunSpeech

22.1 Dialog Processing Algorithm

The RunSpeech algorithm is used to drive dialog flow on a voice-only client. This involves system prompting and dialog management and processing of speech input. It is specified as a script file referenced by URI from every relevant speech-enabled page (equivalent to inline embedded script)

Important: the RunSpeech script will be completely exposed to the public. Since it will be hosted on the application web site, authors of dialogs will be at liberty to examine, edit, replace or ignore the RunSpeech script code.

Rendering of the page for voice only browsers is done in the following manner:

The RunSpeech function works as follows (RunSpeech is called in response to document.onreadystate becoming "complete"):

Controls considered for activation are the QA, CompareValidator and CustomValidator controls.

1. Find the first active QA or Validator control in speech index order (determining whether a QA/Validator is active is explained below).
2. If there is no active control, submit the page.
3. Otherwise, run the control.

A QA is considered active if and only if:

1. The QA's clientActivationFunction either is not present or returns true, AND
2. If the Answers collection is non empty, the State of at least one of the SemanticItems pointed to by the set of Answers is Empty OR
3. If the Answers collection is empty, the State at least one SemanticItem in the Confirm array is NeedsConfirmation.

However, if the QA has PlayOnce true and its Prompt has been run successfully (reached OnComplete) the QA will not be a candidate for activation.

A QA is run as follows:

1. If this is a different control than the previous active control, reset the prompt Count value.
2. Increment the Prompt count value
3. If PromptSelectFunction is specified, call the function and set the Prompt's inlinePrompt to the returned string.
4. If a Reco object is present, start it. This Reco should already include any active command grammar.
5. Start the DMTF object if present. (Same concerns apply with regard to command Dtmf grammars).

A Validator (either a CompareValidator or a CustomValidator) is active if:

1. The SemanticItemToValidate has not been validated by this validator.

A CompareValidator is run as follows:

1. Compare the values of the ElementToCompare or ValueToCompare and SemanticItemToValidate ToValidate according to the validator's Operator.
2. If the test returns false, empty the text field of the SemanticItemToValidate (or both if the InvalidateBoth flag is set) and play the prompt.
3. If the test returns true, mark the SemanticItemToValidate as validated by this validator.

A CustomValidator is run as follows:

1. The ClientValidationFunction is called with the value of the SemanticItemToValidate.
2. If the function returns false, the semanticItem cleared and the prompt is played, otherwise as validated by this validator.

A Command is considered active if and only if:

1. It is in Scope, AND
2. There is not another Command of the same Type lower in the scope tree.

22.2 LastComnmandOrException

LastCommandOrException is a global variable and its value is passed to several author-defined functions as a parameter.

LastCommandOrException is a global variable maintained by RunSpeech. The value is set to the last Command.Type or recognition exception that occurred. The value will be reset to " " when there is a QA transition (the current active QA is different than the previously active QA, or is the first active QA). There is one exception to this rule: If the QA is in a Short time-out confirmation state, and the current recognition result is "Silence", the LastCommandOrException will be set to " " (silence in Short time-out confirmation is not an exception, but a valid input.)

In this fashion, ClientActivationFunction will always get the LastCommandOrException that occurred anywhere in the page, but the rest of the functions of the active QA will only get a non-empty LastCommandOrException if they have been activated more than once in a row.

If, after processing all the Answers, ExtraAnswers and Confirms in a QA, nothing is matched (either due to a mismatch in the sml returned or to a high reject threshold), the LastCommandOrException will be set to "NoReco".

Active Validators will also reset the global LastCommandOrException.

Possible values of LastCommandOrException are:

| platform event | LastCommandOrException |
| --- | --- |
| Prompt fires an onerror event | "PromptError". |
| Reco fires an onerror event | "RecoError". |
| Dtmf fires an onerror event | "DtmfError". |
| Reco fires an onnoreco event | "NoReco". |
| Reco fires a silence event | "Silence". |
| Command is Activated | Command.type |
| Transition to new QA | " " |

Also, a PromptSelectFunction's LastCommandOrException will have the value "ShortTimeoutConfirmation" when its QA is in Short Time-out Confirmation mode (i.e., when count=, firstInitialTimeout is non-zero, etc.)

22.3 Count

Count is exclusively local—both in ClientActivationFunction and the rest of the functions which are passed count. That is, these functions are always passed the count of their own QA. To avoid confusion, the function ClientActivationFunction will receive the value that the PromptSelectFunction would receive if this QA was active.

22.4 Postback Support

In their simplest form, ASP.NET pages are stateless. They are instantiated, executed, rendered, and disposed of on every round trip to the server. In the visual world, ASP.NET provides the ViewState mechanism to keep track of server control state values that don't otherwise postback as part of an HTTP form. The ASP.NET framework uses ViewState to manage and restore page properties prior to and after postback.

For voice-only pages, the ASP.NET ViewState mechanism is not available to the web developer. However, a similar mechism is provided by RunSpeech. RunSpeech maintains an object that can be used to store values which authors wish to be persisted across postbacks. The syntax is:

RunSpeech.ClientViewState[["MyVariableName"]=myVariableValue;

Any JScript built-in type can be persisted—string, number, boolean, array, object, Date, RegExp, or function. The main difference between the ASP.NET ViewState (for visual pages) and the voice-only ClientViewState mechanism is that authors of voice-only pages must manually declare and set values they wish to maintain across postbacks.

If AutoPostBack is set to true in any speech control, the matching client-side function will always be executed before posting back to the server. If the author wishes to persist any page state across postback, these client-side functions are a good place to invoke the ClientViewState object of RunSpeech.

23 Confirmation Algorithm

Semantic Processing Algorithm:

There are three stages for semantic processing:

1) Preprocessing, Carried Out when a QA is Active:

This stage is responsible for creating the array of answers to be considered in this iteration. This includes all the Answers and the Confirms that need confirmation. Internally, it creates a structure as follows.

| Answer ID | CurrentValue |
| Answer ID | CurrentValue |

This information that is also passed to the PromptSelectFunction, GrammarSelectFunction, etc.

2) Answer Processing

In this stage, we process the Answer objects in the Answers and ExtraAnswers collections. If any item from the Answers collection is matched, a flag indicating this fact is set. Answer processing sets the confirmation status of the associated semantic item—this status can be either NEEDS_CONFIRMATION or CONFIRMED. If the confidence value associated with the smlNode specified by the Answer's XpathTrigger is less than or equal to the Answer's confirmationThreshold, the status of the semantic item is set to NEEDS_CONFIRMATION. Otherwise it is set to CONFIRMED.

3) Confirmation Processing:

a) Examine at the sml document and search for XpathAcceptConfirms and XpathDenyConfirms. Set a global confirmation state to NEUTRAL (none was present), ACCEPT (xpathAcceptConfirms was present) or DENY (XPathDenyConfirms was present). In short-timeout confirmation, silence sets the confirmation state to ACCEPT.

b) For all items to be confirmed,

If there is a value in the sml document that matches the XpathTrigger of the confirm item If the new value is the same as the value to be confirmed, the item is confirmed Else, the item is set to the new value, and processed as an answer.

c) If no Answer object is matched from the Answers or Confirms collections,

If the confirmation state is CONFIRM

Upgrade all items that need confirmation to confirmed.

If the confirmation state is DENY

Clear (empty) all items that need confirmation.

Else,

Mark all unmatched items that needed confirmation as confirmed.

24 Exceptions

The following table lists the exceptions thrown by Speech Controls during render time.

| Control/object | Attribute/Method/Object | Condition | Exception |
|---|---|---|---|
| QA | SpeechIndex | SpeechIndex <0 | ArgumentOutOfRangeException |
| | XpathDenyConfirms | XpathDenyConfirms not specified if Confirm specified | ArgumentNullException |
| | Answers | Answers collection contains a non-answer object | ArgumentException |
| | Prompt | Prompt non-existant in Voice-only mode QA | ArgumentNullException |
| | FirstInitialTimeout | FirstInitialTimeout specified without Confirms being specified | InvalidOperationException |
| | FirstInitialTimeout | FirstInitialTimeout <0 | ArgumentOutOfRangeException |
| | AcceptRejectThreshold | AcceptRejectThreshold <0 or >1 | ArgumentOutOfRangeException |
| | DenyRejectThreshold | DenyRejectThreshold <0 or >1 | ArgumentOutOfRangeException |
| Command | SpeechIndex | SpeechIndex <0 | ArgumentOutOfRangeException |
| | Scope | Scope not valid | ArgumentException |
| | Scope | Scope not specified | ArgumentNullException |
| | Type | Type not specified | ArgumentNullException |
| | Type/Scope | More than 1 Command of same Type has same Scope | InvalidOperationException |
| | AcceptCommandThreshold | AcceptCommandThreshold <0 or >1 | ArgumentOutOfRangeException |
| | XpathTrigger | XpathTrigger not specified | ArgumentNullException |
| | AutoPostBack | AutoPostBack is true and Triggered handler not specified | InvalidOperationException |

| Control/ object | Attribute/ Method/ Object | Condition | Exception |
|---|---|---|---|
| | AutoPost-Back | AutoPostBack is false and Triggered handler is specified | InvalidOperation-Exception |
| Compare-Validator | Speech-Index | SpeechIndex <0 | ArgumentOutOf-RangeException |
| | Semantic-Item-To-Compare | one of SemanticItem-ToCompare and ValueToCompare is not specified | InvalidOperation-Exception |
| | ValueTo-Compare | one of SemanticItem-ToCompare and ValueToCompare is not specified | InvalidOperation-Exception |
| | ValueTo-Compare | ValueToCompare can not be converted to a valid Type. | InvalidOperation-Exception |
| | Semantic-Item-ToValidate | SemanticItemTo Validate not specified | ArgumentNull-Exception |
| Custom-Validator | Speech-Index | SpeechIndex <0 | ArgumentOutOf-RangeException |
| | Semantic-Item-ToValidate | SemanticItemTo-Validate not specified | ArgumentNull-Exception |
| | Client-Validation-Function | ClientValidation-Function not specified | ArgumentNull-Exception |
| Answer object | Xpath-Trigger | XpathTrigger not specified for Answers or ExtraAnswwers | ArgumentNull-Exception |
| | Confirm-Threshold | ConfirmThreshold <0 or >1 | ArgumentOutOf-RangeException |
| | Reject | Reject <0 or >1 | ArgumentOutOf-RangeException |
| | Auto-PostBack | Answer.Triggered has a handler but Answer.AutoPostBack is false | InvalidOperation-Exception |
| Semantic-Item object | Target-Element | TargetElement specifies multiple ids | |
| | Target-Attribute | TargetAttribute is not specified when TargetElement is specified | ArgumentNull-Exception |
| | BindAt | BindAt set to an invalid value | Argument-Exception |
| | BindAt | BindAt is "server" and SemanticItem.Target-Element is not a server-side control | Argument-Exception |
| | BindAt | BindAt is "server" and SemanticItem.TargetAttribute is not a member of the control specified by SemanticItem.TargetElement | Argument-Exception |
| | BindAt | BindAt is "server" and SemanticItem.TargetAttribute is a member of SemanticItem.TargetElement, but is not of type string, | Argument-Exception |
| | BindAt | BindAt is "server" and SemanticItem.TargetAttribute is a string, but is read-only. | Argument-Exception |
| Reco object | initial-Timeout | initialTimeout-negative | ArgumentOutOf-RangeException |
| | babble-Timeout | babbleTimeout-negative | ArgumentOutOf-RangeException |
| | max-Timeout | maxTimeout negative | ArgumentOutOf-RangeException |
| | end-Silence | endSilence negative | ArgumentOutOf-RangeException |
| | reject | reject <0 or >1 | ArgumentOutOf-RangeException |
| | Grammars | Grammars collection contains a non-grammar object | Argument-Exception |
| | Params | name not specified | ArgumentNull-Exception |
| | Params | contains a non-param object | Argument-Exception |
| Grammar object | src/Inline-Grammar | one of src or InlineGrammar is not specified | ArgumentNull-Exception |
| Prompt object | Params | name not specified | ArgumentNull-Exception |
| | Params | contains a non-param object | Argument-Exception |
| Dtmf object | initial-Timeout | initialTimeout <0 | ArgumentOutOf-RangeException |
| | interdigit-Timeout | interdigitTimeout <0 | ArgumentOutOf-RangeException |
| | endSilence | endSilence <0 | ArgumentOutOf-RangeException |
| | Params | name not specified | ArgumentNull-Exception |
| | Params | contains a non-param object | Argument-Exception |
| Style-Sheet | | contains an object which is not a Style object | Argument-Exception |
| Style object | Style-Reference | StyleReference is invalid | Argument-Exception |
| Smex-Message-Base | Timer | Timer <0 | ArgumentOutOf-RangeException |
| Smex-Message | Message | Message not specified | ArgumentNull-Exception |
| MakeCall | Called-Directory-Number | CalledDirectory-Number not specified | ArgumentNull-Exception |

26 Terms and Defintions

| Term | Definition |
| --- | --- |
| Voice-only | A mode of dialog that utilizes only speech input and ouput. There are no visual elements presented to the end user. Voice-only dialog typically implies the end user communication via the telephone. However, voice-only interaction may occur in a desktop computer setting. |
| Multimodal | A mode of dialog that utilizes speech input and visual ouput. Multimodal typically implies end user communication with a dialog via a hand-held computing device such as a pocket PC. |
| Tap-and-talk | A form of dialog interaction that utilizes speech input and visual ouput. This form of dialog interaction typically occurs on a hand-held computer such a pocket PC. The end user selects ("taps") the visual element with a stylus or pen-like device and provides input to the visual element using speech ("talk"). |
| Mixed Initiative | A form of dialog interaction model, whereby the user is permitted to share the dialog initiative with the system, eg by providing more answers than requested by a prompt, or by switching task when not prompted to do so. |
| SAPI SML | SAPI Semantic markup language. The XML document returned by SAPI 6.0 when an utterance is determined to be in-grammar. (SAPI SML is a SAPI-specific return format. Speech tags interpreters are agnostic to the actual content format of the returned document, provided it is an XML document). SAPI SML contains semantic values, confidence scores and the words used by the speaker. (It is generated by script or XSLT instructions contained within the grammar rules.) SAPI SML is described in greater detail in the Speech Core document SML Generation.. |
| CSTA | Computer Supported Telecommunications Applications — an ECMA standard. From the ECMA document: "CSTA is an interface that provides access to telecommunication functions that may be used with your phone (or many other communication devices) and may also be used by 3rd party applications such as Contact/Call Centres (e.g. ACD systems)." http://www.ecma.ch/ecma1/TOPICS/TC32/TG11/CSTA.HTM |
| System Initiative | A form of dialog interaction model, whereby the system holds the initiative, and drives the dialog with typically simple questions to which only a single answer is possible. |
| XPath | XML Path language, a W3C recommendation for addressing parts of an XML document. See http://www.w3.org/TR/xpath. |

27 Platform Parameter Settings

The <param> mechanism (described in sections Error! Reference source not found. Prompt object contents, Error! Reference source not found. Reco object contents and Error! Reference source not found. Dtmf object contents)31 is used to configure platform settings. The following "params" are recognized by all Microsoft platforms:

| Object | Name | Value | Default | Description |
| --- | --- | --- | --- | --- |
| Prompt | server | URI describing the location of the speech server | http://localhost (client) and registry setting (telephony server) | This configuration setting selects the speech server used for speech processing |
| bargein type | | This attribute sets the type of recognition input event that the browser uses to determine whether an onbargein event should be fired. There are three types of bargeintype that can be set: "speech", "grammar" and "final". | The default setting is "speech". If the platform does not support the type selected, the browser defaults to "speech". | The barge-in types are defined as: speech: This represents speech/sound/energy ("SOUND_START") detected by the recognition engine. grammar: This represents the audio partially matching the recognition grammar. The speech server will generate a "PHRASE_START" event, and possibly a semantic event (a semantic property in the phrase hypothesis has confidence greater than the confidence threshold). The client decides when to throw "onbargein" based on the capabilities sent by the speech server when a session is opened. The confidence threshold used by the semantic event is a client platform setting. final: This represents using a "valid" final recognition result (i.e. a result where the utterance confidence level is above the "reject" threshold). Run in conjunction with multiple recognition mode, this represents the recognizer continuously listening for a valid result, for hotword/wake-up style scenarios. Note that in this case the browser must fire onbargein before firing onreco. |
| Reco | server | URI describing the location of the speech server | http://localhost (client) and registry setting (telephony server) | This configuration setting selects the speech server used for speech processing |

28 DET Descriptions

The following table lists brief descriptions for each control, object and attribute. These descriptions will be used by the DET tool and exposed to the dialog author using Visual Studio.

| Control/ object | Attribute/ Method/ Object | Brief description |
| --- | --- | --- |
| QA | Id | Programmatic name of the control |
| | SpeechIndex | Activation order of the control |
| | Client-Activation-Function | Client-side function used to determine whether or not to activate the QA control |
| | OnClient-Active | Client-side function called after QA is determined to be active |
| | OnClient-Complete | Client-side function called after execution of QA (successfully or not). |
| | OnClient-Listening | Client-side function called after successful start of the reco object |
| | AllowCommands | Whether or not Commands may be activated for this QA |
| | PlayOnce | Whether or not this QA may be activated more than once per page |
| | Xpath-Accept-Confirms | The path in the sml document that indicates the confirm items were accepted |
| | Xpath-Deny-Confirms | The path in the sml document that indicates the confirm items were denied |
| | FirstInitialTimeout | Specifies initial timeout when QA. Count==1. |
| | Answers | An array of answer objects |
| | ExtraAnswers | An array of answer objects |
| | Confirms | An array of answer objects. |
| | Prompt | The Prompt object for this QA |
| | Reco | The Reco object for this QA |
| | Dtmf | The Dtmf object for this QA |
| Command | Id | Programmatic name of the control |
| | SpeechIndex | Activation order of the control |
| | Scope | The id of ASP.NET control that activates this Command grammar |
| | Type | The type of this Command in order to allow the overriding of identically typed commands |
| | Xpath-Trigger | SML document path that triggers this command |
| | Accept-Command-Threshold | Confidence level of recognition that is necessary to trigger this command |
| | OnClient-Command | Function to execute on recognition of this Command's grammar |
| | Auto-PostBack | Whether or not Command control posts back to server when Command grammar is recognized. |
| | Prompt | A Prompt object |
| | Grammar | The grammar object which will listen for the command |
| | Dtmf | The Dtmf object which will activate the command |
| Compare-Validator | Id | Programmatic name of the control |
| | SpeechIndex | Activation order of the control |
| | Type | Sets the datatype of the comparison |
| | ElementTo-Compare | The JScript variable or Id of the SemanticItem used as the basis for the comparison |
| | SemanticItem-ToValidate | The Id of the control that is being validated |
| | SemanticItem-ToCompare | The Id of the control that is the basis for comparison |
| | Operator | Validation operator |
| | InvalidateBoth | Whether or not to invalidate both ElementToCompare and ElementToValidate |
| | Prompt | Prompt to indicate the error |
| Custom-Validator | id | Programmatic name of the control |
| | SpeechIndex | Activation order of the control |
| | SemanticItem-ToValidate-AttributeTo-Validate | The Id of the control that is being validated Attribute of the ElementToValidate that contains the value being validated |
| | Client-Validation-Function | Validation function |
| | Prompt | Prompt to indicate the error |
| Answer object | id | Programmatic name of the object |
| | XpathTrigger | The part of the SML document this answer refers to |
| | Client-Normalization-Function | Function that returns author-specified transformation of the recognized item |
| | Semantic-Item | The semantic item to which this answer should be written |
| | Confirm-Threshold | The minimum confidence level of recognition necessary to mark this item as confirmed |
| | Reject | Rejection threshold for the Answer |
| | OnClient-Answer | Function to be called when the XpathTrigger is matched |
| | AutoPost-Back | Whether or not to post back to the server each time user interacts with the control |
| Prompt object | id | Programmatic name of the object |
| | type | Mime-type corresponding to the speech output format |
| | prefetch | Whether or not the prompt should be immediately synthesized and cached at browser when the page is loaded |
| | lang | The language of the prompt content |
| | bargein | Whether or not the speech platform is responsible for stopping prompt playback when speech or DTMF input is detected. |
| | Prompt-Select-Function | Function that selects and/or modifies a prompt string prior to playback |
| | OnClient-Bookmark | Function which is called when a bookmark is reached in the prompt text during playback |
| | OnClient-Error | Function called in response to an error event in the client |
| | InLinePrompt | Text of the prompt |
| | Params | Specifies non-standard speech platform configuration values |
| Reco object | Id | Programmatic name of the object |
| | StartElement | Name of the GUI element to throw the start event |
| | StartEvent | Name of the GUI event that will activate the underlying client-side Reco object |
| | Stop-Element | Name of the GUI element to throw the stop event |
| | StopEvent | Name of the GUI event that will deactivate the underlying client-side Reco object |
| | initial-Timeout | The time in milliseconds between start of recognition and the detection of speech |
| | babble-Timeout | The period of time in milliseconds in which the recognizer must return a result after detection of speech |
| | max-Timeout | The period of time in milliseconds between recognition start and results returned to the browser |

-continued

| Control/ object | Attribute/ Method/ Object | Brief description |
|---|---|---|
| | endSilence | Period of silence in milliseconds after the end of an utterance which the recognition results are returned |
| | Reject | The rejection threshold below which the platform will throw the noReco event |
| | Lang | The language of the speech recognition engine |
| | Mode | Specifies the recognition mode to be followed |
| | GrammarSelectFunction | Client-side function called prior to starting the recognition process |
| | OnClientSilence | Client-side function that will be called after detecting silence |
| | OnClientNoReco | Client-side function that will be called after detecting no recognition |
| | OnClientError | Client-side function that will be called after recognition errors |
| | OnClientSpeechDetected | Client-side function called when recognition platform detects speech |
| | Grammars | An array of grammar objects. |
| | Params | Specifies non-standard speech platform configuration values |
| | Record | Used for recording audio input from the user. |
| Grammar | id | Programmatic name of the object |
| | type | Mime-type of the grammar format used |
| | lang | Language of the grammar |
| | src | URI of the grammar to load |
| | InLineGrammar | Text of the grammar |
| Dtmf object | id | Programmatic name of the object |
| | numDigits | Number of key presses required to end the DTMF collection session |
| | autoflush | Whether or not to automatically flush the DTMF buffer on the underlying telephony interface card before activation |
| | terminalChar | Terminating key to end the DTMF collection session |
| | initialTimeout | Number of milliseconds to wait between activation and the first key press before raising a timeout event |
| | interdigitTimeout | Number of milliseconds to wait between key presses before raising a timeout event |
| | SMLContext | DTMF results wrapped in SML tags |
| | OnClientSilence | Function that executes if there is no DTMF key press before initialTimeout expires |
| | OnClientKeyPress | Function that executes on every pressing of a legal DTMF key. |
| | OnClientError | Function that executes if serious or fatal error occurs with the DTMF collection/recognition process |
| Params | Params | Specifies non-standard DTMF engine configuration values |
| | name | The name of the parameter to be configured. |
| record | Value | The value assigned to the named parameter |
| | enabled | Whether or not to record user input. |
| | type | MIME type of the file containing the recorded audio. Whether or not to play a beep before recording begins. |

What is claimed is:

1. A computer readable storage medium having instructions, which when executed on a computer generate client side markup for a client in a client/server system, the instructions comprising:
a set of multimodal controls defined on an authoring page for a website for defining visual renderings and at least one of recognition and audible prompting on a client in a server/client system, each multimodal control on the authoring page having a first set of attributes to control a first modality of visual rendering and a second set of attributes to control a second modality of at least one of recognition and audibly prompting the multimodal controls being related to client side markup executable by a client browser the set of multimodal controls comprising:
a question control for generating markup related to audible prompting of a question; and
an answer control for generating markup related to a grammar for recognition, the question and answer controls being associated with a semantic map comprising one or more semantic items that form a layer between individually associated visual domain primary controls and a non-visual recognition domain of the question and answer controls, the associated visual domain primary controls comprising markup; and
a module operable on a computer, the module being configured to receive the authoring page and generate client side markup executable by the client browser on the client in the server/client system in accordance with the first and second sets of attributes of the multimodal controls on the authoring page.

2. The computer readable storage medium of claim 1 wherein one of the second set of attributes for one of the multimodal controls relates to a grammar to use for recognition.

3. The computer readable storage medium of claim 2 wherein said one of the second set of attributes provides a reference to a location of the grammar.

4. The computer readable storage medium of claim 2 wherein the grammar is for one of speech recognition, handwriting recognition, gesture recognition and visual recognition.

5. The computer readable storage medium of claim 4 wherein the multimodal controls relate to one of HTML, XHTML, cHTML, XML and WML.

6. The computer readable storage medium of claim 1 wherein the multimodal controls relate to one of HTML, XHTML, cHTML, XML and WML.

7. The computer readable storage medium of claim 1 wherein one of the second set of attributes for one of the controls provides instructions related to generating audible output.

8. The computer readable storage medium of claim 7 wherein the instructions comprise text and the attribute relates to converting the text to audible output.

9. The computer readable storage medium of claim 1 wherein one of the second set of attributes for one of the multimodal controls relates to a location of data for audible output.

10. The computer readable storage medium of claim 9 wherein the data comprises a prerecorded audio data file and the attribute relates to playing the prerecorded audio data file.

11. The computer readable storage medium of claim 9 wherein the data comprises text and the attribute relates to converting the text to audible output.

12. The computer readable storage medium of claim 1, wherein the set of controls access and use a first library for the visual rendering and a second library for the at least one of recognition and audibly prompting, the first library including methods for generating the client side markup and a plurality of event handlers, the first library further comprising a plurality of website authoring tools, the second library including markup information for performing the at least one of recognition and audibly prompting.

13. A computer readable storage medium having instructions defined on an authoring page on a website, which when executed on a computer generate client side markup for a client in a client/server system, the instructions comprising:
 a first set of visual controls having attributes related to a first modality of interaction with a user of the client that being visual renderings on the client device, the first set of controls being related to client side markup executable by a client browser, and wherein the attributes include at least one of location for visual rendering, font, background color, and foreground color;
 a second set of controls having attributes related to a second modality of interaction with the user of the client that being at least one of recognition and audibly prompting, the second set of controls using at least one of the first set of controls, the second set of controls being related to client side markup executable by a client browser the second set of controls comprising:
  a question control for generating markup related to audible prompting of a question; and
  an answer control for generating markup related to a grammar for recognition, the question and answer controls being associated with a semantic map comprising one or more semantic items that form a layer between individually associated visual domain primary controls and a non-visual recognition domain of the question and answer controls, the associated visual domain primary controls comprising markup; and
 a module operable on a computer, the module being configured to receive the authoring page, which includes a plurality of the second set of controls, wherein the module is further configured to process the plurality of the second set of controls from the authoring page to generate client side markup from the first set of controls that is executable by the client browser on the client in the server/client system in accordance with the second set of controls and the attributes of the second set of controls.

14. The computer readable storage medium of claim 13 wherein one of the attributes for the second set of controls relates to a grammar to use for recognition.

15. The computer readable storage medium of claim 14 wherein said one of the attributes provides a reference to a location of the grammar.

16. The computer readable storage medium of claim 14 wherein the grammar is for one of speech recognition, handwriting recognition, gesture recognition and visual recognition.

17. The computer readable storage medium of claim 16 wherein the first set of controls and the second set of controls relate to one of HTML, XHTML, cHTML, XML and WML.

18. The computer readable storage medium of claim 13 wherein the controls relate to one of HTML, XHTML, cHTML, XML and WML.

19. The computer readable storage medium of claim 13 wherein one of the second set of attributes for one of the controls provides instructions related to generating audible output.

20. The computer readable storage medium of claim 19 wherein the instructions comprise text and the attribute relates to converting the text to audible output.

21. The computer readable storage medium of claim 13 wherein one of the second set of attributes for one of the controls relates to a location of data for audible output.

22. The computer readable storage medium of claim 21 wherein the data comprises a prerecorded audio data file and the attribute relates to playing the prerecorded audio data file.

23. The computer readable storage medium of claim 21 wherein the data comprises text and the attribute relates to converting the text to audible output.

24. The computer readable storage medium of claim 13, wherein the first set of controls access and use a first library for the visual renderings and the second set of controls access and use a second library for the at least one of recognition and audibly prompting, the first library including methods for generating the client side markup and a plurality of event handlers, the first library further comprising a plurality of website authoring tools, the second library including markup information for performing the at least one of recognition and audibly prompting.

25. A computer readable storage medium having instructions, which when executed on a computer generate client side markup for a client in a client/server system, the instructions comprising:
 a first set of visual controls defined on an authoring page for a website having attributes related to a first modality of interaction with a user of the client that being visual renderings on the client device, and the attributes including at least one of location for visual rendering, font, background color, and foreground color, and the first set of controls being related to client side markup executable by a client browser;
 a second set of controls defined on the authoring page for defining desired operation on the client device having attributes related to a second modality of interaction with the user of the client that being at least one of recognition and audible prompting, the second set of controls being selectively associated with the first set of controls, and the second set of controls being related to client side markup executable by a client browser, the second set of controls comprising:
  a question control for generating markup related to audible prompting of a question; and
  an answer control for generating markup related to a grammar for recognition, the question and answer controls being associated with a semantic map comprising one or more semantic items that form a layer between individually associated visual domain primary controls and a non-visual recognition domain of the question and answer controls, the associated visual domain primary controls comprising markup; and
 a module operable on a computer, the module being configured to receive the authoring page, wherein the module is further configured to process the controls of the first set in the authoring page to generate client side markup by incorporating the attributes in the controls that is executable by the client browser on the client in the server/client system in accordance with the controls of the first set and the attributes of the controls of the first set to perform both visual rendering, and wherein the module is further configured to process the controls of the second set to generate client side markup by incorporating the attributes in the controls that is executable by the client browser on the client in the server/client system in accordance with the controls of the second set and the attributes of the controls of the second set in the authoring page.

26. The computer readable storage medium of claim 25 wherein one of the attributes for the second set of controls relates to a grammar to use for recognition.

27. The computer readable storage medium of claim 26 wherein said one of the attributes provides a reference to a location of the grammar.

28. The computer readable storage medium of claim 26 wherein the grammar is for one of speech recognition, handwriting recognition, gesture recognition and visual recognition.

29. The computer readable storage medium of claim 28 wherein the first set of controls and the second set of controls relate to one of HTML, XHTML, cHTML, XML and WML.

30. The computer readable storage medium of claim 25 wherein the controls relate to one of HTML, XHTML, cHTML, XML and WML.

31. The computer readable storage medium of claim 25 wherein one of the second set of attributes for one of the controls provides instructions related to generating audible output.

32. The computer readable storage medium of claim 31 wherein the instructions comprise text and the attribute relates to converting the text to audible output.

33. The computer readable storage medium of claim 25 wherein one of the second set of attributes for one of the controls relates to a location of data for audible output.

34. The computer readable storage medium of claim 33 wherein the data comprises a prerecorded audio data file and the attribute relates to playing the prerecorded audio data file.

35. The computer readable storage medium of claim 33 wherein the data comprises text and the attribute relates to converting the text to audible output.

36. The computer readable storage medium of claim 25 wherein one of the attributes of the second set of controls relates to an identifier of the associated control of the first set of controls to form the association.

37. The computer readable storage medium of claim 25 wherein one of the attributes relates to whether the associated control of the second set is available for activation.

38. The computer readable storage medium of claim 37 wherein activation relates to generating markup.

39. The computer readable storage medium of claim 37 wherein activation relates to execution on the client.

40. The computer readable storage medium of claim 25 wherein the second set of controls activates another control of the second set.

41. The computer readable storage medium of claim 25 wherein the question control activates the answer control.

42. The computer readable storage medium of claim 41 wherein the answer control includes a mechanism to associate a received result with one of the first set of controls.

43. The computer readable storage medium of claim 42 wherein the mechanism includes binding the recognition value.

44. The computer readable storage medium of claim 43 wherein the mechanism includes issuing an event related to operation of binding.

45. The computer readable storage medium of claim 25 wherein the second set of controls further includes means defining a command for generating markup related to a grammar for one of navigation in the markup, help with a task, and repeating an audible prompt.

46. The computer readable storage medium of claim 25 wherein the second set of controls further includes means for defining a confirmation for generating markup related to confirming that a recognized result is correct.

47. The computer readable storage medium of claim 46 wherein the confirmation is activated as a function of a confidence level of the recognized result.

48. The computer readable storage medium of claim 47 wherein one of the controls of the second set of controls includes an attribute related to a confidence level.

49. The computer readable storage medium of claim 25 wherein the second set of controls further includes means for defining a comparison for generating markup for comparing a recognized result with a selected value.

50. The computer readable storage medium of claim 25 wherein the second set of controls further includes means for defining a comparison for generating markup for comparing a recognized result with another recognized result.

51. The computer readable storage medium of claim 25, wherein the first set of controls access and use a first library for the visual renderings and the second set of controls access and use a second library for the at least one of recognition and audibly prompting, the first library including methods for generating the client side markup and a plurality of event handlers, the first library further comprising a plurality of website authoring tools, the second library including markup information for performing the at least one of recognition and audibly prompting.

52. A computer implemented method for defining a website application on a server in a server/client architecture, the website application providing markup to a client for performing recognition and/or audible prompting on the client, the method comprising:

defining the website application by creating an authoring page with a first set of visual controls having attributes related to a first modality of interaction with a user of the client that being visual rendering on the client device, the attributes related to visual rendering including at least one of location for visual rendering, font, background color, and foreground color and with a second set of controls having attributes related to a second modality of interaction with a user of the client that being at least one of recognition and audibly prompting, the first set of controls and the second set of controls being related to client side markup executable by a client browser, wherein defining includes selectively associating controls of the second set of controls with at least one control of the first set of visual controls, the second set of controls comprising:

a question control for generating markup related to audible prompting of a question; and an answer control for generating markup related to a grammar for recognition, the question and answer controls being associated with a semantic map comprising one or more semantic items that form a layer between individually associated visual domain primary controls and a non-visual recognition domain of the question and answer controls, the associated visual domain primary controls comprising markup; and processing the controls on the authoring page to generate client side markup including processing of the first set of visual controls to generate client side markup executable by the client browser on the client in the server/client system in accordance with the controls of the first set and the attributes of the controls of the first set to perform both visual rendering, and processing the controls of the second set to generate client side markup by incorporating the attributes in the controls that is executable by the client browser on the client in the server/client system in accordance with the controls of the second set.

53. The computer implemented method of claim 52 wherein each of the controls of the second set include an identifier attribute for identifying a control of the first set of visual controls, and wherein associating includes providing an identifier of at least one control of the first set of controls in the corresponding identifier attribute of each of the second set of controls.

54. The computer implemented method of claim 52 wherein the second set of controls further includes means for confirming that a recognized result is correct;

and wherein defining the website application with a second set of controls related to at least one of recognition and audibly prompting includes associating the means for confirming with a recognized result to be received.

55. The computer implemented method of claim 54 wherein defining the website application with a second set of controls related to at least one of recognition and audibly prompting further includes defining a confidence level for activation of said means for confirming.

56. The computer implemented method of claim 52 wherein the second set of controls further includes means for generating markup related to a grammar for one of navigation on the computer, help with a task, and repeating an audible prompt; and wherein defining the website application with a second set of controls related to at least one of recognition and audibly prompting includes associating said means with means for prompting a question control.

57. The computer implemented method of claim 52 wherein the second set of controls further includes means for comparing a recognized result with a selected value; and wherein defining the website application with a second set of controls related to at least one of recognition and audibly prompting includes associating the means for confirming with a recognized result to be received.

58. The computer implemented method of claim 52 wherein the second set of controls further includes means for comparing a recognized result with another recognized result; and wherein defining the website application with a second set of controls related to at least one of recognition and audibly prompting includes associating the means for confirming with a recognized result to be received.

59. The computer-implemented method of claim 52, wherein the first set of controls access and use a first library for the visual rendering and the second set of controls access and use a second library for the at least one of recognition and audibly prompting, the first library including methods for generating the client side markup and a plurality of event handlers, the first library further comprising a plurality of website authoring tools, the second library including markup information for performing the at least one of recognition and audibly prompting.

* * * * *